US008473208B2

(12) United States Patent
Takaoka

(10) Patent No.: US 8,473,208 B2
(45) Date of Patent: Jun. 25, 2013

(54) VELOCITY CALCULATING DEVICE, VELOCITY CALCULATING METHOD, AND NAVIGATION DEVICE

(75) Inventor: Tomohisa Takaoka, Kanagawa (JP)

(73) Assignee: Sony Corporation, Tokyo (JP)

( * ) Notice: Subject to any disclaimer, the term of this patent is extended or adjusted under 35 U.S.C. 154(b) by 220 days.

(21) Appl. No.: 12/846,161

(22) Filed: Jul. 29, 2010

(65) Prior Publication Data

US 2011/0066376 A1    Mar. 17, 2011

(30) Foreign Application Priority Data

Sep. 14, 2009   (JP) ................................. 2009-211997

(51) Int. Cl.
*G01C 21/10*  (2006.01)
*G01P 15/00*  (2006.01)

(52) U.S. Cl.
USPC ............................ 701/500; 701/507; 702/141

(58) Field of Classification Search
None
See application file for complete search history.

(56) References Cited

U.S. PATENT DOCUMENTS

| | | | | |
|---|---|---|---|---|
| 3,414,899 A | * | 12/1968 | Buell ............................... | 342/61 |
| 5,072,396 A | * | 12/1991 | Fitzpatrick et al. ............ | 701/409 |
| 5,721,681 A | * | 2/1998 | Borschert et al. ............... | 701/37 |
| 6,181,989 B1 | * | 1/2001 | Gwozdecki ....................... | 701/4 |
| 6,697,736 B2 | * | 2/2004 | Lin ............................... | 701/472 |
| 7,418,364 B1 | * | 8/2008 | Horton et al. ................. | 702/153 |
| 2008/0071476 A1 | | 3/2008 | Hoshizaki | |
| 2008/0109166 A1 | | 5/2008 | Takaoka et al. | |
| 2008/0114545 A1 | | 5/2008 | Takaoka et al. | |
| 2008/0184770 A1 | * | 8/2008 | Sato ............................... | 73/1.37 |
| 2009/0326857 A1 | * | 12/2009 | Mathews et al. ............... | 702/141 |
| 2012/0130602 A1 | * | 5/2012 | Omelchenko et al. .......... | 701/50 |
| 2012/0194426 A1 | * | 8/2012 | Mathews et al. ............... | 345/157 |

FOREIGN PATENT DOCUMENTS

| | | |
|---|---|---|
| DE | 103 54 944 A1 * | 6/2005 |
| EP | 1 903 306 A2 | 3/2008 |
| JP | 2008-76389 | 4/2008 |
| JP | 2008-89517 | 4/2008 |
| WO | WO 9724582 A1 * | 7/1997 |

OTHER PUBLICATIONS

U.S. Appl. No. 12/846,179, filed Jul. 29, 2010, Takaoka.
Extended European Search Report issued Dec. 28, 2010 in EP 10 17 5403.

* cited by examiner

*Primary Examiner* — Mussa A Shaawat
(74) *Attorney, Agent, or Firm* — Oblon, Spivak, McClelland, Maier & Neustadt, L.L.P.

(57) ABSTRACT

Provided is a velocity calculating device including a vertical acceleration detector mounted on a moving body that travels on a predetermined travel surface, the vertical acceleration detector detecting an acceleration in a vertical direction generated due to an undulation of the travel surface; a horizontal angular velocity detector mounted on the moving body, the horizontal angular velocity detector detecting an angular velocity around a horizontal axis that is perpendicular to a direction of travel of the moving body, the angular velocity being generated due to the undulation of the travel surface; a velocity calculator that calculates a velocity of the moving body in the direction of travel of the moving body on the basis of the acceleration in the vertical direction and the angular velocity around the horizontal axis; and a velocity corrector that corrects the velocity in accordance with the velocity.

10 Claims, 50 Drawing Sheets

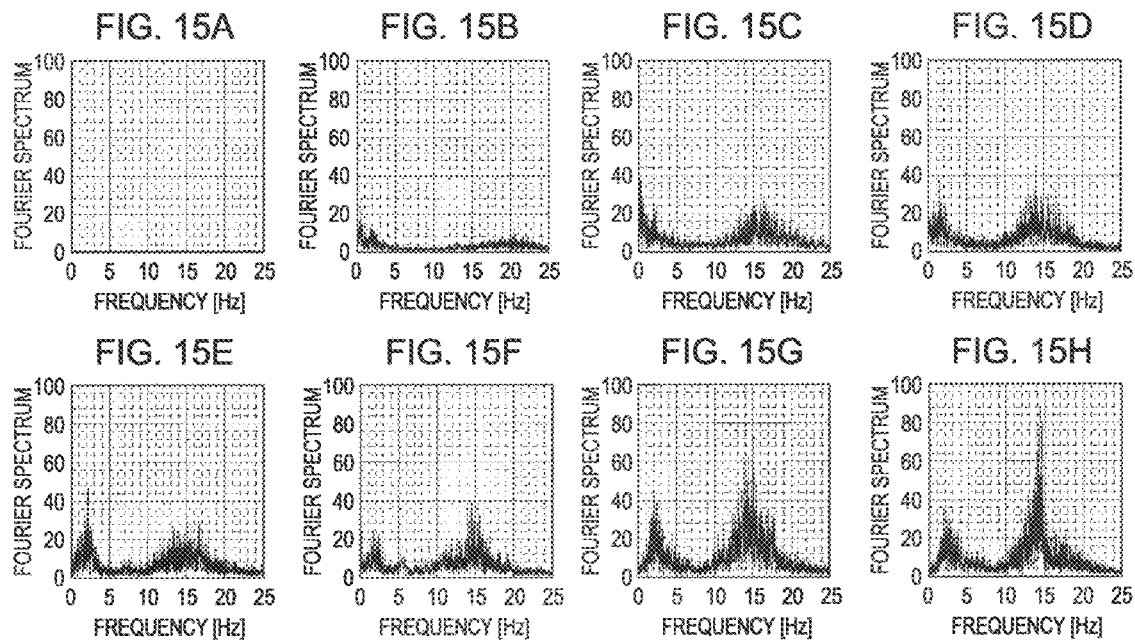

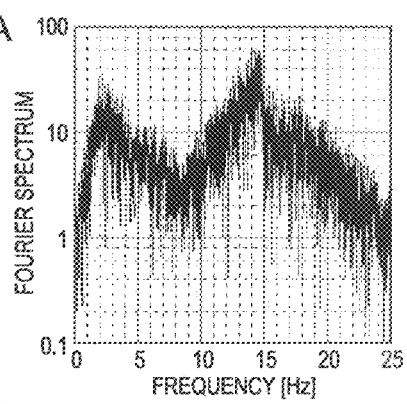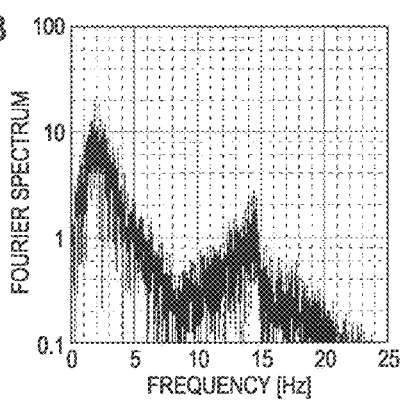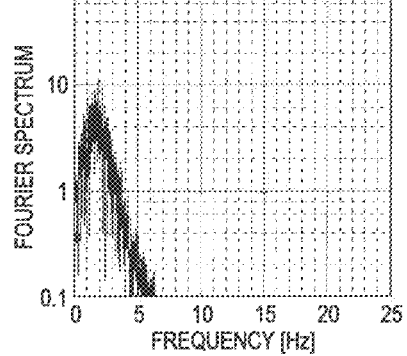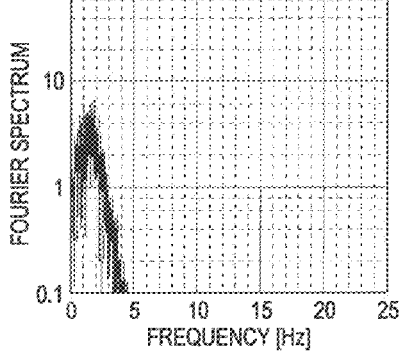

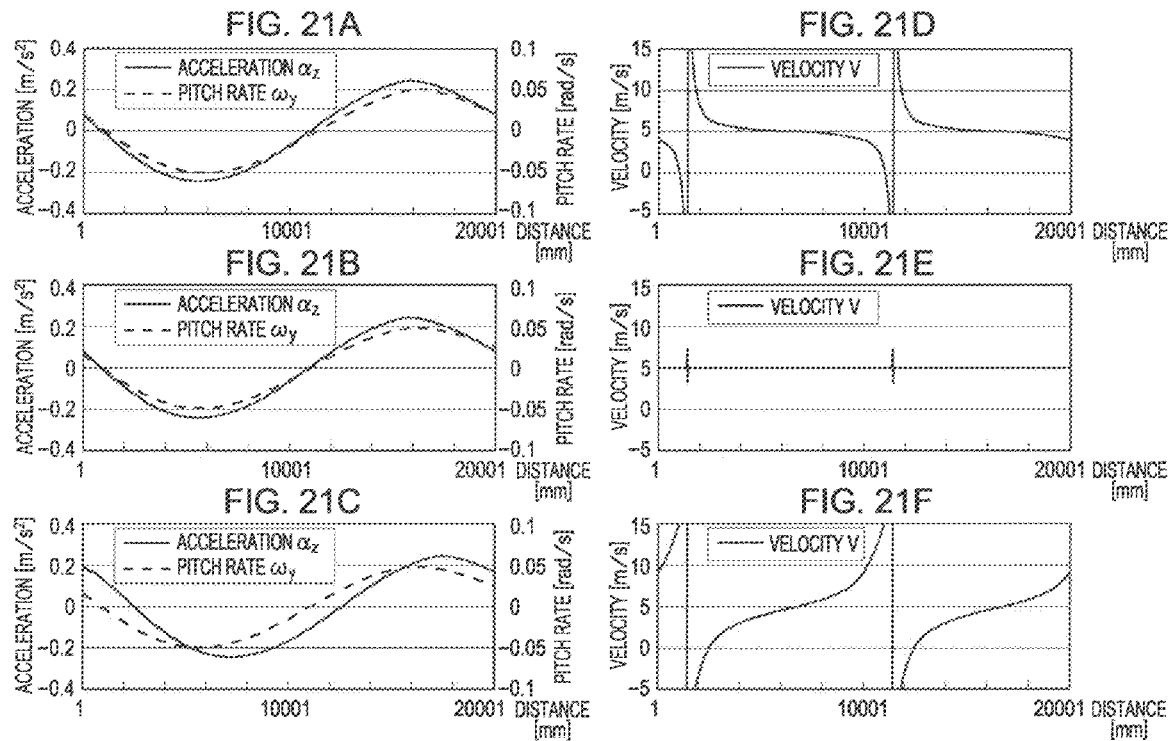

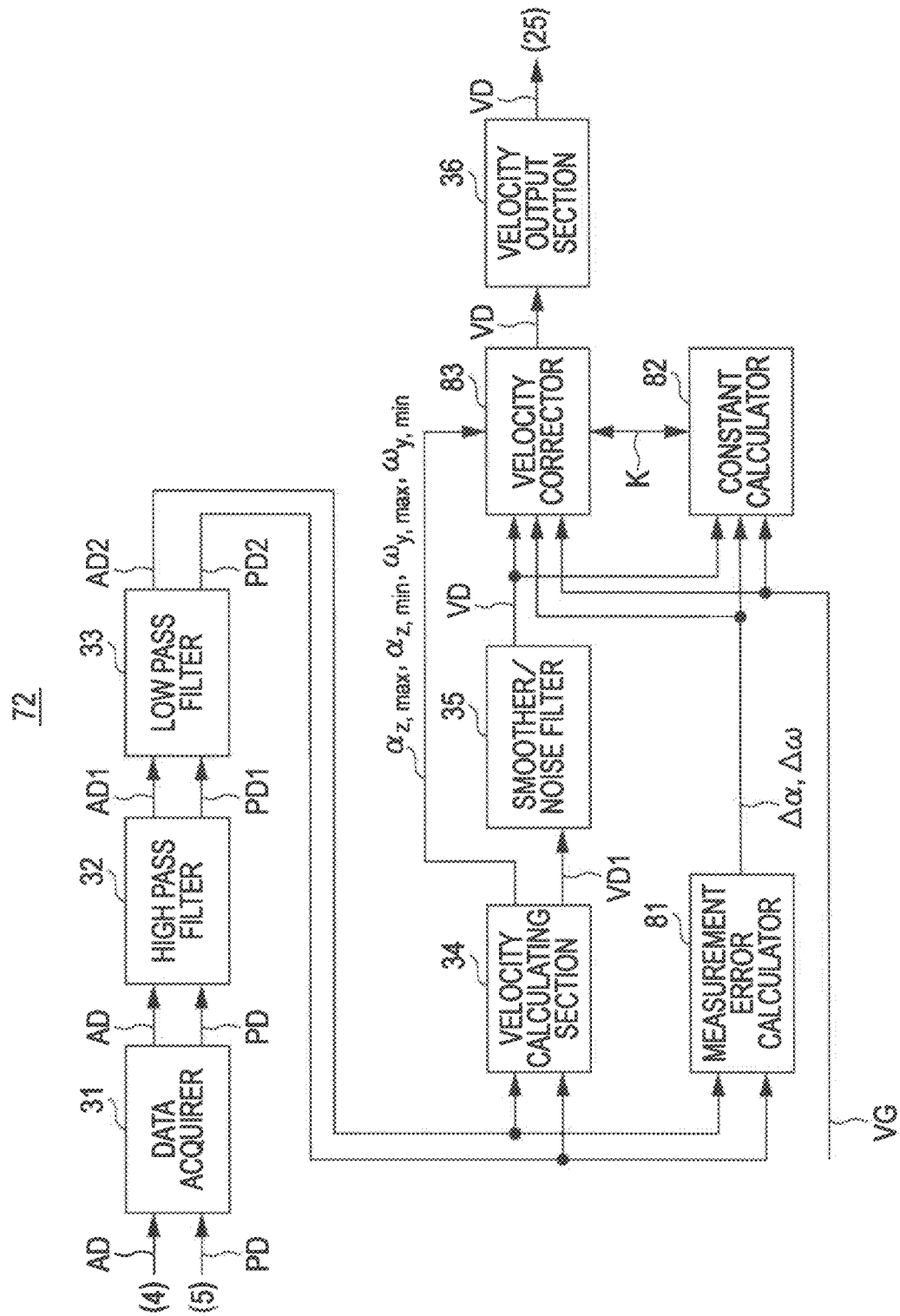

VELOCITY CALCULATING DEVICE, VELOCITY CALCULATING METHOD, AND NAVIGATION DEVICE

BACKGROUND OF THE INVENTION

1. Field of the Invention

The present invention relates to a velocity calculating device, a velocity calculating method, and a navigation device, which are suitable for, for example, a portable navigation device.

2. Description of the Related Art

Existing navigation devices receive position signals (hereinafter referred to as GPS signals) from a plurality of global positioning system (GPS) satellites and calculate the present position of a moving body (such as a vehicle) on the basis of the GPS signals.

However, when a vehicle in which the navigation device is placed is in a tunnel or an underground parking garage, it is difficult for the navigation device to receive GPS signals from GPS satellites and to calculate the present position on the basis of the GPS signals.

Even when it is difficult to receive GPS signals, some navigation devices calculate the velocity in the direction of travel of the vehicle on the basis of the acceleration in a horizontal direction perpendicular to the direction of travel and the angular velocity around the vertical axis perpendicular to the direction of travel when the vehicle is cornering, and thereby calculate the present position of the vehicle on the basis of the velocity in the direction of travel (see, for example, Japanese Unexamined Patent Application Publication No. 2008-76389).

SUMMARY OF THE INVENTION

Such navigation devices can calculate velocity in the direction of travel when the vehicle is cornering, but it is difficult to calculate the velocity in the direction of travel when the vehicle is moving linearly. Therefore, it is difficult for such navigation devices to calculate the velocity in the direction of travel under all conditions of a travel surface (i.e., a road or the like).

The present invention provides a velocity calculating device, a velocity calculating method, and a navigation device that are capable of precisely calculating the velocity of a moving body irrespective the conditions of a travel surface.

According to an embodiment of the present invention, there is provided a velocity calculating device including a vertical acceleration detector mounted on a moving body that travels on a predetermined travel surface, the vertical acceleration detector detecting an acceleration in a vertical direction generated due to an undulation of the travel surface; a horizontal angular velocity detector mounted on the moving body, the horizontal angular velocity detector detecting an angular velocity around a horizontal axis that is perpendicular to a direction of travel of the moving body, the angular velocity being generated due to the undulation of the travel surface; a velocity calculator that calculates a velocity of the moving body in the direction of travel of the moving body on the basis of the acceleration in the vertical direction and the angular velocity around the horizontal axis; and a velocity corrector that corrects the velocity in accordance with the velocity.

According to an embodiment of the present invention, there is provided a method of calculating a velocity, the method including the steps of detecting an acceleration in a vertical direction generated in a moving body that travels on a predetermined travel surface due to an undulation of the travel surface; detecting an angular velocity around a horizontal axis that is perpendicular to a direction of travel of the moving body, the angular velocity being generated due to the undulation of the travel surface; calculating a velocity of the moving body in the direction of travel of the moving body on the basis of the acceleration in the vertical direction and the angular velocity around the horizontal axis; and correcting the velocity in accordance with the velocity.

According to an embodiment of the present invention, there is provided a navigation device including a vertical acceleration detector mounted on a moving body that travels on a predetermined travel surface, the vertical acceleration detector detecting an acceleration in a vertical direction generated due to an undulation of the travel surface; a horizontal angular velocity detector mounted on the moving body, the horizontal angular velocity detector detecting an angular velocity around a horizontal axis that is perpendicular to a direction of travel of the moving body, the angular velocity being generated due to the undulation of the travel surface; a velocity calculator that calculates a velocity of the moving body in the direction of travel of the moving body on the basis of the acceleration in the vertical direction and the angular velocity around the horizontal axis; a velocity corrector that corrects the velocity in accordance with the velocity; a vertical angular velocity detector that calculates an angular velocity around a vertical axis perpendicular to the direction of travel; an angle calculator that calculates an angle by which the moving body has rotated on the basis of the angular velocity around the vertical axis; and a position calculator that calculates a position of the moving body on the basis of the velocity in the direction of travel velocity that is calculated by the velocity calculator and the angle that is calculated by the angle calculator.

Thus, an acceleration in a vertical direction generated due to an undulation of a travel surface and an angular velocity around a horizontal axis that is perpendicular to a direction of travel can be detected, whereby the velocity of a moving body in the direction of travel can be calculated on the basis of the acceleration in the vertical direction and the angular velocity around the horizontal axis under all road conditions and an error that may be generated in accordance with the velocity can be reduced by performing a correction process in accordance with the velocity.

According to the embodiments of the present invention, an acceleration in a vertical direction generated due to an undulation of a travel surface and an angular velocity around a horizontal axis that is perpendicular to a direction of travel can be detected, whereby the velocity of the moving body in the direction of travel can be calculated on the basis of the acceleration in a vertical direction and the angular velocity around a horizontal axis under all road conditions and an error that may be generated in accordance with the velocity can be reduced by performing a correction process in accordance with the velocity, so that a velocity calculating device, a velocity calculating method, and a navigation device that are capable of precisely calculating the velocity of a moving body irrespective of the conditions of a travel surface can be realized.

BRIEF DESCRIPTION OF THE DRAWINGS

FIGS. 15A to 15H are graphs illustrating the total angular velocity that has been Fourier transformed for every 4096 data points;

FIGS. 18A to 18D are graphs illustrating a comparison of low pass filtering performed on the total angular velocity;

FIGS. 21A to 21F are graphs illustrating a simulation result of the acceleration, the pitch rate, and the velocity when the PND is placed at three different positions;

FIG. 50 is a block diagram illustrating the structure of a velocity calculator according to a third embodiment;

DESCRIPTION OF THE PREFERRED EMBODIMENTS

Hereinafter, embodiments for carrying out the present invention (hereinafter referred to as embodiments) will be described in the following order with reference to the drawings.

1. First Embodiment (a navigation device that does not correct the velocity V)
2. Second Embodiment (a navigation device that corrects the velocity V by using a correction factor)
3. Third Embodiment (a navigation device that corrects the velocity V by using a velocity model)
4. Other Embodiments
1. First Embodiment
1-1. Fundamental Principle In the following description, a personal navigation device (hereinafter referred to as a PND) is used as an example of a first embodiment of the present invention, and the fundamental principle of calculating the velocity and the present position of a vehicle, which corresponds to a moving body, using the PND will be described.

1-1-1. Principle of Velocity Calculation

Figure 1A:
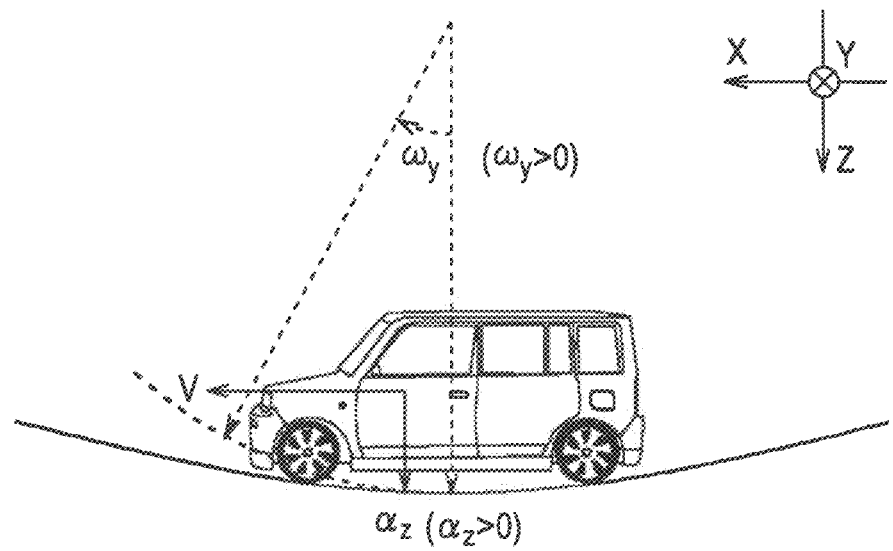
FIG. 1A is a diagram illustrating a vehicle traveling on a concave road surface.
Figure 1B:
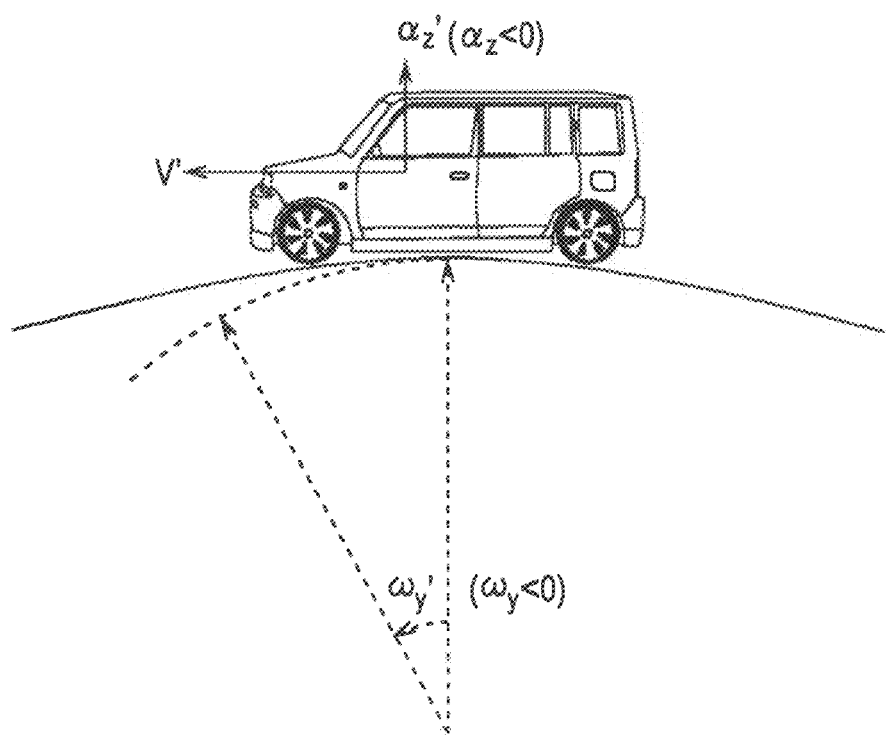
FIG. 1B is a diagram illustrating the vehicle traveling on a convex road surface.

In practice, a road on which a vehicle travels, which corresponds to a travel surface, is seldom flat, and is generally concave as illustrated in FIG. 1A or generally convex as illustrated in FIG. 1B.

In the coordinate system associated with the vehicle, the X axis extends in the front-back direction, the Y axis extends in a horizontal direction perpendicular to the X axis, and the Z axis extends in the vertical direction.

The PND is placed, for example, on the dashboard of the vehicle. When the vehicle travels on the concave road (FIG. 1A), a three-axis acceleration sensor of the PND detects a downward acceleration $\alpha_z$ along the Z axis with a sampling frequency of, for example, 50 Hz.

A Y axis gyro sensor of the PND detects an angular velocity $\omega_y$ around the Y axis (hereinafter referred to as a pitch rate) perpendicular to the direction of travel of the vehicle with a sampling frequency of, for example, 50 Hz.

For the PND, the sign of the downward acceleration $\alpha_z$ along the Z axis is defined as positive. The sign of the pitch rate $\omega_y$, upwardly rotating, with respect to the direction of travel, along an imaginary circle that is formed along a concave road surface illustrated in FIG. 1A is defined as positive.

The PND calculates the velocity V of the vehicle in the direction of travel 50 times per second using the acceleration $\alpha_z$ detected by the three-axis acceleration sensor and the pitch rate $\omega_y$ detected by the Y axis gyro sensor in accordance with the following equation (1).

$$V = \frac{\alpha_z}{\omega_y} \quad (1)$$

When the vehicle travels on a convex road (FIG. 1B), the three-axis acceleration sensor of the PND detects an upward acceleration $\alpha_z$ along the Z axis with a sampling frequency of, for example, 50 Hz, and the Y axis gyro sensor of the PND detects a pitch rate $\omega_{y'}$ around the Y axis with a sampling frequency of, for example, 50 Hz.

The PND calculates the velocity V' of the vehicle in the direction of travel 50 times per second using the acceleration $\alpha_{z'}$ detected by the three-axis acceleration sensor and the pitch rate $\omega_{y'}$ detected by the Y axis gyro sensor in accordance with the following equation (2).

$$V' = \frac{\alpha'_z}{\omega'_y} \quad (2)$$

For convenience of description here, a negative acceleration is described as the acceleration $\alpha_{z'}$. In practice, the three-axis acceleration sensor detects the acceleration $\alpha_{z'}$ as a negative value of the acceleration $\alpha_z$. Likewise, a negative pitch rate is described as the pitch rate $\omega_{y'}$. In practice, the Y axis gyro sensor detects the pitch rate $\omega_{y'}$ as a negative value of the pitch rate $\omega_y$. Therefore, in practice, the velocity V' is also calculated as the velocity V.

1-1-2. Principle of Calculating Present Position

Next, the principle of calculating the present position on the basis of the velocity V, which have been calculated by using the above principle of velocity calculation, and the angular velocity around the Z axis will be described.

Figure 2:
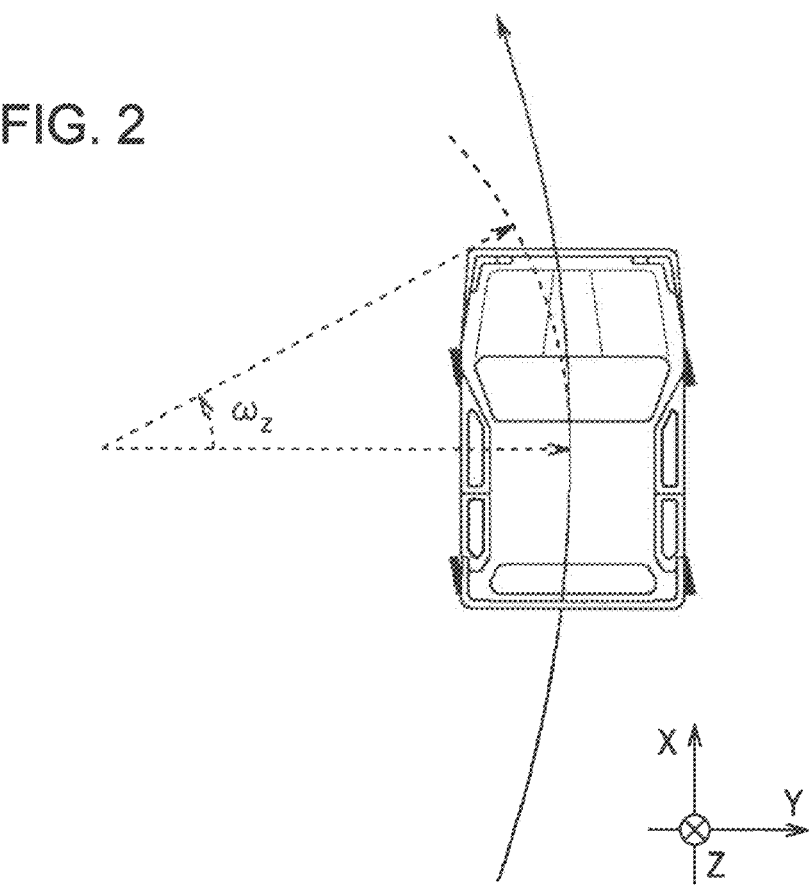
FIG. 2 is a diagram illustrating a vehicle traveling along a curve.

Referring to FIG. 2, when the vehicle is, for example, turning to the left, a Z axis gyro sensor of the PND detects an angular velocity around the Z axis (hereinafter referred to as a yaw rate) $\omega_z$ with a sampling frequency of, for example, 50 Hz.

Figure 3:
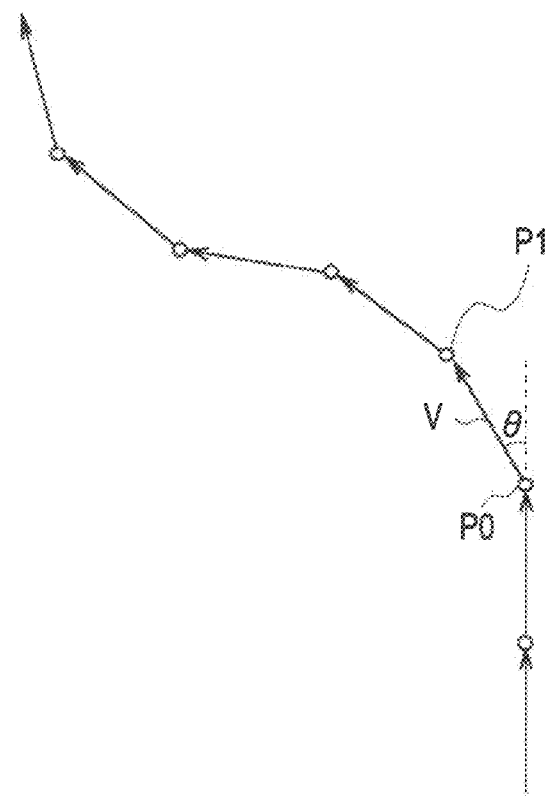
FIG. 3 is a diagram illustrating a method of calculating the present position using a velocity and an angle.

Referring to FIG. 3, the PND calculates the displacement from a previous position P0 to a present position P1 on the basis of the velocity V at the previous position P0 and an angle θ that is calculated by multiplying the yaw rate $\omega_z$ detected by the gyro sensor by a sampling period (in this case, 0.02 s). The PND calculates the present position P1 by adding the displacement to the previous position P0.

1-2. Structure of PND

The specific structure of the PND, which calculates the velocity of a vehicle using the fundamental principle described above, will be described.

1-2-1. External Structure of PND

Figure 4:
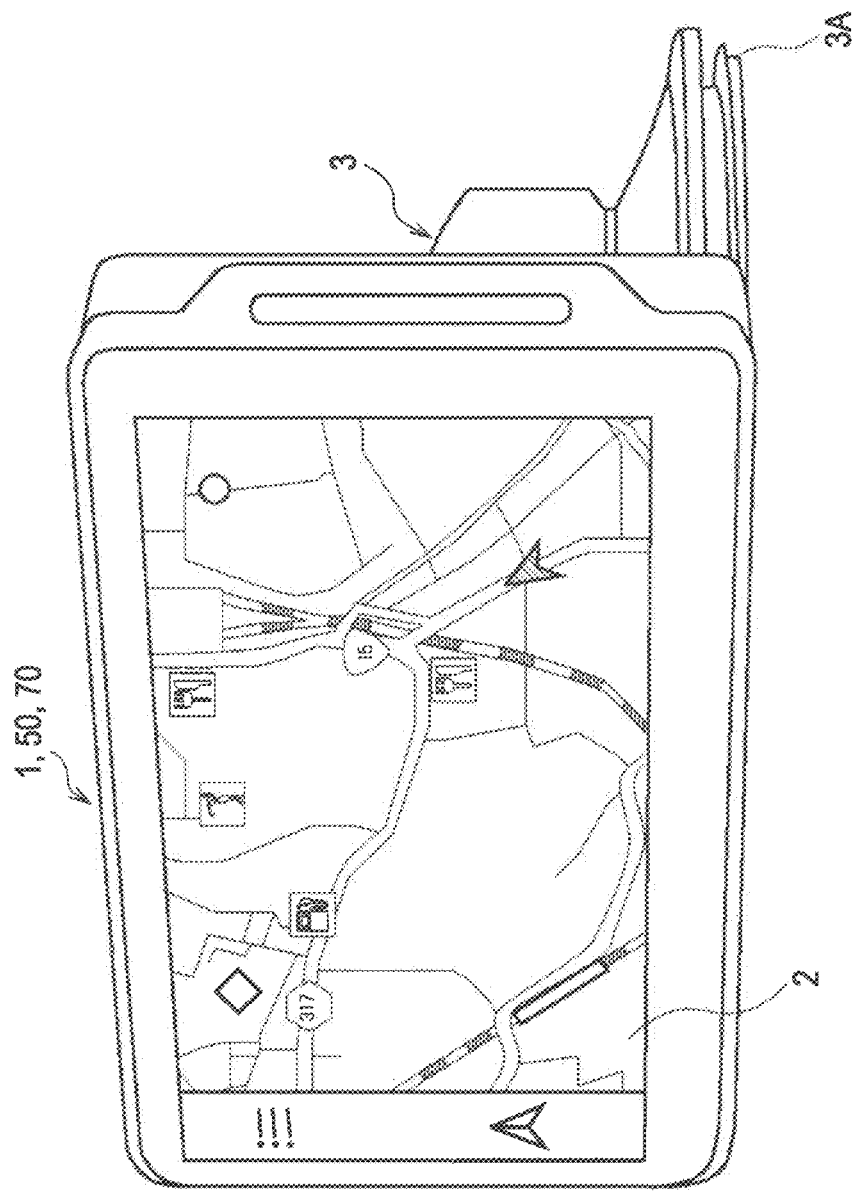
FIG. 4 is a diagram illustrating the overall structure of a PND.

Referring to FIG. 4, a PND 1 has a display 2 on a front surface thereof. The display 2 can display a map image corresponding to map data stored in, for example, a nonvolatile memory (not shown) of the PND 1.

The PND 1 is supported by and is mechanically and electrically connected to a cradle 3 that is attached to a dashboard of a vehicle with a suction cup 3A.

Thus, the PND 1 operates using electric power supplied by a battery of the vehicle through the cradle 3. When the PND 1 is detached from the cradle 3, the PND 1 operates using electric power supplied by an internal battery.

Figure 5:
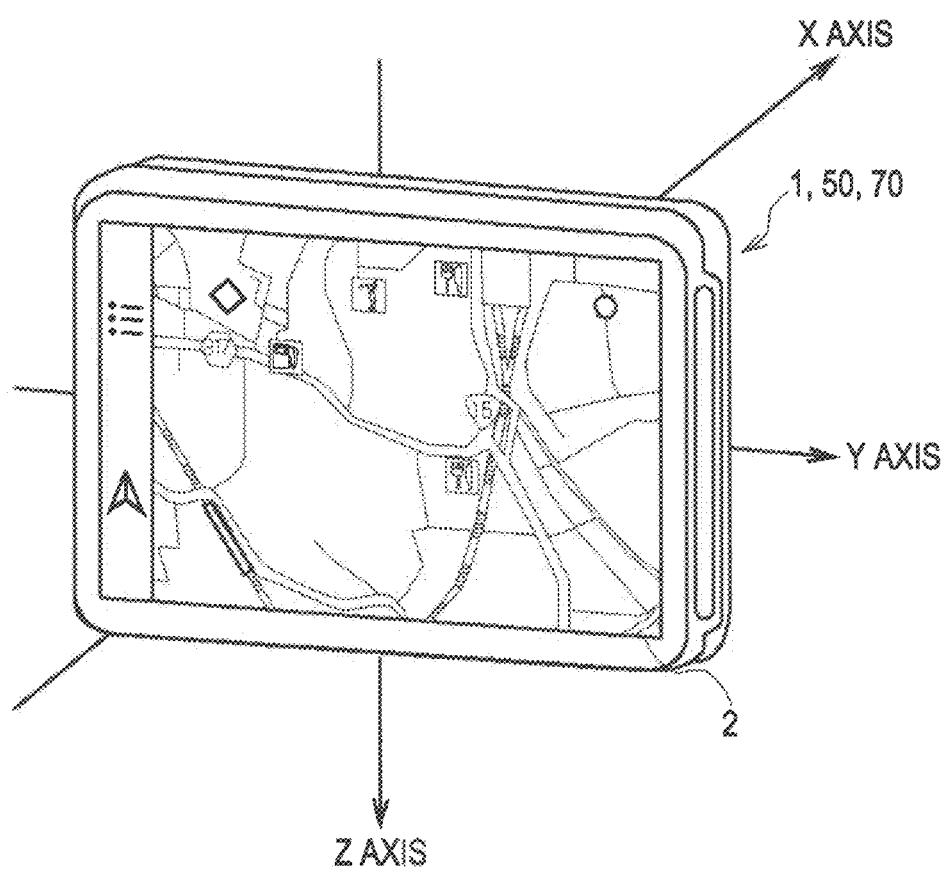
FIG. 5 is a diagram illustrating the definition of the coordinate system associated with the PND.

The PND 1 is disposed so that the display 2 extends perpendicular to the direction of travel of the vehicle. FIG. 5 illustrates the coordinate system associated with the PND 1. The X axis extends in the front-back direction of the vehicle, the Y axis extends in a horizontal direction perpendicular to the X axis, and the Z axis extends in the vertical direction.

In the coordinate system, the direction of travel of the vehicle is defined as the positive direction along the X axis, the rightward direction is defined as the positive direction along the Y axis, and the downward direction is defined as the positive direction along the Z axis.

1-2-2. Sensor Structure of PND

Figure 6:
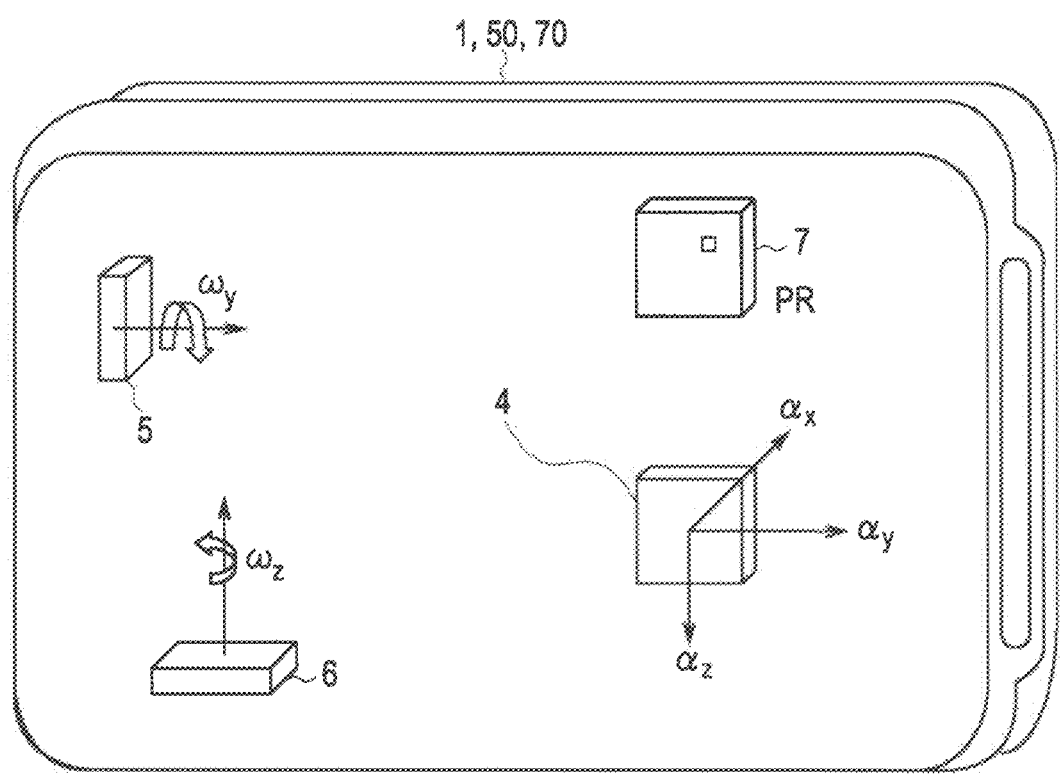
FIG. 6 is a diagram illustrating sensors included in the PND.

Referring to FIG. 6, the PND 1 includes a three-axis acceleration sensor 4, a Y axis gyro sensor 5, a Z axis gyro sensor 6, and a barometric pressure sensor 7.

The three-axis acceleration sensor 4 detects an acceleration $\alpha_x$ along the X-axis, an acceleration $\alpha_y$ along the Y-axis, and the acceleration $\alpha_z$ along the Z-axis respectively as voltages.

The Y axis gyro sensor 5, the Z axis gyro sensor 6, and the barometric pressure sensor 7 respectively detect the pitch rate $\omega_y$ around the Y axis, the yaw rate $\omega_z$ the around the Z axis, and an ambient pressure PR respectively as voltages.

1-2-3. Circuit Structure of PND

Figure 7:
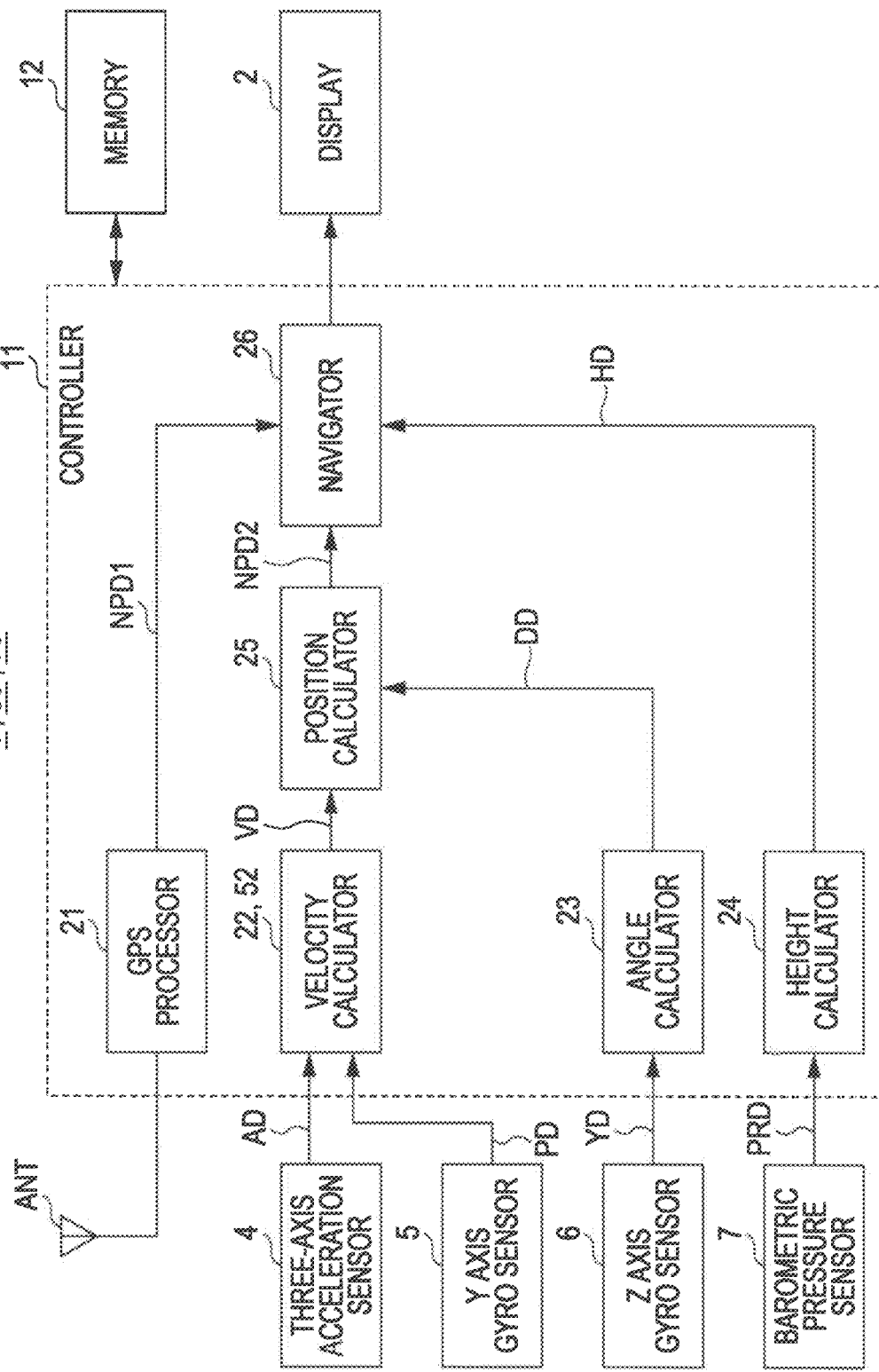
FIG. 7 is a block diagram illustrating of the circuit structure of the PND.

Referring to FIG. 7, a controller 11 of the PND 1, which is a central processing unit (CPU), controls the PND 1 in accordance with an operating system that is read from a memory 12 that includes a nonvolatile memory.

In the PND 1, the controller 11 performs velocity calculation and other processes described below in accordance with various application programs that are read from the memory 12.

In order to perform the velocity calculation and other processes, the controller 11 includes, as functional blocks, a GPS processor 21, a velocity calculator 22, an angle calculator 23, a height calculator 24, a position calculator 25, and a navigator 26.

A GPS antenna ANT of the PND 1 receives GPS signals from GPS satellites, and the GPS signals are sent to the GPS processor 21 of the controller 11.

The GPS processor 21 obtains present position data NPD1 by accurately measuring the present position of the vehicle on the basis of orbit data obtained by demodulating the GPS signals and data on the distances between the GPS satellites and the vehicle, and sends the present position data NPD1 to the navigator 26.

The navigator 26 reads map data of a region including the present position of the vehicle from the memory 12 on the basis of the present position data NPD1, and generates a map image including the present position, outputs the map image to the display 2, and thereby displays the map image.

The three-axis acceleration sensor 4 detects the accelerations $\alpha_x$, $\alpha_y$ and $\alpha_z$ with a sampling frequency of, for example, 50 Hz, and sends acceleration data AD that represents the acceleration $\alpha_z$ to the velocity calculator 22 of the controller 11.

The Y axis gyro sensor 5 detects the pitch rate $\omega_y$ with a sampling frequency of, for example, 50 Hz, and sends pitch rate data PD that represents the pitch rate $\omega_y$ to the velocity calculator 22 of the controller 11.

The velocity calculator 22 calculates the velocity V 50 times per second in accordance with equation (1) using the acceleration $\alpha_z$, which corresponds to the acceleration data AD supplied by the three-axis acceleration sensor 4, and the pitch rate $\omega_y$, which corresponds to the pitch rate data PD supplied by the Y axis gyro sensor 5, and sends velocity data VD that represents the velocity V to the position calculator 25.

The Z axis gyro sensor 6 detects the yaw rate $\omega_z$ at a sampling frequency of, for example, 50 Hz, and sends yaw rate data YD that represents the yaw rate $\omega_z$ to the angle calculator 23 of the controller 11.

The angle calculator 23 calculates the angle $\theta$ with which the vehicle turns to the right or to the left by multiplying the yaw rate $\omega_z$, which corresponds to the yaw rate data YD supplied by the Z axis gyro sensor 6, by a sampling period (in this case, 0.02 s), and sends angle data DD that represents the angle $\theta$ to the position calculator 25.

The position calculator 25 calculates the displacement from the previous position P0 to the present position P1 illustrated in FIG. 3 on the basis of the velocity V, which corresponds to the velocity data VD supplied by the velocity calculator 22, and the angle $\theta$, which corresponds to the angle data DD supplied by the angle calculator 23. The position calculator 25 calculates the present position P1 by adding the displacement to the previous position P0, and sends present position data NPD2, which represents the present position P1, to the navigator 26.

The barometric pressure sensor 7 detects the ambient pressure PR with a sampling frequency of, for example, 50 Hz, and sends barometric pressure data PRD that represents the barometric pressure PR to the height calculator 24.

The height calculator 24 calculates the height of the vehicle on the basis of the barometric pressure PR, which corresponds to the barometric pressure data PRD supplied by the barometric pressure sensor 7, and sends height data HD that represents the height of the vehicle to the navigator 26.

The navigator 26 reads map data of a region including the present position of the vehicle from the memory 12 on the basis of the present position data NPD2 supplied by the position calculator 25 and the height data HD supplied by the height calculator 24, generates a map image including the present position, outputs the map image to the display 2, and thereby displays the map image.

1-3. Velocity Calculation Process

Next, a velocity calculation process performed by the velocity calculator 22 will be described in detail. In this process, the velocity calculator 22 calculates the velocity V on the basis of the acceleration $\alpha_z$, which corresponds to the acceleration data AD supplied by the three-axis acceleration sensor 4, and the pitch rate $\omega_y$, which corresponds to the pitch rate data PD supplied by the Y axis gyro sensor 5.

Figure 8:
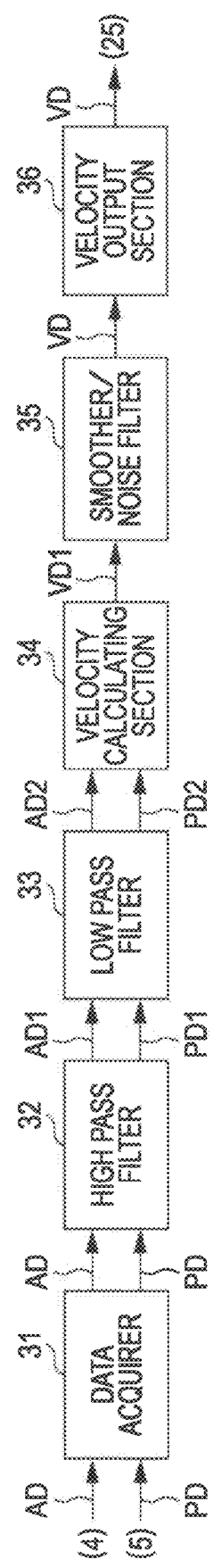
FIG. 8 is a block diagram illustrating the structure of a velocity calculator.

Referring to FIG. 8, in order to perform the velocity calculation, the velocity calculator 22 includes, as functional blocks, a data acquirer 31, a high pass filter 32, a low pass filter 33, a velocity calculating section 34, a smoother/noise filter 35, and a velocity output section 36.

The data acquirer 31 of the velocity calculator 22 acquires the acceleration data AD supplied by the three-axis acceleration sensor 4 and the pitch rate data PD supplied by the Y axis gyro sensor 5, and sends the acceleration data AD and the pitch rate data PD to the high pass filter 32.

The high pass filter 32 removes direct-current components from the acceleration data AD and the pitch rate data PD, which are supplied by the data acquirer 31, to generate acceleration data AD1 and pitch rate data PD1, and sends the acceleration data AD1 and the pitch rate data PD1 to the low pass filter 33.

The low pass filter 33 performs low pass filtering (described below) on the acceleration data AD1 and the pitch rate data PD1, which are supplied by the high pass filter 32, to generate acceleration data AD2 and pitch rate data PD2, and sends the acceleration data AD2 and the pitch rate data PD2 to the velocity calculating section 34.

The velocity calculating section 34 performs velocity calculation (described below) using the acceleration data AD2 and the pitch rate data PD2, which are supplied by the low pass filter 33, to generate velocity data VD1, and sends the velocity data VD1 to the smoother/noise filter 35.

The smoother/noise filter 35 performs smoothing and noise filtering (described below) on the velocity data VD1, which is supplied by the velocity calculating section 34, to generate velocity data VD, and sends the velocity data VD to the velocity output section 36.

The velocity output section 36 sends the velocity data VD, which is supplied by the smoother/noise filter 35 and represents the velocity V of the vehicle, to the position calculator 25.

Thus, the velocity calculator 22 calculates the velocity V of the vehicle on the basis of the acceleration data AD supplied by the three-axis acceleration sensor 4 and the pitch rate data PD supplied by the Y axis gyro sensor 5.

1-3-1. Low Pass Filtering

Next, low pass filtering, which is performed by the low pass filter 33 on the acceleration data AD1 and the pitch rate data PD1 supplied by the high pass filter 32, will be described in detail.

Figure 9:
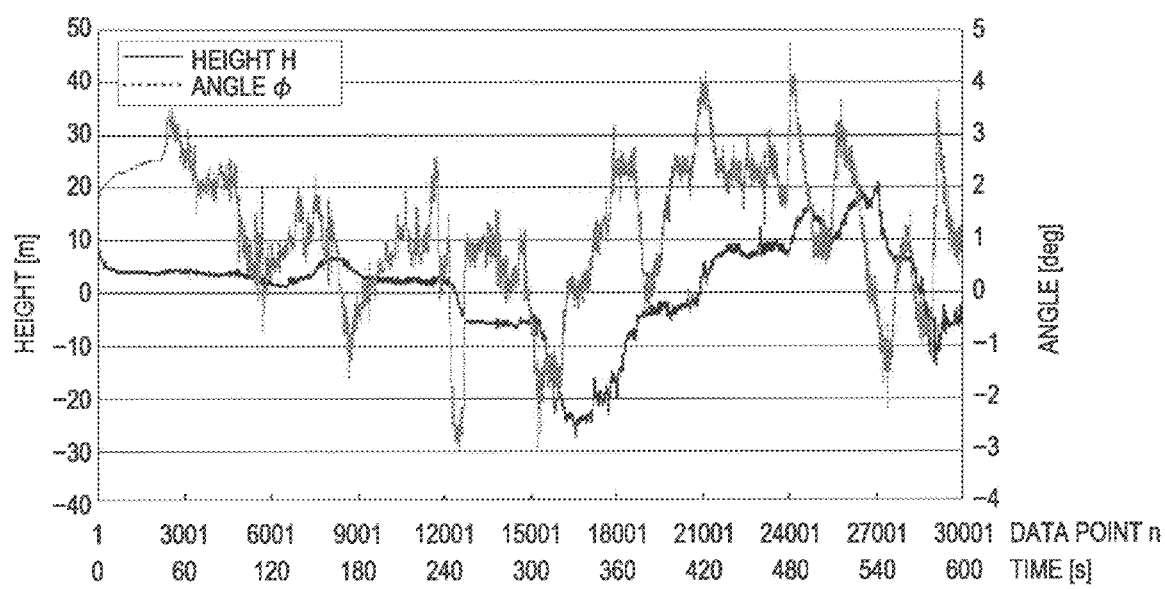
FIG. 9 is graph illustrating the relationship between a height and an angle.

FIG. 9 illustrates the relationship between a height H, which is based on the barometric pressure PR corresponding to the barometric pressure data PRD obtained by the barometric pressure sensor 7, and an angle $\phi$ around the Y axis with respect to a horizontal direction, which is based on the pitch rate $\omega_y$ corresponding to the pitch rate data PD obtained by the Y axis gyro sensor 5. Regarding the angle $\phi$, the upward direction with respect to the direction of travel (the X axis) is defined as positive.

Referring to FIG. 9, there is a correlation between the height H and the angle $\phi$ as can be seen from the fact that when the height H sharply decreases from about the 12001st data point (240 s), i.e., when the vehicle travels downhill, the angle $\phi$ sharply decreases from about 0.5 deg to about −2.5 deg.

When the height H changes, the angle $\phi$ changes in accordance with the change in the height H. Thus, the PND 1 can detect the undulation of a road surface in the direction of travel of the vehicle using the Y axis gyro sensor 5.

Figure 10A:
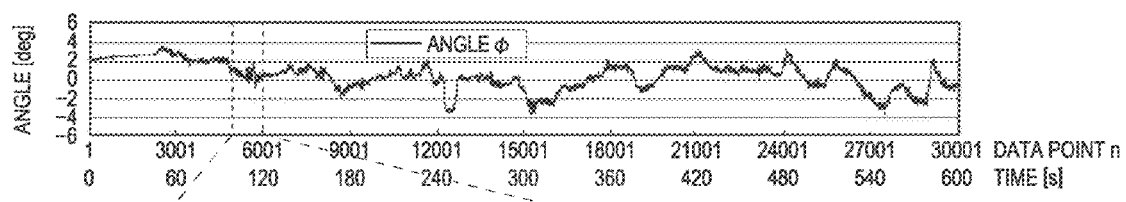
FIGS. 10A and 10B are graphs illustrating the angle of a road surface when a vehicle is traveling at a low velocity.
Figure 10B:
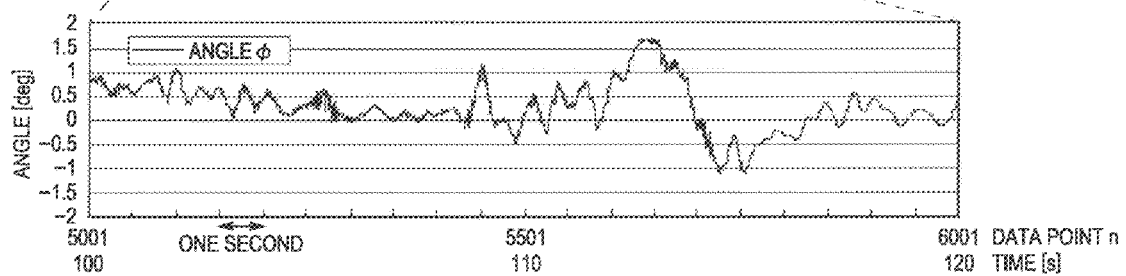

FIG. 10A illustrates the angle φ of FIG. 9. FIG. 10B illustrates the angle φ of FIG. 10A from the 5001st data point to the 6001st data point. During this time, the vehicle travels at a low velocity that is lower than 20 km/h. As can be seen from FIG. 10B, the angle φ oscillates once to twice per second.

Thus, when a vehicle is traveling at a low velocity lower than 20 km/h, the PND 1 mounted on the vehicle detects the angle φ, which is based on the pitch rate $\omega_y$ corresponding to the pitch rate data PD obtained by the Y axis gyro sensor 5, as an oscillation having a frequency in the range of 1 to 2 Hz.

Figure 11A:
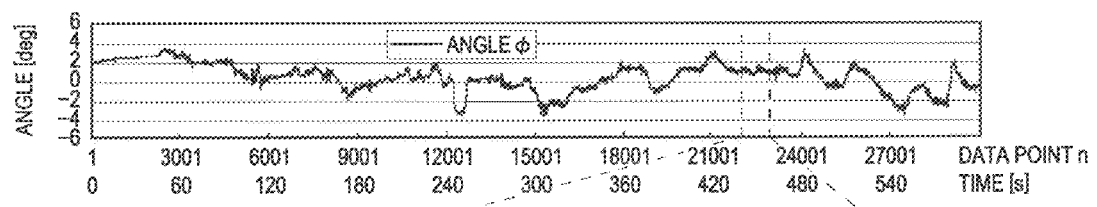
FIGS. 11A and 11B are graphs illustrating the angle of a road surface when a vehicle is traveling at a high velocity.
Figure 11B:
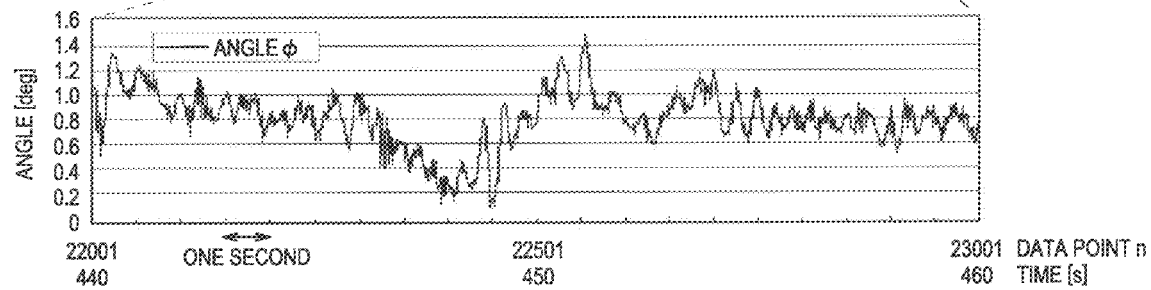

As with FIG. 10A, FIG. 11A illustrates the angle φ of FIG. 9. FIG. 11B illustrates the angle φ of FIG. 11A from the 22001st data point to the 23001st data point. During this time, the vehicle travels at a high velocity that is higher than 60 km/h.

As can be seen from FIG. 11B, when the vehicle is traveling at a high velocity higher than 60 km/h, the PND 1 also detects the angle φ, which is based on the pitch rate $\omega_y$ corresponding to the pitch rate data PD obtained by the Y axis gyro sensor 5, as an oscillation having a frequency in the range of 1 to 2 Hz.

Figure 12:
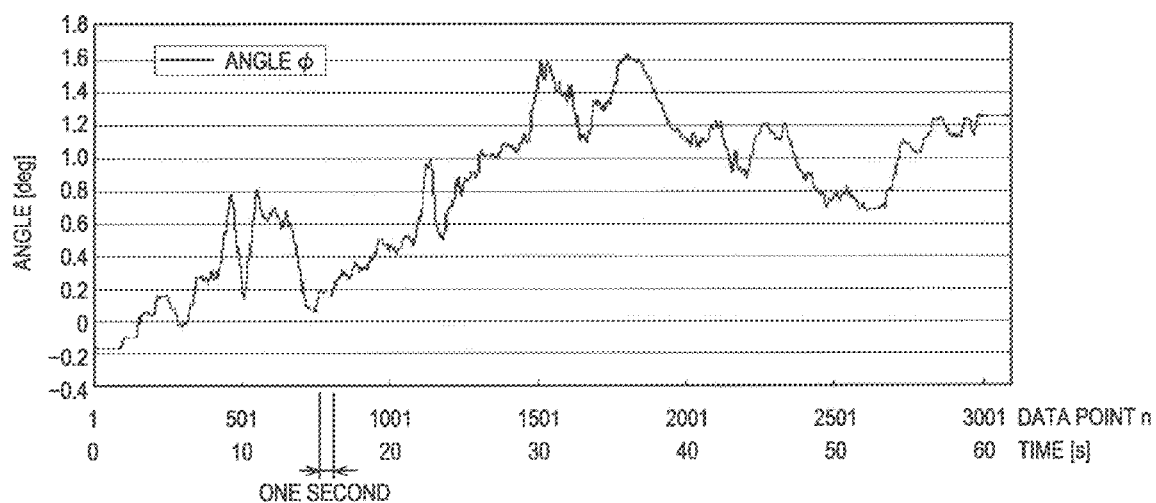
FIG. 12 is a graph illustrating the angle of a road surface when a vehicle is traveling at a very low velocity.

Moreover, as illustrated in FIG. 12, when the vehicle is traveling at a very low velocity that is lower than 10 km/h, the PND 1 also detect the angle φ, which is based on the pitch rate $\omega_y$ corresponding to the pitch rate data PD obtained by the Y axis gyro sensor 5, as an oscillation having a frequency in the range of 1 to 2 Hz.

Therefore, using the Y axis gyro sensor 5, the PND 1 detects the pitch rate $\omega_y$ as an oscillation having a frequency in the range of 1 to 2 Hz irrespective of the velocity of the vehicle.

Figure 13:
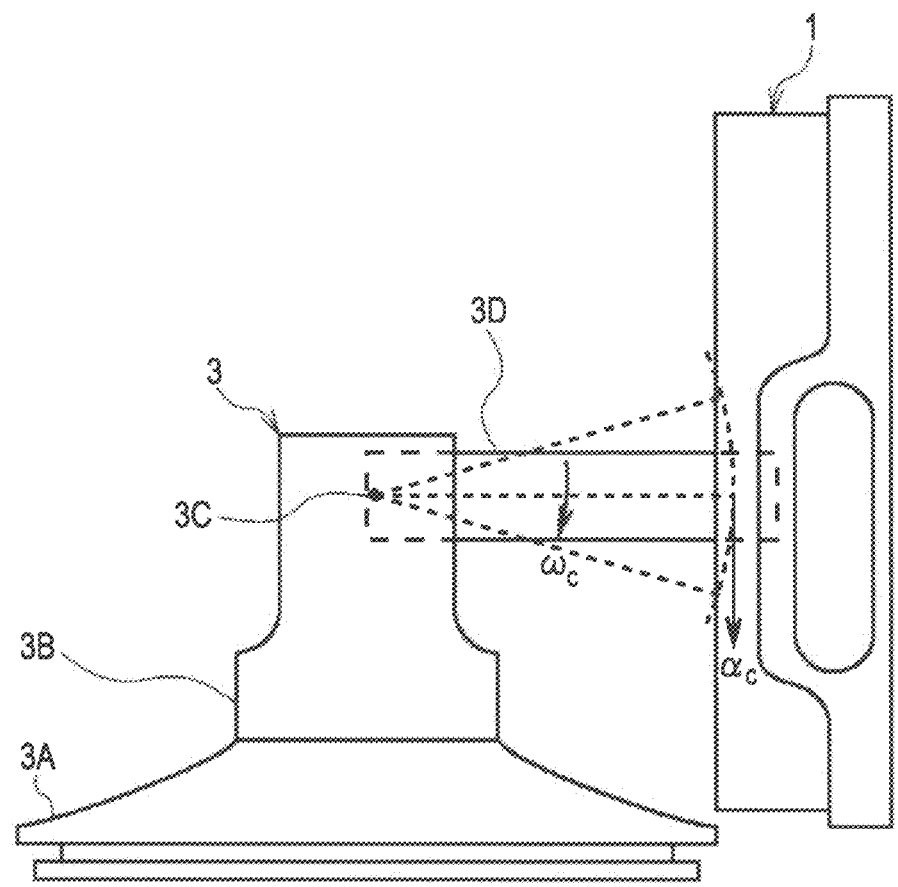
FIG. 13 is a diagram illustrating a vibration due to a cradle.

The PND 1 is supported by the cradle 3, which is attached to the dashboard of the vehicle with the suction cup 3A. Referring to FIG. 13, the cradle 3 includes a body 3B, which is disposed on the suction cup 3A, and a PND supporter 3D. One end of the PND supporter 3D is supported by the body 3B at a support point 3C that is located at a predetermined height, and the PND 1 is supported by the PND supporter 3D at the other end of the PND supporter 3D.

Therefore, when the vehicle vibrates due to the undulation of a road surface, the PND 1 vibrates up and down around the support point 3C of the PND supporter 3D with, for example, an acceleration $\alpha_c$ and an angular velocity $\omega_c$.

Therefore, in practice, the three-axis acceleration sensor 4 detects an acceleration (hereinafter referred to as a total acceleration) $\alpha_{cz}$ that is the sum of the acceleration $\alpha_z$ along the Z axis (FIG. 1), which is generated by the vibration of the vehicle due to the undulation of the road surface, and the acceleration $\alpha_c$, which is generated by the vibration of the PND 1 around the support point 3C of the PND supporter 3D.

The Y axis gyro sensor 5 detects an angular velocity (hereinafter referred to as a total angular velocity) $\omega_{cy}$ that is the sum of the pitch rate $\omega_y$ around the Y axis (FIG. 1), which is generated by the vibration of the vehicle due to the undulation of the road surface, and the angular velocity $\omega_c$, which is generated by the vibration of the PND 1 around the support point 3C of the PND supporter 3D.

Therefore, the low pass filter 33 acquires the acceleration data AD1, which represents the total angular velocity $\omega_{cy}$, and the pitch rate data PD1, which represents the total acceleration $\alpha_{cz}$, through the data acquirer 31 and the high pass filter 32.

Figure 14:
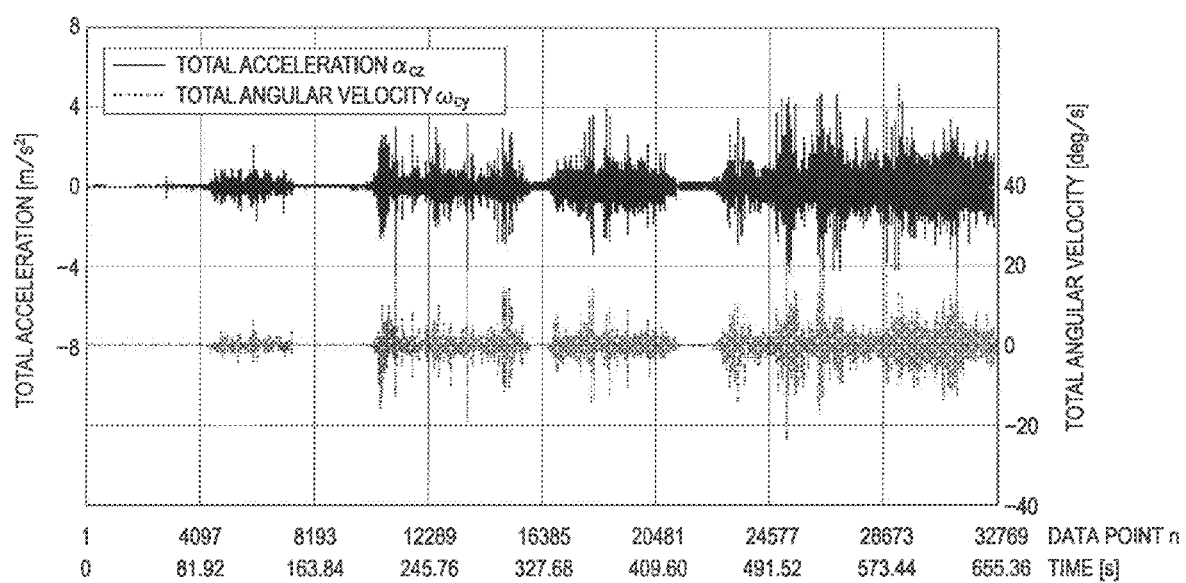
FIG. 14 is a graph illustrating a total acceleration and a total angular velocity after being high pass filtered.

FIG. 14 illustrates the total acceleration $\alpha_{cz}$ and the total angular velocity $\omega_{cy}$, which respectively correspond to the acceleration data AD1 and the pitch rate data PD1 that have been high pass filtered by the high pass filter 32. FIGS. 15A to 15F are graphs illustrating the total angular velocity $\omega_{cy}$ of FIG. 14, which has been Fourier transformed for every 4096 data points.

In particular, FIG. 15A is a graph of the total angular velocity $\omega_{cy}$ of FIG. 14 from the 1st data point to the 4096th data point, which has been Fourier transformed. Likewise, FIGS. 15B, 15C, and 15D are graphs of the total angular velocity $\omega_{cy}$ of FIG. 14 from the 4097th data point to the 8192nd data point, the 8193rd data point to the 12288th data point, and the 12289th data point to the 16384th data point, respectively, each of which has been Fourier transformed.

FIGS. 15E, 15F, 15G, and 15H, are graphs of the total angular velocity $\omega_{cy}$ of FIG. 14 from the 16385th data point to the 20480th data point, the 20481st data point to the 24576th data point, the 24577th data point to the 28672nd data point, and the 28673rd data point to the 32768th data point, respectively, each of which has been Fourier transformed.

As can be clearly seen from FIGS. 15C to 15H, a frequency component in the range of 1 to 2 Hz and a frequency component of about 15 Hz have large values.

That is, the Y axis gyro sensor 5 of the PND 1 detects the total angular velocity $\omega_{cy}$ that is the sum of the pitch rate $\omega_y$, which oscillates with a frequency in the range of 1 to 2 Hz due to the aforementioned undulation of the road surface, and the angular velocity $\omega_c$, which oscillates with a frequency of about 15 Hz due to the cradle 3 that supports the PND 1.

FIGS. 16A to 16F are graphs illustrating the total acceleration $\alpha_{cz}$ of FIG. 14, which has been Fourier transformed for every 4096 data points.

Figure 16A:
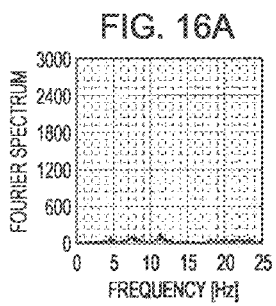
FIGS. 16A to 16H are graphs illustrating the total acceleration that has been Fourier transformed for every 4096 data points.
Figure 16B:
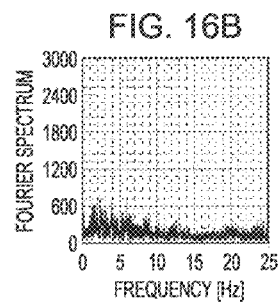
Figure 16C:
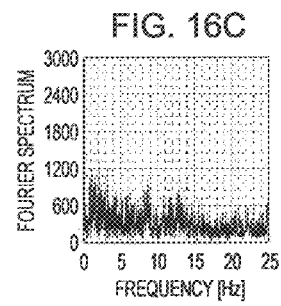
Figure 16D:
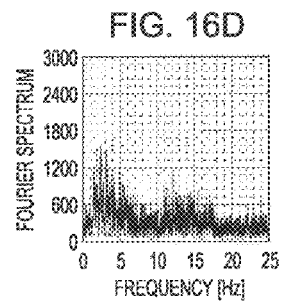
Figure 16E:
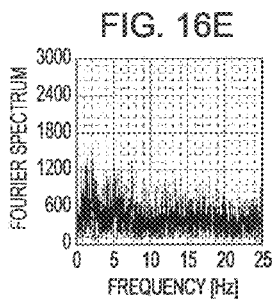
Figure 16F:
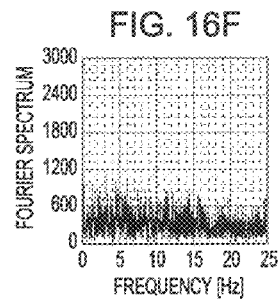
Figure 16G:
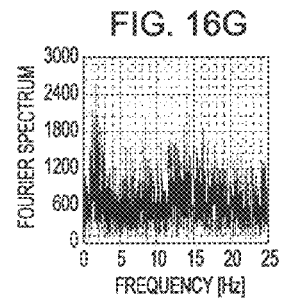

In particular, FIG. 16A is a graph of the total acceleration $\alpha_{cz}$ of FIG. 14 from the 1st data point to the 4096th data point, which has been Fourier transformed. Likewise, FIGS. 16B, 16C, and 16D are graphs of the total acceleration $\alpha_{cz}$ of FIG. 14 from the 4097th data point to the 8192nd data point, the 8193rd data point to the 12288th data point, and the 12289th data point to the 16384th data point, respectively, each of which has been Fourier transformed.

FIGS. 16E, 16F, 16G, and 16H, are graphs of the total acceleration $\alpha_{cz}$ of FIG. 14 from the 16385th data point to the 20480th data point, the 20481st data point to the 24576th data point, the 24577th data point to the 28672nd data point, and the 28673rd data point to the 32768th data point, respectively, each of which has been Fourier transformed.

Considering the fact that the total angular velocity $\omega_{cy}$ (FIGS. 15C to 15H) has the frequency component in the range of 1 to 2 Hz and the frequency component of about 15 Hz, it is estimated that the total acceleration $\alpha_{cz}$ also has a frequency component in the range of 1 to 2 Hz and a frequency component of about 15 Hz.

That is, the three-axis acceleration sensor 4 of the PND 1 detects the total acceleration $\alpha_{cz}$, which is the sum of the acceleration $\alpha_z$, which oscillates with a frequency in the range of 1 to 2 Hz due to the aforementioned undulation of the road surface, and the acceleration $\alpha_c$, which oscillates with a frequency of about 15 Hz due to the cradle 3 that support the PND 1.

Therefore, the low pass filter 33 performs low pass filtering on the acceleration data AD1 and the pitch rate data PD1, which are supplied by the high pass filter 32, so as to remove the frequency component of about 15 Hz, i.e., the acceleration $\alpha_c$ and the angular velocity $\omega_c$ that are generated due to the cradle 3 that supports the PND 1.

Figure 16H:
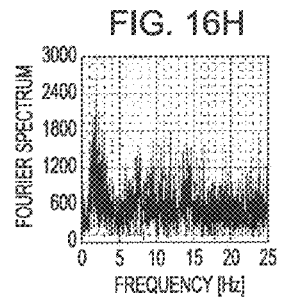
Figure 17A:
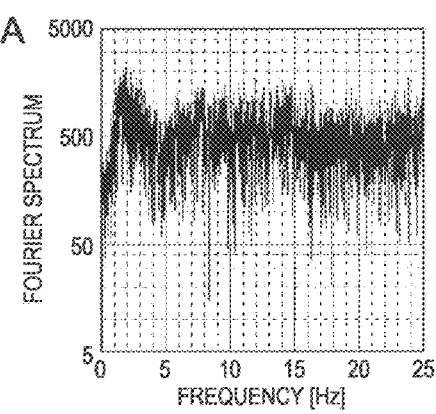
FIGS. 17A to 17D are graphs illustrating a comparison of low pass filtering performed on the total acceleration.
Figure 17B:
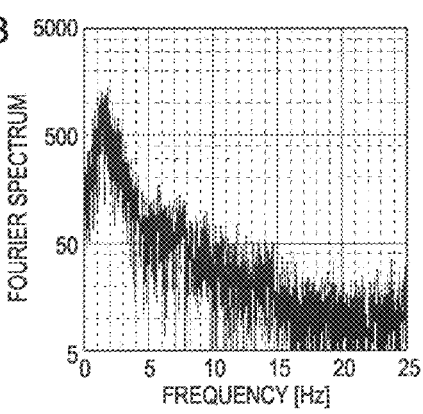
Figure 17C:
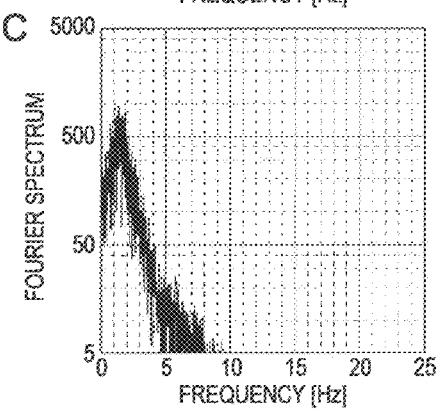
Figure 17D:
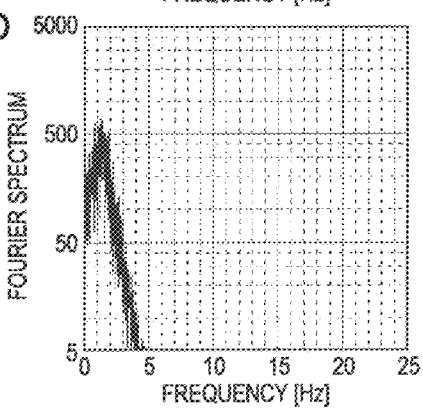

FIG. 17A is a graph of data that is the same as that of FIG. 16H, which is plotted with a logarithmic vertical axis. FIGS. 17B, 17C and 17D are graphs of the total acceleration $\alpha_{cz}$ from the 28673rd data point to the 32768th data point, on which infinite impulse response (IIR) filtering with a cutoff frequency of 2 Hz has been performed twice, four times, and six times, respectively, and on which Fourier transformation has been performed.

FIG. 18A is a graph of data that is the same as that of FIG. 15H, which is plotted with a logarithmic vertical axis. FIGS. 18B, 18C and 18D are graphs of the total angular velocity $\omega_{cy}$ from the 28673rd data point to the 32768th data point, on which infinite impulse response (IIR) filtering with a cutoff frequency of 2 Hz is performed twice, four times, and six times, respectively, and on which Fourier transformation is performed.

As can be seen from FIGS. 17B to 17D and FIGS. 18B to 18D, the PND 1 can remove the frequency component of about 15 Hz from the acceleration data AD1 and the pitch rate data PD1, which are supplied by the high pass filter 32, by performing the IIR filtering with a cutoff frequency of 2 Hz four times or more on the acceleration data AD1 and the pitch rate data PD1.

Therefore, the low pass filter 33 according to the embodiment performs the IIR filtering with a cutoff frequency of 2 Hz four times on the acceleration data AD1 and the pitch rate data PD1, which are supplied by the high pass filter 32, to generate acceleration data AD2 and pitch rate data PD2, and sends the acceleration data AD2 and the pitch rate data PD2 to the velocity calculating section 34.

Thus, the low pass filter 33 removes the acceleration $\alpha_c$, which is generated due to the vibration of the PND supporter 3D around the support point 3C of the cradle 3, from the total acceleration $\alpha_{cz}$, and thereby extracts only the acceleration $\alpha_z$, which is generated due to the undulation of the road surface.

Moreover, the low pass filter 33 removes the angular velocity $\omega_c$, which is generated due to the vibration of the PND supporter 3D around the support point 3C of the cradle 3, from the total angular velocity $\omega_{cy}$, and thereby extracts only the pitch rate $\omega_y$, which is generated due to the undulation of the road surface.

1-3-2. Velocity Calculation

Next, velocity calculation performed by the velocity calculating section 34 will be described in detail. The velocity calculating section 34 calculates the velocity V on the basis of the acceleration data AD2 and the pitch rate data PD2 supplied by the low pass filter 33.

Figure 19:
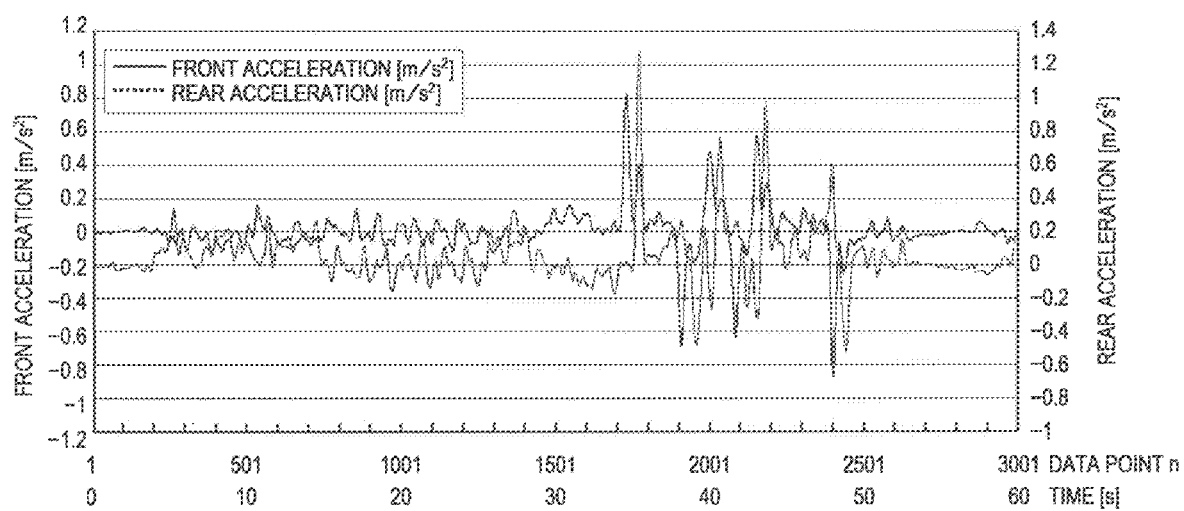
FIG. 19 is a graph illustrating the relationship between a front acceleration and a rear acceleration when the vehicle is traveling at a low velocity.
Figure 20A:
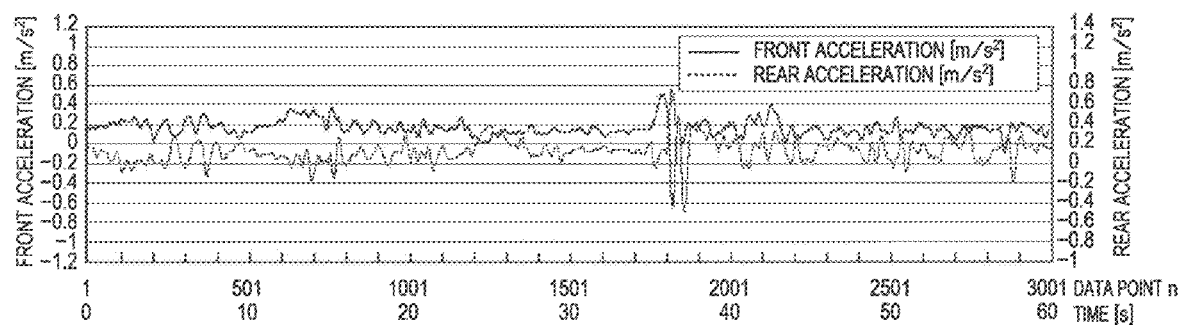
FIGS. 20A and 20B are graphs illustrating the relationship between the front acceleration and the rear acceleration when the vehicle is traveling at a medium velocity and at a high velocity.
Figure 20B:
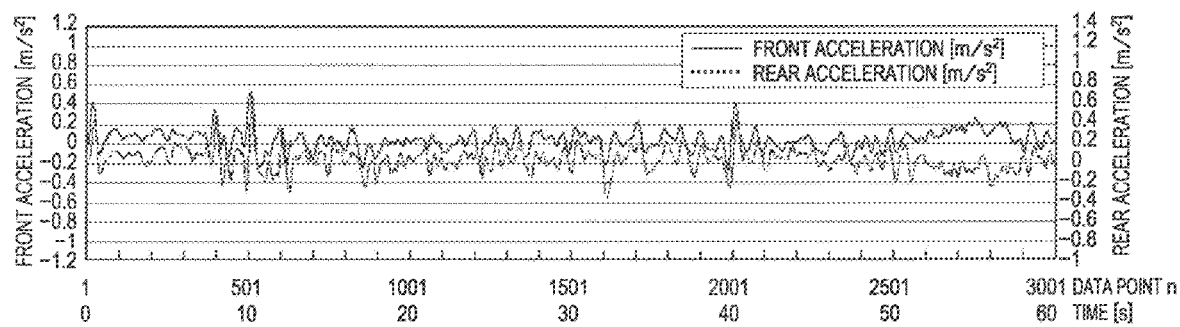

FIGS. 19, 20A, and 20B respectively illustrate the acceleration $\alpha_z$ corresponding to the acceleration data AD2, which is generated when the vehicle is traveling at a low velocity lower than 20 km/h, at a medium velocity equal to or higher than 20 km/h and lower than 60 km/h, and at a high velocity equal to or higher than 60 km/h. For each of the velocity ranges, a case in which the PND 1 is placed on the dashboard a front part of the vehicle and a case in which the PND 1 is placed near to the rear window in a rear part of the vehicle are illustrated.

In FIGS. 19, 20A, and 20B, the acceleration $\alpha_z$ that is detected by the PND1 placed in the front part of the vehicle is referred to as the front acceleration and the acceleration $\alpha_z$ that is detected by the PND1 placed in the rear part of the vehicle is referred to as the rear acceleration.

As can be seen from FIGS. 19, 20A, and 20B, the phase of the rear acceleration is delayed with respect to the phase of the front acceleration irrespective of the velocity of the vehicle. This phase delay is approximately equal to the wheelbase divided by the velocity of the vehicle, the wheelbase being the distance between the front wheel axis and the rear wheel axis of the vehicle.

FIGS. 21A to 21C respectively illustrate an example of a simulation result representing the relationship between the acceleration $\alpha_z$ corresponding to the acceleration data AD2 and the pitch rate $\omega_y$ corresponding to the pitch rate data PD2 when the PND 1 is placed on the dashboard (at a position away from the front wheel axis by 30% of the wheelbase), at the center, and at a position above the rear wheel axis of the vehicle. FIGS. 21D to 21F illustrate the velocity V calculated using equation (1) on the basis of the acceleration $\alpha_z$ and the pitch rate $\omega_y$ obtained from the simulation result illustrated in FIGS. 21A to 21C.

In this simulation, it is assumed that a vehicle having a wheelbase of 2.5 m travels at a velocity of 5 m/s on a road surface having a sinusoidal undulation with an amplitude of 0.1 m and a wavelength of 20 m.

As can be seen from FIGS. 21A to 21C, the phase of the acceleration $\alpha_z$ is delayed when the position of the PND 1 is moved toward the back of the vehicle. In contrast, the phase of the pitch rate $\omega_y$ is not delayed irrespective of the position of the PND 1 on the vehicle.

Therefore, as illustrated in FIG. 21B, the phase difference between the acceleration $\alpha_z$ and the pitch rate $\omega_y$ is negligible when the PND 1 is placed at the center of the vehicle. Thus, as illustrated in FIG. 21E, the velocity V, which is calculated using equation (1), is substantially constant.

However, as illustrated in FIGS. 21A and 21C, when the position of the PND 1 is moved forward or backward from the center of the vehicle, the phase difference between the acceleration $\alpha_z$ and the pitch rate $\omega_y$ increases. Therefore, as illustrated in FIGS. 21D and 21F, due to the phase difference between the acceleration $\alpha_z$ and the pitch rate $\omega_y$, the velocity V calculated using equation (1) has a larger error than the velocity V calculated when the PND 1 is placed at the center of the vehicle (FIG. 21E).

In particular, when the velocity V of the vehicle is lower than 20 km/h, the phase difference between the acceleration $\alpha_z$ and the pitch rate $\omega_y$ is large, so that the calculation error of the velocity V increases.

Figure 22:
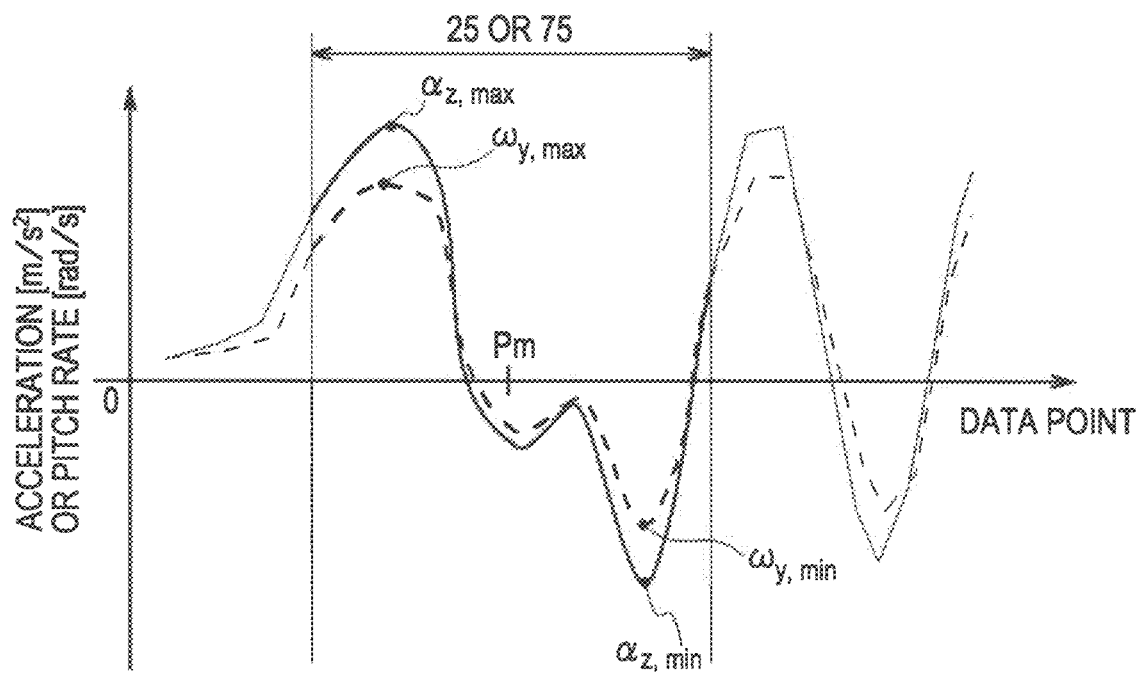
FIG. 22 is a graph illustrating the relationship between the maximum value and the minimum value.

Therefore, referring to FIG. 22, the velocity calculating section 34 extracts the maximum value and the minimum value of the acceleration $\alpha_z$, which corresponds to the acceleration data AD2 supplied by the low pass filter 33, from a range of 25 or 75 data points centered around a data point Pm that corresponds to the previous position P0 (FIG. 3). The maximum and minimum values will be referred to as the maximum acceleration $\alpha_{z,max}$ and the minimum acceleration $\alpha_{z,min}$, respectively.

Moreover, the velocity calculating section 34 extracts the maximum value and the minimum value of the pitch rate $\omega_y$, which corresponds to the pitch rate data PD2 supplied by the low pass filter 33, from a range of 25 or 75 data points centered around the data point Pm. The maximum and minimum values will be referred to as the maximum pitch rate $\omega_{y,max}$ and the minimum pitch rate $\omega_{y,min}$, respectively.

That is, the velocity calculating section 34 extracts the maximum and minimum accelerations $\alpha_{z,max}$ and $\alpha_{z,min}$ and the maximum and minimum pitch rates $\omega_{y,max}$ and $\omega_{y,min}$ from a range that is larger than the largest possible phase difference that may be generated between the acceleration $\alpha_z$ and the pitch rate $\omega_y$.

The velocity calculating section 34 calculates the velocity V in the direction of travel at the previous position P0 (FIG. 3) in accordance with the following equation (3), which is rewritten from equation (1), using the maximum and minimum accelerations $\alpha_{z,max}$ and $\alpha_{z,min}$, which are extracted from the acceleration data AD2, and the maximum and minimum pitch rates $\omega_{y,max}$ and $\omega_{y,min}$, which are extracted from pitch rate data PD2, to generate velocity data VD1, and sends the velocity data VD1 to the smoother/noise filter 35.

$$V = \frac{\alpha_{z,max} - \alpha_{z,min}}{\omega_{y,max} - \omega_{y,min}} \quad (3)$$

Thus, even when there is a phase difference between the acceleration $\alpha_z$ and the pitch rate $\omega_y$, the velocity calculating section 34 can calculate, by using equation (3), the velocity V from which the influence of the phase delay is removed.

Figure 23:
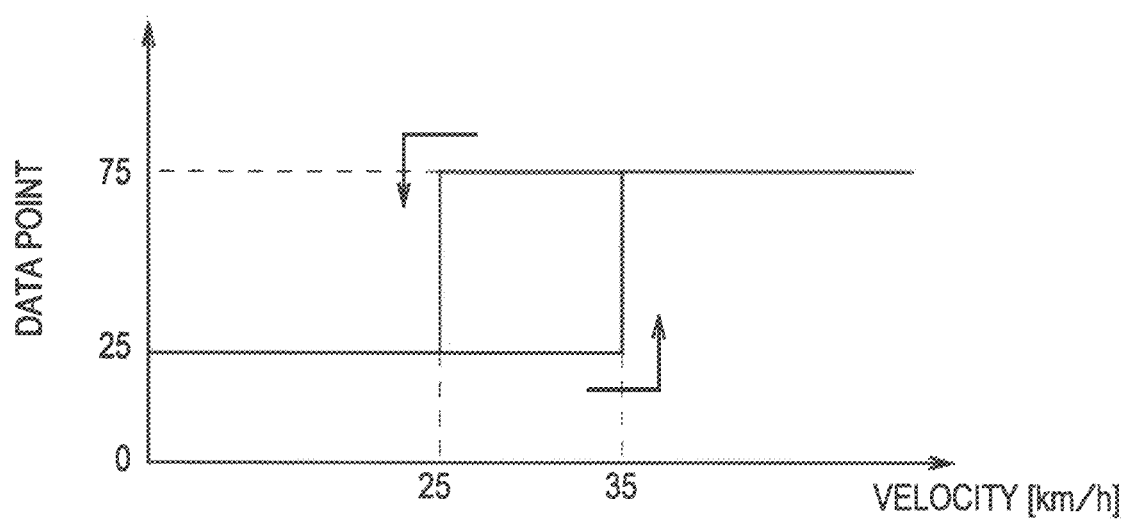
FIG. 23 is a graph illustrating the relationship between the velocity and the number of data points.

Referring to FIG. 23, when calculating the velocity V in the direction of travel at the previous position P0 while the vehicle is accelerating, the velocity calculating section 34 uses a range of 25 data points if the velocity $V_{n-1}$ at the second previous position (not shown) (hereinafter referred to as a former velocity) is in the range of 0 km/h to 35 km/h, and the velocity calculating section 34 uses a range of 75 data points if the former velocity $V_{n-1}$ is higher than 35 km/h.

When calculating the velocity V in the direction of travel at the previous position P0 while the vehicle is decelerating, the velocity calculating section 34 uses a range of 75 data points if the former velocity $V_{n-1}$ is equal to or higher than 25 km/h, and the velocity calculating section 34 uses a range of 25 data points if the former velocity $V_{n-1}$ is lower than 25 km/h.

Thus, the velocity calculating section 34 switches the data range between 25 data points and 75 data points in accordance with the velocity V when extracting the maximum and minimum accelerations $\alpha_{z,max}$ and $\alpha_{z,min}$ and the maximum and minimum pitch rates $\omega_{y,max}$ and $\omega_{y,min}$.

When the velocity V of the vehicle is equal to or lower than, for example, 25 km/h, the acceleration $\alpha_z$ and the pitch rate $\omega_y$ change sharply in response to a slight change in the road surface. Therefore, the velocity calculating section 34 uses a narrow data range in order to deal with a sharp change.

When the velocity of the vehicle is equal to or higher than 35 km/h, the influence of a suspension of the vehicle is large and the acceleration $\alpha_z$ and the pitch rate $\omega_y$ change slowly. Therefore, the velocity calculating section 34 sets a wide data range in order to deal with a slow change.

Thus, the velocity calculating section 34 changes the data range, from which the maximum and minimum accelerations $\alpha_{z,max}$ and $\alpha_{z,min}$ and the maximum and minimum pitch rates $\omega_{y,max}$ and $\omega_{y,min}$ are extracted, in accordance with the velocity V of the vehicle, so that the conditions of the road surface and the vehicle that change in accordance with the velocity V can be taken into account, whereby the velocity V can be calculated more precisely.

Moreover, when calculating the maximum and minimum accelerations $\alpha_{z,max}$ and $\alpha_{z,min}$ and the maximum and minimum pitch rates $\omega_{y,max}$ and $\omega_{y,min}$, the velocity calculating section 34 changes the data range with a hysteresis between the case when the vehicle is accelerating and the case when the vehicle is decelerating.

Thus, frequency of changing of the data range around a switching velocity is reduced as compared to a case in which the velocity calculating section 34 calculates the velocity V by changing the data range without a hysteresis. As a result, the velocity calculating section 34 can reduce the calculation error of the velocity V that may occur due to frequent switching of the data range, whereby the velocity V can be calculated more precisely.

1-3-3. Smoothing and Noise Filtering

Next, smoothing and noise filtering performed by the smoother/noise filter 35 on the velocity data VD1, which has been calculated by the velocity calculating section 34, will be described in detail.

The smoother/noise filter 35 performs low pass filtering, which is first-order IIR with a variable cutoff frequency, on the velocity data VD1 supplied by the velocity calculating section 34.

To be specific, when calculating the velocity V in the direction of travel at the previous position P0, the smoother/noise filter 35 determines the cutoff frequency on the basis of the former velocity $V_{n-1}$.

When the velocity of the vehicle is equal to or higher than, for example, 60 km/h, the velocity V calculated by the velocity calculating section 34 of the PND 1 includes a large amount of noise, and thereby the velocity V considerably deviates. Therefore, the smoother/noise filter 35 uses a low pass filter having a low cutoff frequency when the former velocity $V_{n-1}$ is equal to or higher than 60 km/h.

In contrast, the smoother/noise filter 35 uses a low pass filter having a high cutoff frequency when the former velocity $V_{n-1}$ is lower than 60 km/h.

When the velocity V calculated by the velocity calculating section 34 is lower than, for example, 10 km/h, the pitch rate $\omega_y$, which is the denominator of equation (1) or (3), may be small, so that the velocity V calculated using the equation (1) or (3) may become considerably higher than the real value.

Therefore, the smoother/noise filter 35 acquires the acceleration data AD2 and the pitch rate data PD2, which have been low pass filtered, from the low pass filter 33. If the pitch rate $\omega_y$ corresponding to the pitch rate data PD2 is lower than a predetermined threshold, the smoother/noise filter 35 determines that the velocity V is excessively high and sets the value of the velocity V, after being low pass filtered, at 0.

Figure 24A:
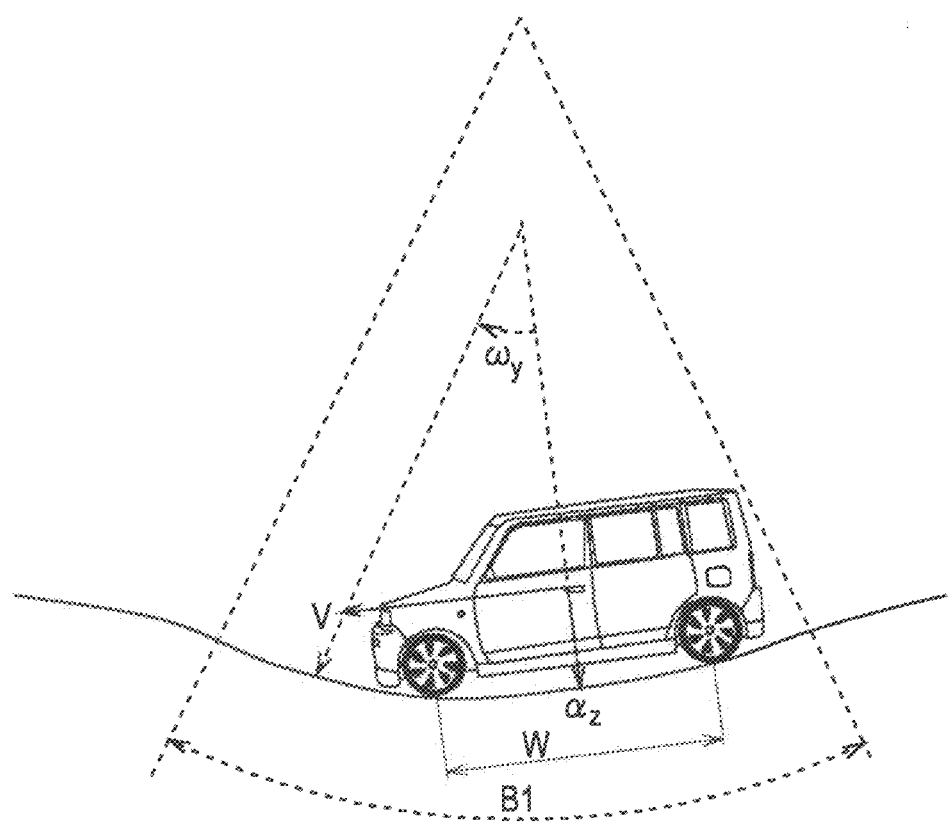
FIGS. 24A and 24B are diagrams illustrating accelerations and pitch rates for arcs having different lengths.

If an arc B1 of the undulation of a road surface is larger than the wheelbase W of the vehicle as illustrated in FIG. 24A, the PND 1 can accurately calculate the velocity V using the aforementioned fundamental principle.

Figure 24B:
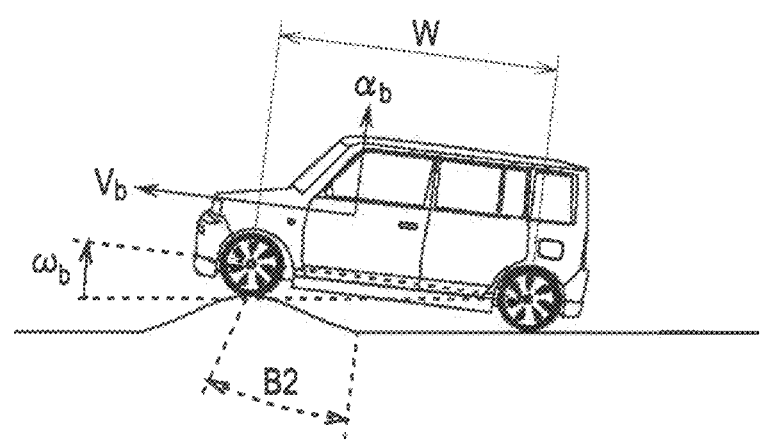

However, if an arc B2 of the undulation of a road surface is smaller than the wheelbase W of the vehicle as illustrated in FIG. 24B, an acceleration $\alpha_b$ in a vertical direction of the vehicle and an angular velocity $\omega_b$ around the Y axis centered around the rear wheel of the vehicle are generated when the front wheel of the vehicle rolls over the undulation.

At this time, the three-axis acceleration sensor 4 and the Y axis gyro sensor 5 of the PND 1 detect the acceleration $\alpha_b$ and the angular velocity $\omega_b$ (FIG. 24B), instead of detecting the acceleration $\alpha_z$ and the pitch rate $\omega_y$ (FIG. 24A), which are generated due to a vibration having a frequency in the range of 1 to 2 Hz due to the undulation of the road surface.

The acceleration $\alpha_b$ is larger than the acceleration $\alpha_z$, which is generated when the arc B1 of the undulation of the road surface is larger than the wheelbase W of the vehicle. The angular velocity $\omega_b$ is higher than the pitch rate $\omega_y$, which is generated when the arc B1 of the undulation of the road surface is larger than the wheelbase W of the vehicle.

A velocity $V_b$ (hereinafter also referred to as a small-arc velocity) is calculated using equation (1) or (3) on the basis of the acceleration $\alpha_b$ and the angular velocity $\omega_b$, which are generated when the arc B2 of the undulation of the road surface is smaller than the wheelbase W of the vehicle.

Because the acceleration $\alpha_b$ changes more than the angular velocity $\omega_b$, the velocity $V_b$ is considerably higher than the velocity V, which is calculated using equation (1) or (3) on the basis of the acceleration $\alpha_z$ and the angular velocity $\omega_y$ generated when the arc B1 of the undulation of the road surface is larger than the wheelbase W of the vehicle.

Therefore, when the arc B2 of the undulation of the road surface is smaller than the wheelbase W of the vehicle, the velocity calculator 22 of the PND 1 calculates the small-arc velocity $V_b$ on the basis of the acceleration $\alpha_b$ and the angular velocity $\omega_b$, which leads to calculating the velocity V as an excessively high value.

The smoother/noise filter 35 acquires, from the low pass filter 33, the acceleration data AD2 and the pitch rate data PD2, which have been low pass filtered, and determines whether or not the acceleration $\alpha_z$ corresponding to the acceleration data AD2 and pitch rate $\omega_y$ corresponding to the pitch rate data PD2 are higher than predetermined thresholds.

If the acceleration $\alpha_z$ corresponding to the acceleration data AD2 and the pitch rate $\omega_y$ corresponding to the pitch rate data PD2 are higher than the predetermined thresholds, the smoother/noise filter 35 determines that the velocity V is excessively high and uses the former velocity $V_{n-1}$ instead of the velocity V that has been low pass filtered. That is, the smoother/noise filter 35 uses the former velocity $V_{n-1}$ if the velocity V is excessively high when the velocity of the vehicle is not very low, because it is likely that the velocity V is not accurate in such a case.

Thus, if the velocity V that has been low pass filtered is excessively high, the smoother/noise filter 35 sets the velocity V at 0 when the velocity of the vehicle is very low and sets the velocity V at the former velocity $V_{n-1}$ when the velocity of the vehicle is not very low, whereby the velocity V can be calculated more accurately.

1-4. Process of Position Calculation using Velocity Calculation

Figure 25:
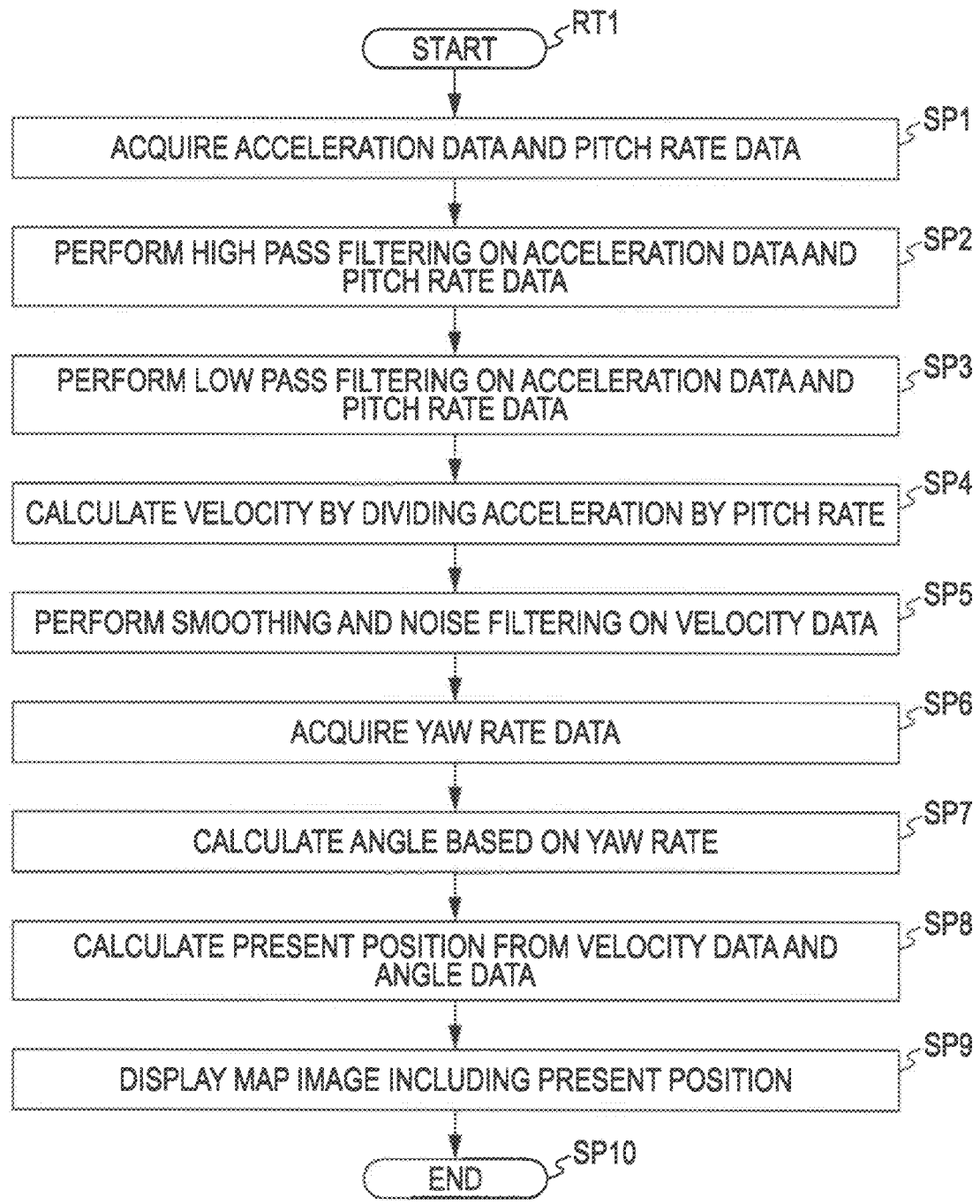
FIG. 25 is a flowchart illustrating a process of calculating the present position using velocity calculation.

Referring to the flowchart of FIG. 25, a process of position calculation using the aforementioned velocity calculation, which is performed by the controller 11 of the PND 1, will be described.

The controller 11 starts the process from a start step of a routine RT1. In step SP1, the data acquirer 31 of the velocity calculator 22 acquires the acceleration data AD detected by the three-axis acceleration sensor 4 and the pitch rate data PD detected by the Y axis gyro sensor 5, and the controller 11 proceeds to step SP2.

In step SP2, the high pass filter 32 of the velocity calculator 22 of the controller 11 performs high pass filtering on the acceleration data AD and the pitch rate data PD, and the controller 11 proceeds to step SP3.

In step SP3, the low pass filter 33 of the velocity calculator 22 of the controller 11 performs low pass filtering, which is fourth-order IIR filtering with a cutoff frequency of, for example, 1 Hz, on the acceleration data AD1 and the pitch rate data PD1, which have been high pass filtered, and the controller 11 proceeds to step SP4.

In step SP4, the velocity calculating section 34 of the velocity calculator 22 of the controller 11 calculates the velocity V using equation (3) on the basis of the acceleration $\alpha_z$ corresponding to the acceleration data AD2 and the pitch rate $\omega_y$ corresponding to the pitch rate data PD2, which have been low pass filtered, and the controller 11 proceeds to step SP5.

In step SP5, the controller 11 performs smoothing and noise filtering on the velocity data VD representing the velocity V, which has been calculated in step SP4.

To be specific, the controller 11 performs low pass filtering having a variable cutoff frequency on the velocity data VD1 representing the velocity V, which has been calculated in step SP4.

If the controller 11 determines that the velocity V that has been low pass filtered is excessively high, the controller 11 sets the velocity V at 0 when the velocity of the vehicle is lower than, for example, 10 km/h and sets the velocity V at the former velocity $V_{n-1}$ when the velocity of the vehicle is equal to or higher than 10 km/h, and the controller 11 proceeds to step SP6.

In step SP6, the angle calculator 23 of the controller 11 acquires the yaw rate data YD detected by the Z axis gyro sensor 6, and the controller 11 proceeds to step SP7.

In step SP7, the angle calculator 23 of the controller 11 calculates the angle data DD representing the angle θ by multiplying the yaw rate $\omega_z$ corresponding to the yaw rate data YD by the sampling period 0.02 s, and the controller 11 proceeds to step SP8.

In step SP8, the controller 11 calculates the present position data NPD2 on the basis of the velocity data VD, on which smoothing and noise filtering have been performed in step SP5, and the angle data DD, which has been calculated in step SP7, and the controller 11 proceeds to step SP9.

In step SP9, the controller 11 reads from the memory 12 a map data including the present position of the vehicle on the basis of the present position data NPD2 supplied by the position calculator 25, generates a map image including the present position, and outputs the map image to the display 2, and the controller 11 proceeds to step SP10 where the process finishes.

1-5. Measurement Results

Figure 35B:
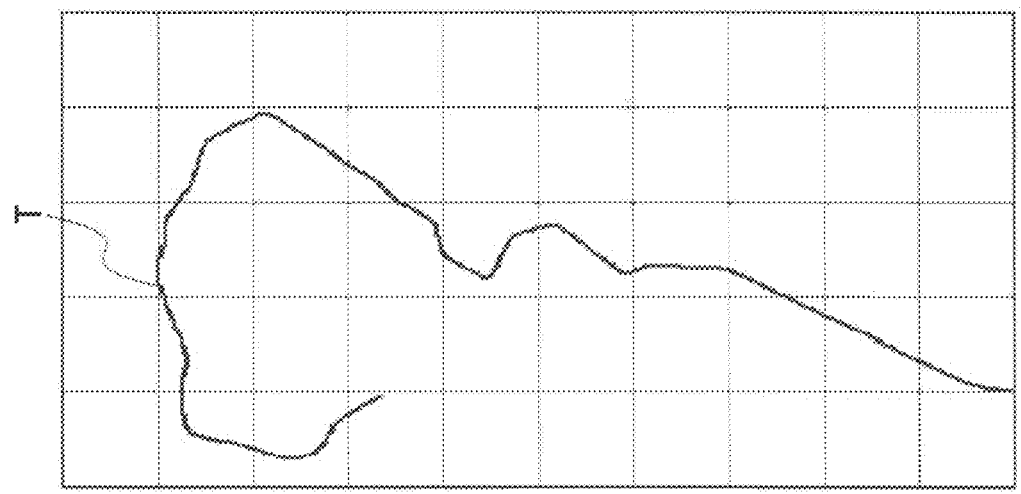
FIGS. 35A and 35B are graphs illustrating a comparison between a route on a map and a travel path of the vehicle.
Figure 35A:
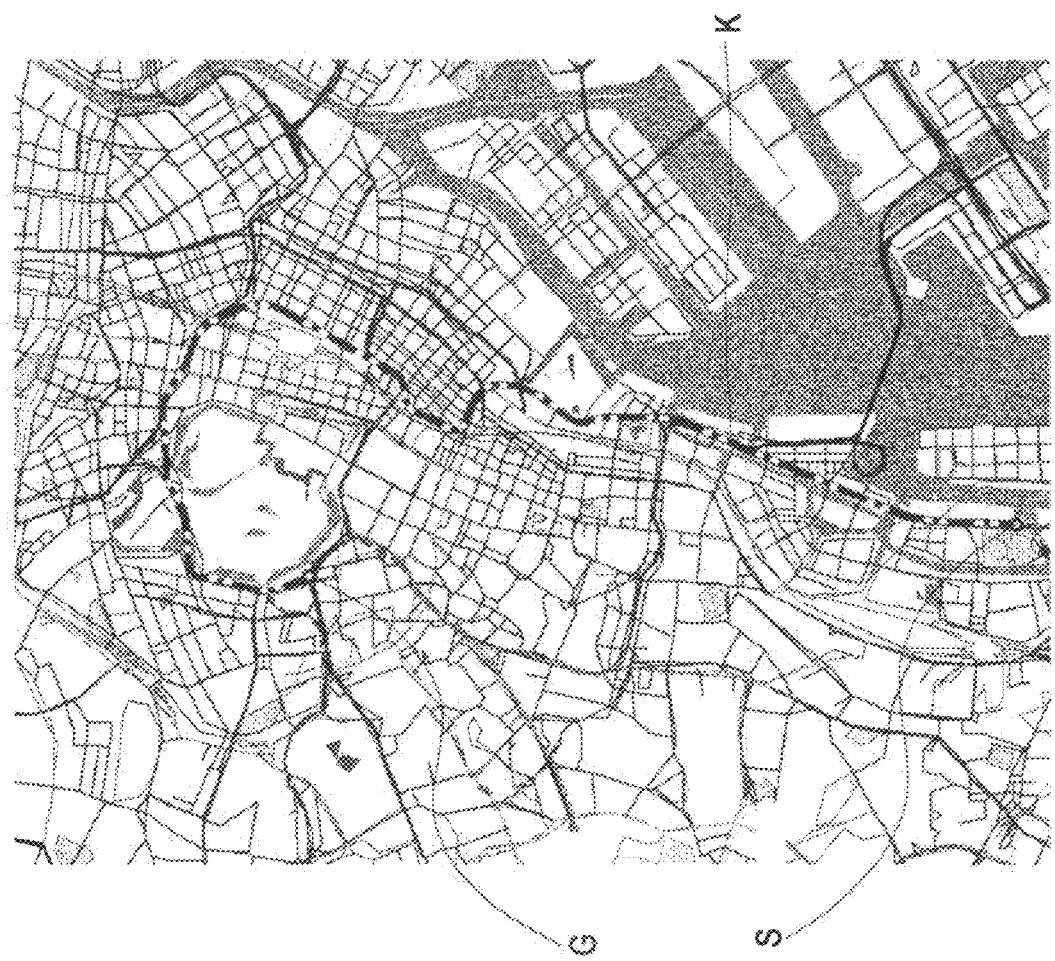
Figure 36:
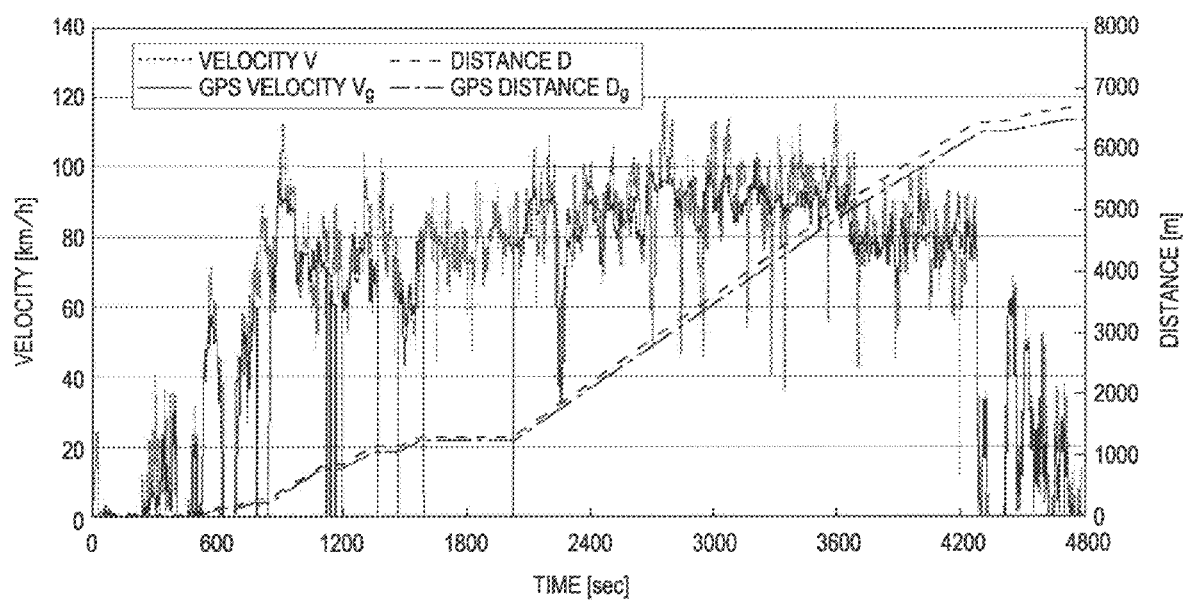
FIG. 36 is a graph illustrating a comparison between the velocity and the distance measured with a PND placed on a light car and the velocity and the distance calculated on the basis of GPS signals.
Figure 37:
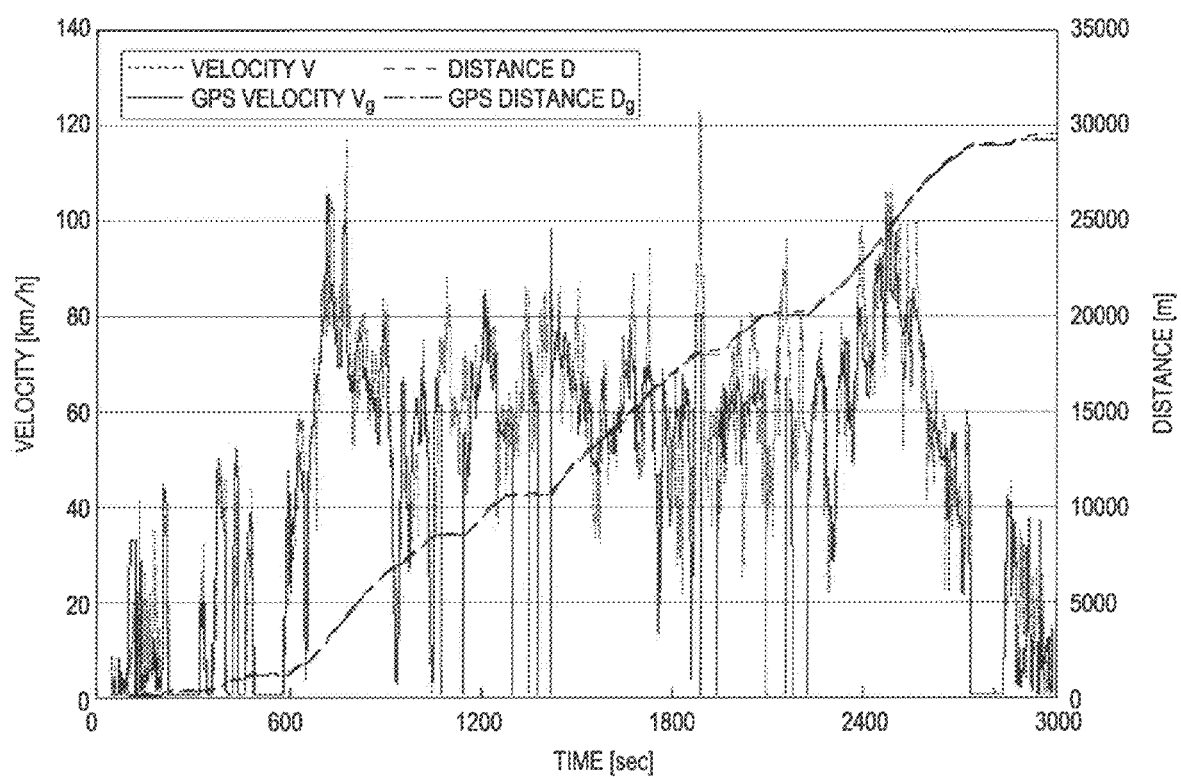
FIG. 37 is a graph illustrating a comparison between the velocity and the distance measured with a PND placed on a minivan and the velocity and the distance calculated on the basis of GPS signals.

FIGS. 26 to 37 illustrate measurement results obtained by the aforementioned velocity calculation. FIGS. 26 to 35 illustrate measurement results when the PND 1 is placed on a sedan. FIGS. 36 and 37 illustrate measurement results when the PND 1 is placed on a light car and a minivan, respectively.

Figure 26A:
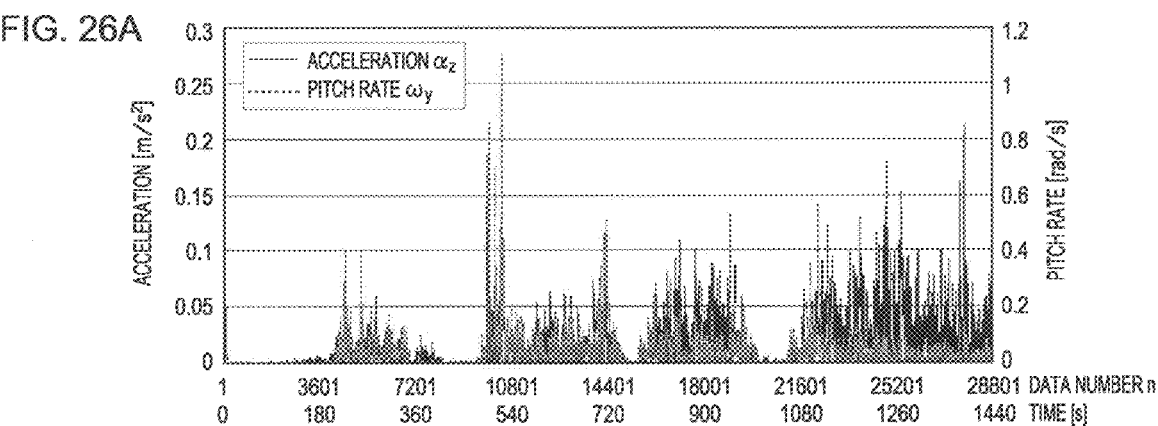
FIGS. 26A and 26B are graphs illustrating examples of measurement results of the acceleration, the angular velocity, and the velocity.
Figure 26B:
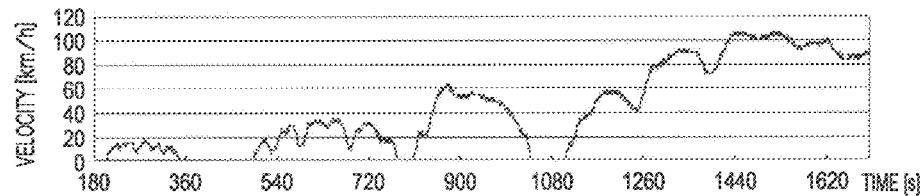

FIG. 26A illustrates the acceleration $\alpha_z$ corresponding to the acceleration data AD detected by the three-axis acceleration sensor 4 and the pitch rate $\omega_y$ corresponding to the pitch rate data PD detected by the Y axis gyro sensor 5. FIG. 26B illustrates the velocity V calculated from the acceleration $\alpha_z$ and the pitch rate $\omega_y$ using equation (3).

As can be seen from FIGS. 26A and 26B, the acceleration $\alpha_z$ measured by the PND 1 increases when velocity V of the vehicle increases, while the pitch rate $\omega_y$ measured by the PND 1 remains substantially constant.

FIGS. 27A, 28A, 29A, 30A, and 31A are graphs illustrating the velocity V, which is calculated by the PND 1 by performing velocity calculation, and the distance D, which is calculated from the velocity V. FIGS. 27B, 28B, 29B, 30B, and 31B are graphs illustrating a reference velocity $V_{ref}$ that is calculated from the speed pulse of the vehicle on which the PND 1 is mounted and a reference distance $D_{ref}$ calculated from the reference velocity $V_{ref}$. FIGS. 27A to 31B illustrate cases when the vehicle on which the PND 1 is placed travels on different roads.

The velocity calculated from the speed pulse of the vehicle will be referred to as a reference velocity, and the distance calculated using the reference velocity will be referred to as a reference distance.

Figure 27A:
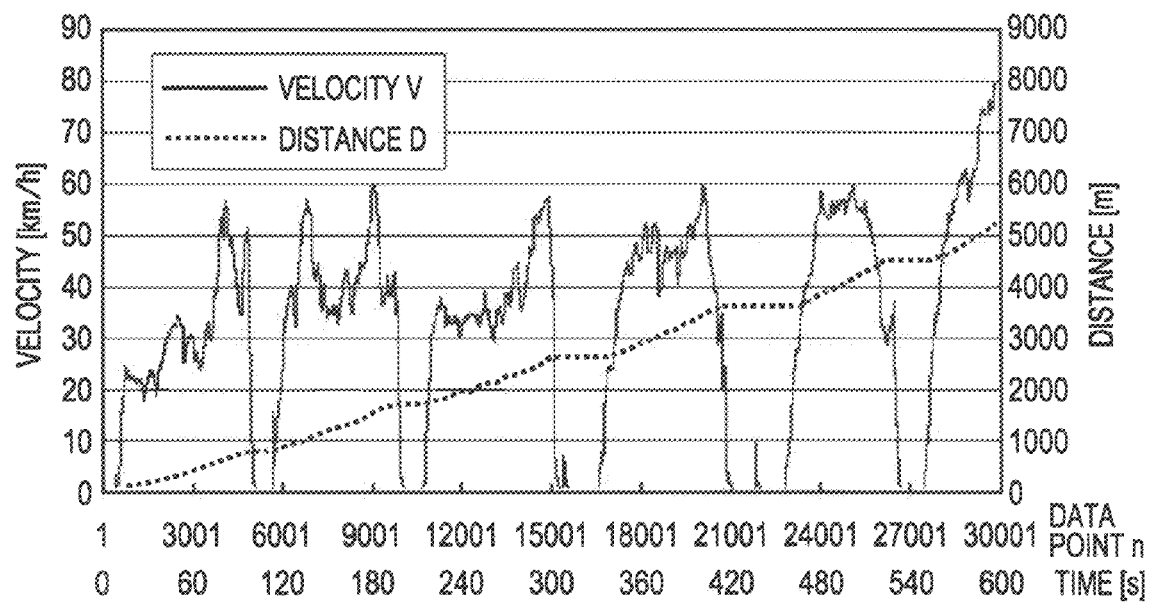
FIGS. 27A and 27B are graphs illustrating a first comparison between the measurement results and references.
Figure 27B:
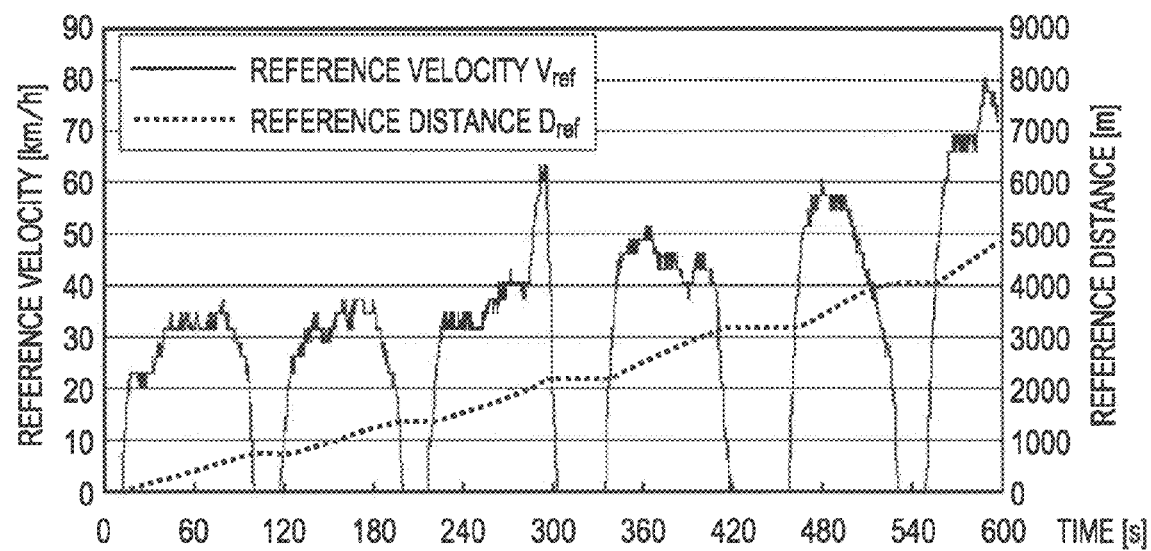

FIG. 27A illustrates the velocity V, which is calculated using the velocity calculation according to the embodiment, and the distance D calculated from the velocity V. FIG. 27B illustrates the reference velocity $V_{ref}$ and the reference distance $D_{ref}$, which are to be compared with the velocity V and the distance D illustrated in FIG. 27A.

As illustrated in FIGS. 27A and 27B, the graph of the velocity V is substantially similar to that of the reference velocity $V_{ref}$. The error between the distance D, which is calculated on the basis of the velocity V, and the reference distance $D_{ref}$ is smaller than 10%.

Figure 28A:
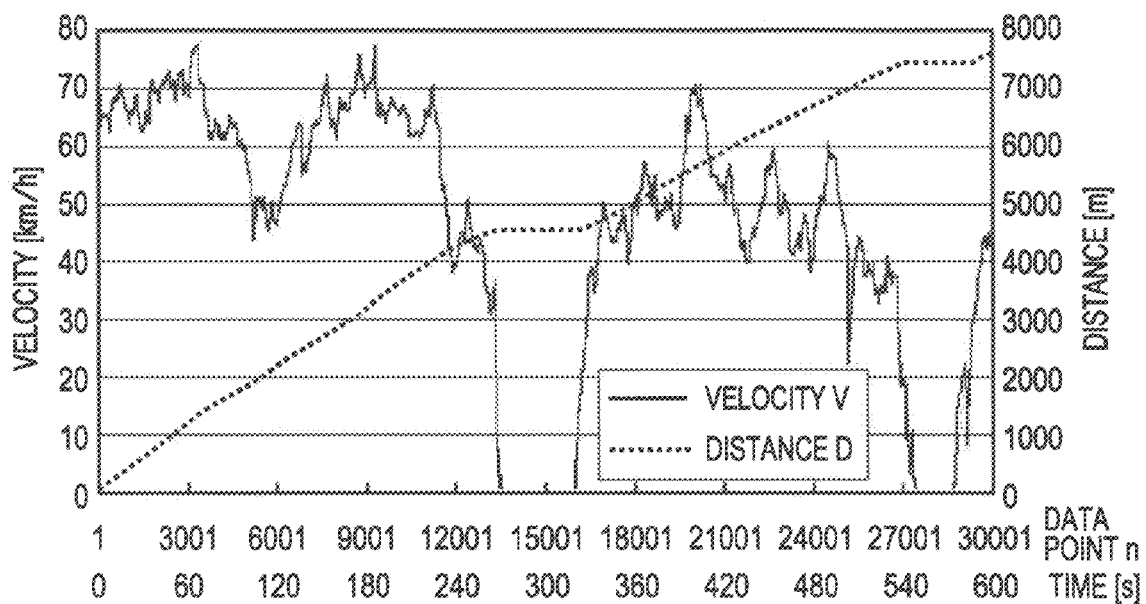
FIGS. 28A and 28B are graphs illustrating a second comparison between the measurement results and the references.
Figure 28B:
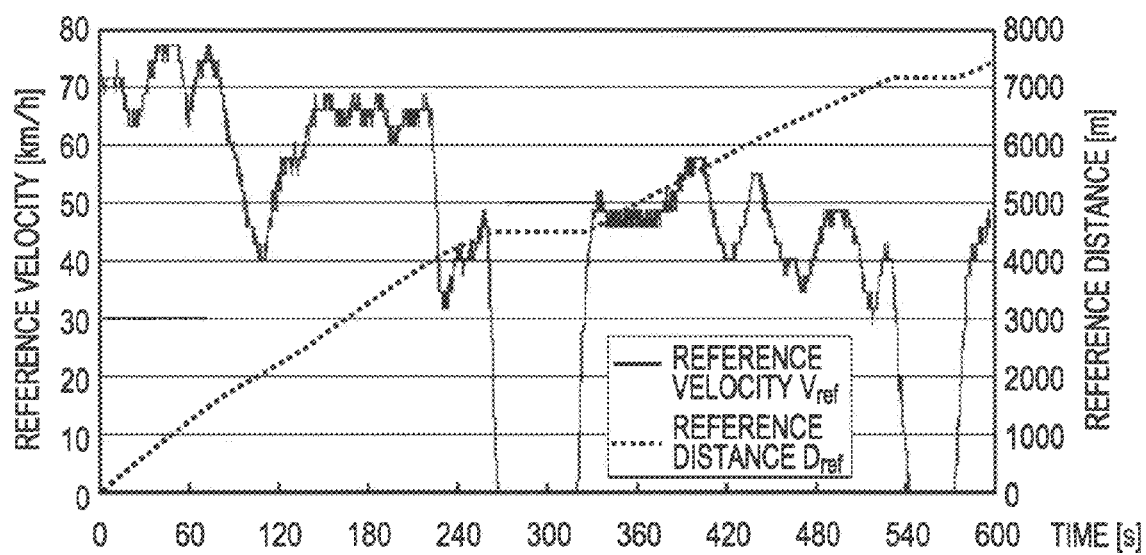

FIG. 28A illustrates the velocity V, which is calculated using the velocity calculation according to the embodiment, and the distance D calculated from the velocity V. FIG. 28B illustrates the reference velocity $V_{ref}$ and the reference distance $D_{ref}$, which are to be compared with the velocity V and the distance D illustrated in FIG. 28A.

Figure 29A:
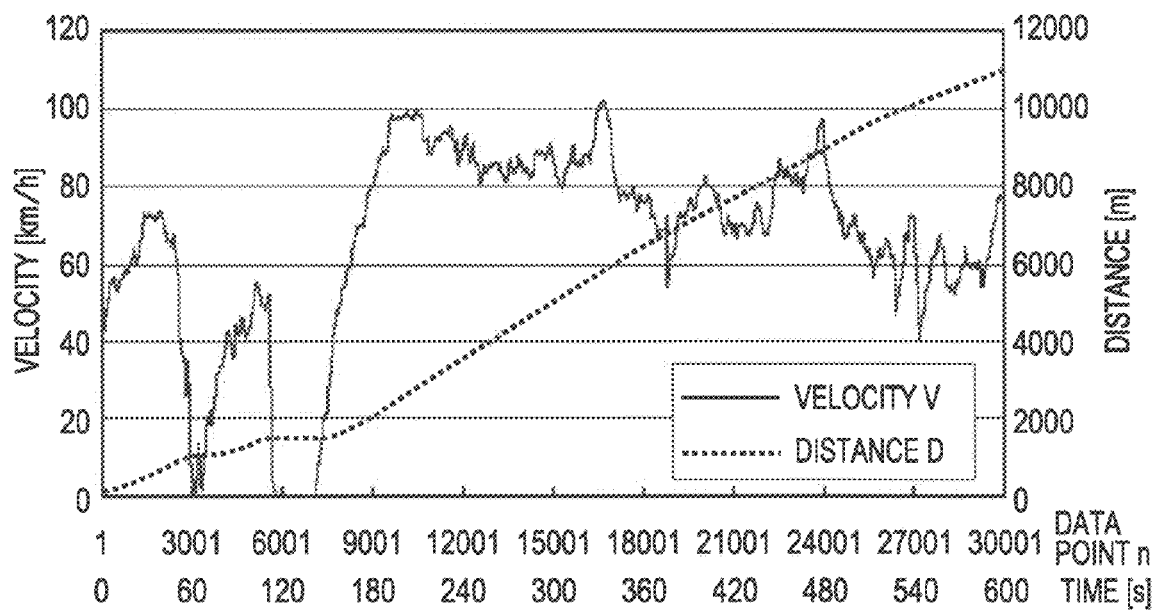
FIGS. 29A and 29B are graphs illustrating a third comparison between the measurement results and the references.
Figure 29B:
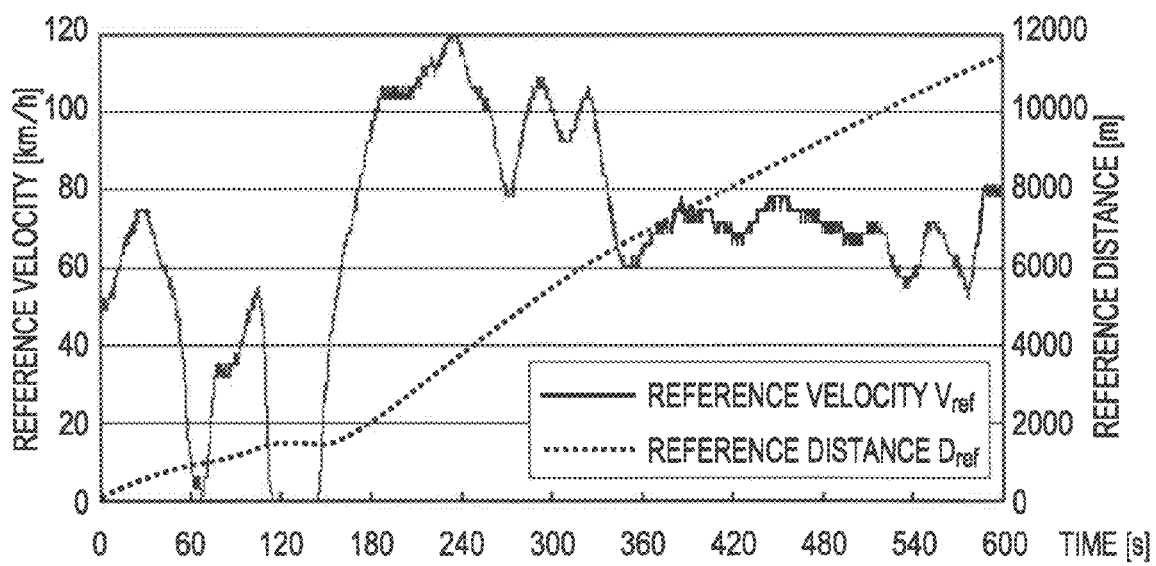

FIG. 29A illustrates the velocity V, which is calculated using the velocity calculation according to the embodiment, and the distance D calculated from the velocity V. FIG. 29B illustrates the reference velocity $V_{ref}$ and the reference distance $D_{ref}$, which are to be compared with the velocity V and the distance D illustrated in FIG. 29A.

Figure 30A:
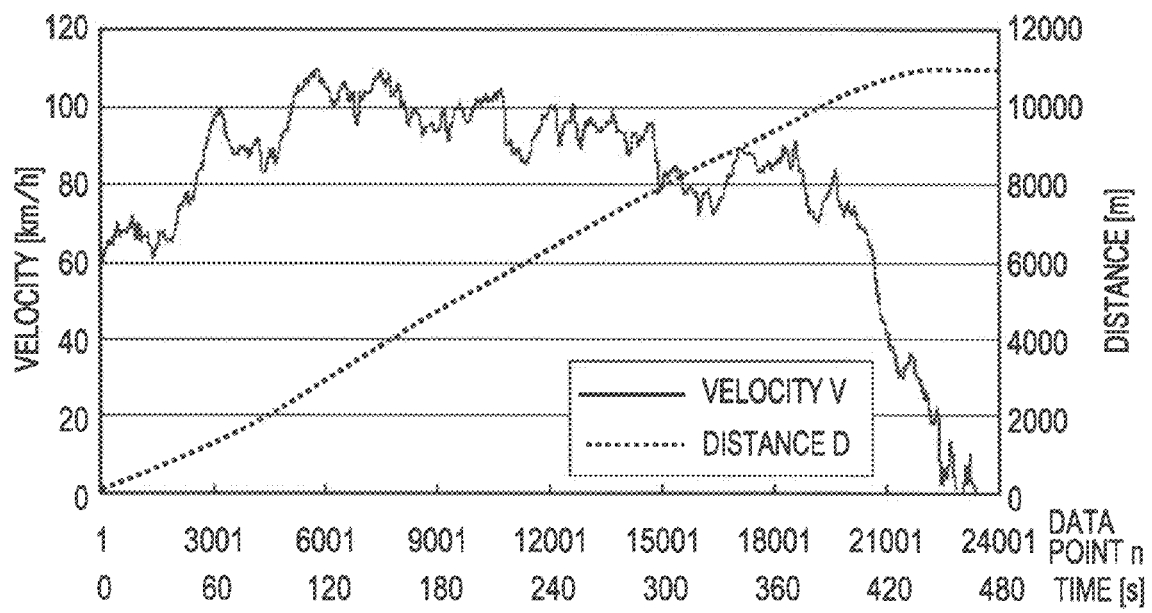
FIGS. 30A and 30B are graphs illustrating a fourth comparison between the measurement results and the references.
Figure 30B:
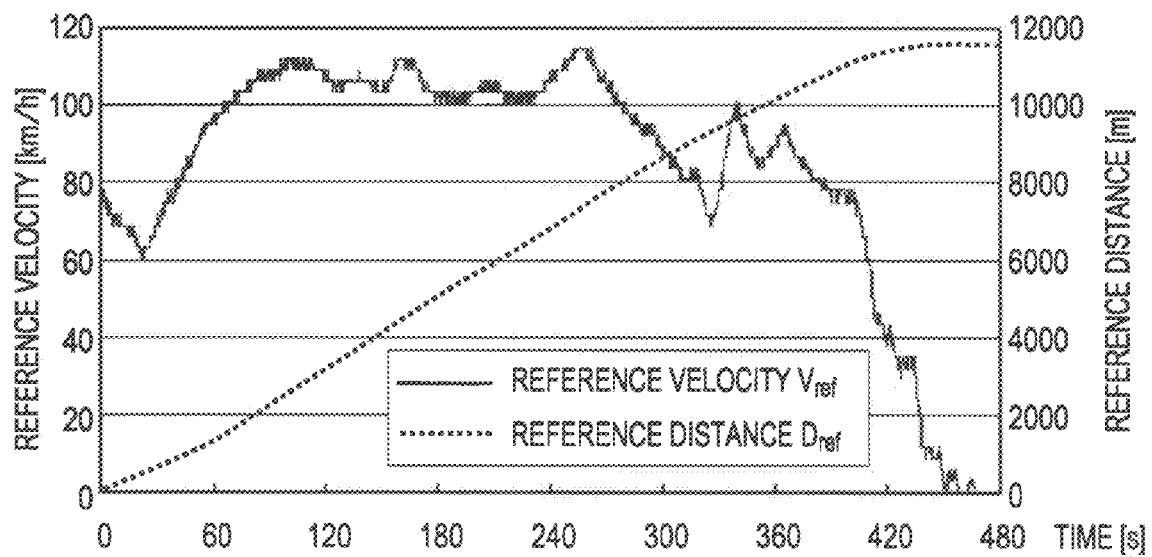

FIG. 30A illustrates the velocity V, which is calculated using the velocity calculation according to the embodiment, and the distance D calculated from the velocity V. FIG. 30B illustrates the reference velocity $V_{ref}$ and the reference distance $D_{ref}$, which are to be compared with the velocity V and the distance D illustrated in FIG. 30A.

Figure 31A:
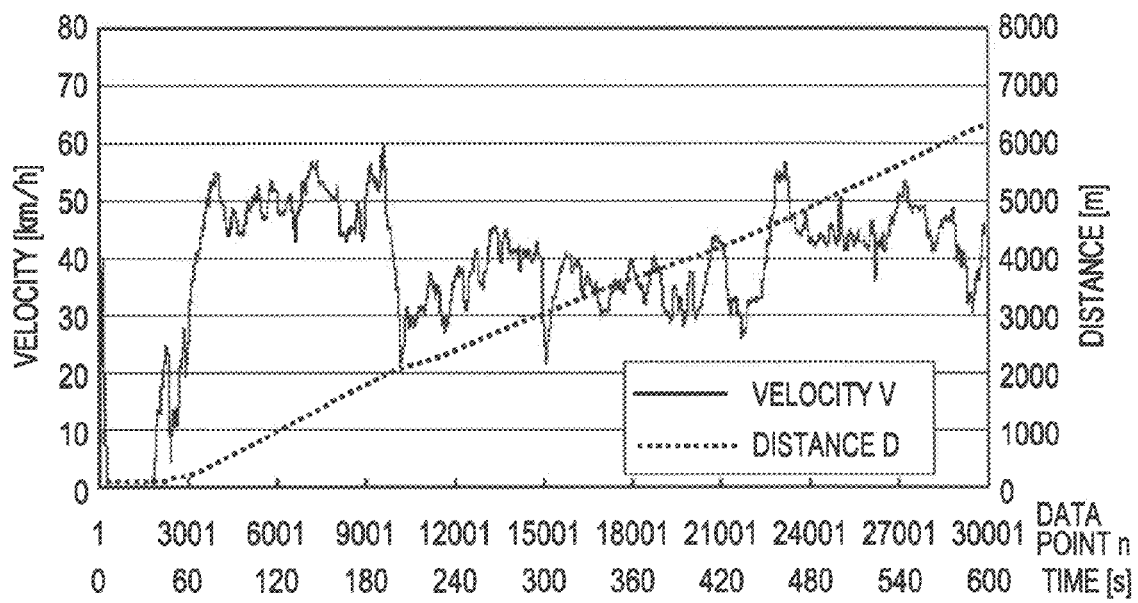
FIGS. 31A and 31B are graphs illustrating a fifth comparison between the measurement results and the references.
Figure 31B:
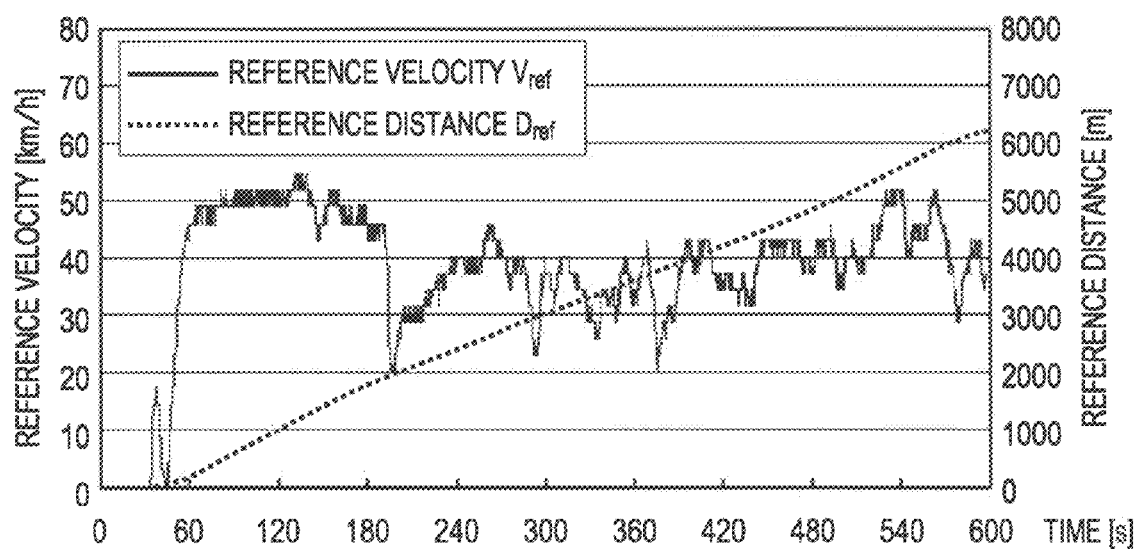

FIG. 31A illustrates the velocity V, which is calculated using the velocity calculation according to the embodiment, and the distance D calculated from the velocity V. FIG. 31B illustrates the reference velocity $V_{ref}$ and the reference distance $D_{ref}$, which are to be compared with the velocity V and the distance D illustrated in FIG. 31A.

As in the case of FIG. 26A, the velocity V illustrated in FIGS. 27A, 28A, 29A, 30A, and 31A, which illustrates the cases when the vehicle travels on different roads, are substantially similar to the reference velocity $V_{ref}$ illustrated in FIGS. 27B, 28B, 29B, 30B, and 31B, respectively. The error between the distance D, which is calculated on the basis of the velocity V, and the reference distance $D_{ref}$ is smaller than 10%.

Figure 32A:
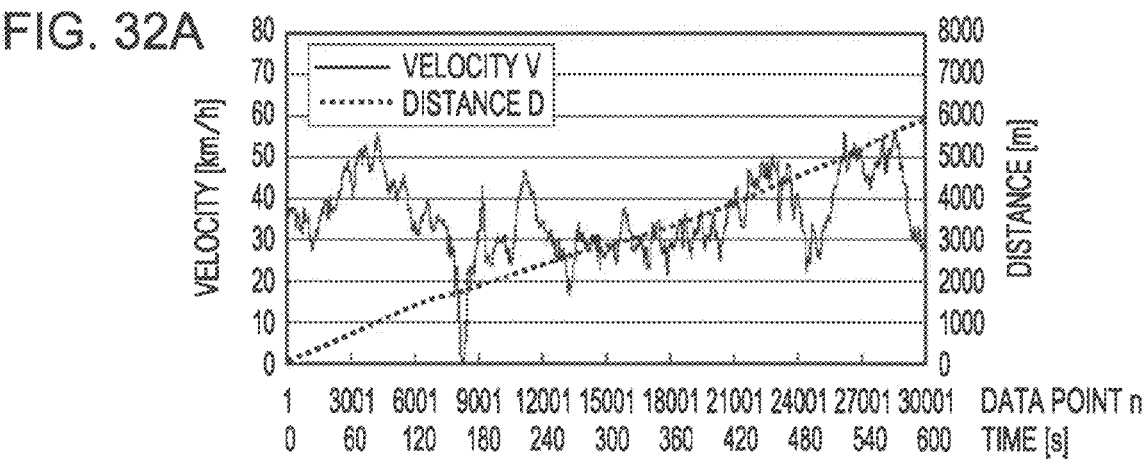
FIGS. 32A to 32C are graphs illustrating a first comparison between the measurement results and the references when the vehicle is traveling along a curve.
Figure 32B:
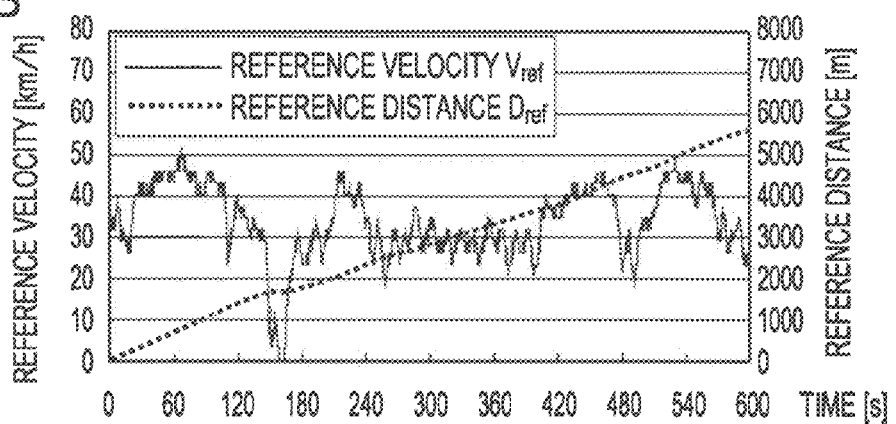
Figure 32C:
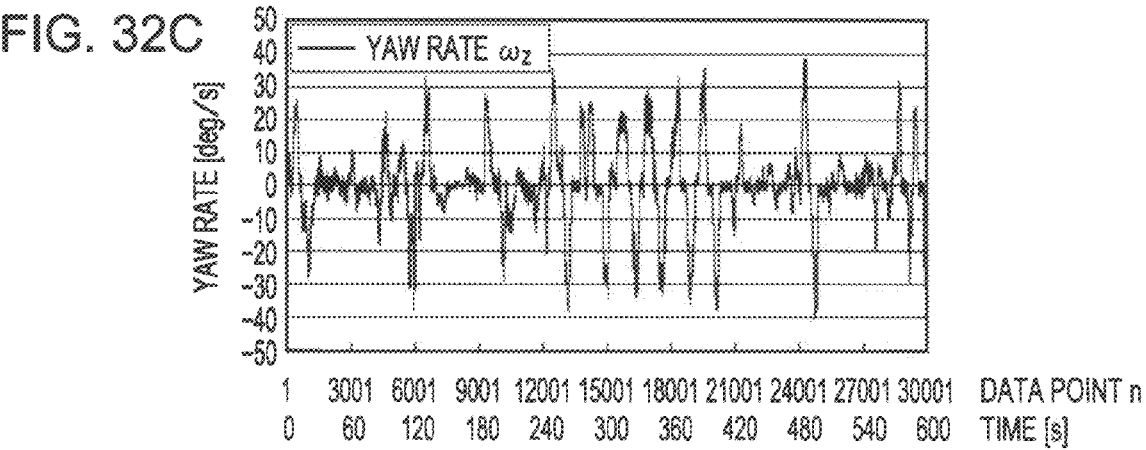

FIG. 32A is a graph of the velocity V and the distance D that are calculated by the PND 1 using the velocity calculation. FIG. 32B is a graph of the reference velocity $V_{ref}$ and the reference distance $D_{ref}$, which is calculated from the reference velocity $V_{ref}$. FIG. 32C is a graph of the yaw rate $\omega_z$, which is detected by the Z axis gyro sensor 6 of the PND 1.

Referring to FIG. 32C, the yaw rate $\omega_z$ that is higher than 20 deg/s indicates a right turn of the vehicle, and the yaw rate $\omega_z$ that is smaller than −20 deg/s indicates a left turn of the vehicle.

As can be seen from FIG. 32C, even when the vehicle repeats right turns and left turns, the velocity V calculated by the PND 1 (FIG. 32A) is substantially similar to the reference velocity $V_{ref}$ (FIG. 32B). The error between the distance D, which is calculated on the basis of the velocity V, and the reference distance $D_{ref}$ is smaller than 10%.

Figure 33A:
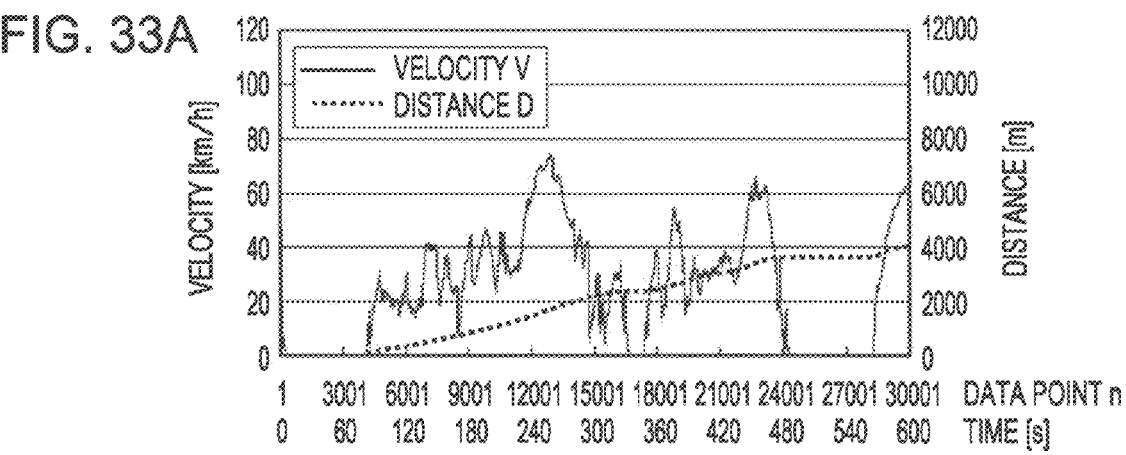
FIGS. 33A to 33C are graphs illustrating a second comparison between the measurement results and the references when the vehicle is traveling along a curve.
Figure 33B:
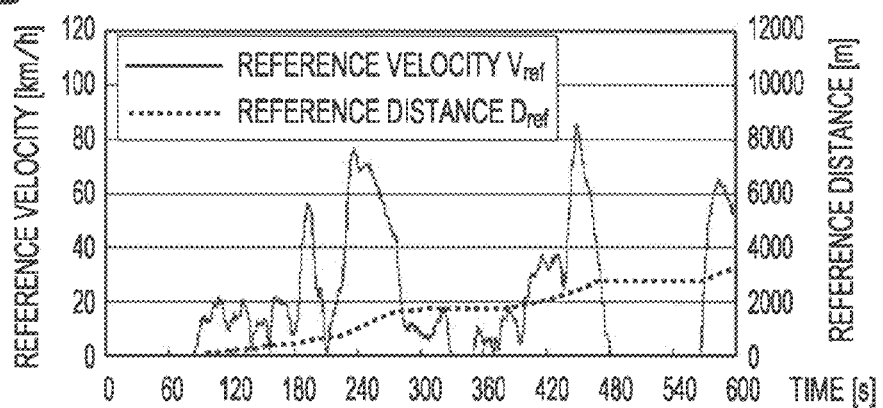
Figure 33C:
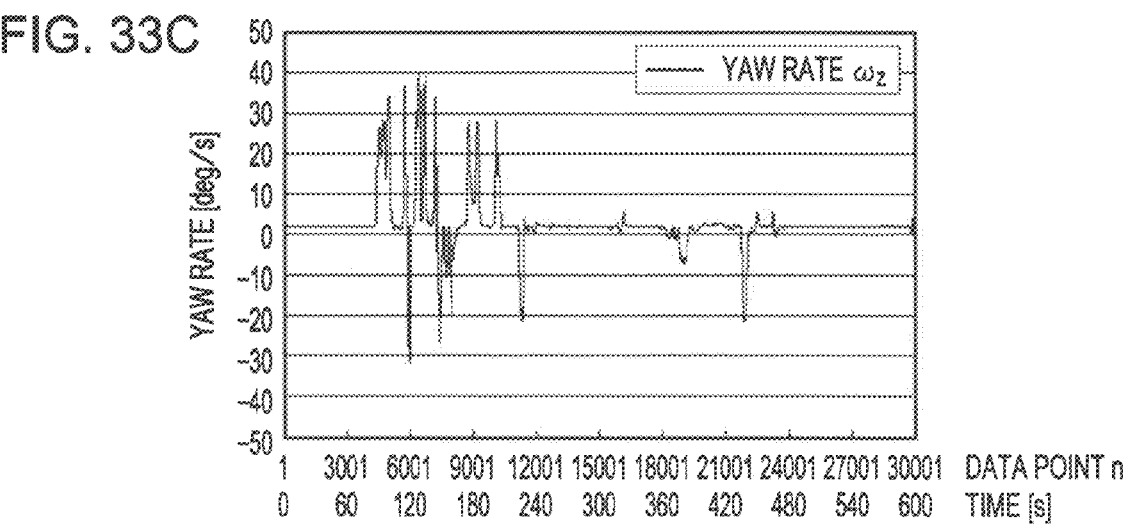

FIG. 33A is a graph of the velocity V and the distance D that are calculated by the PND 1 using the velocity calculation when the vehicle travels on a road that is different from that of FIG. 32A. FIG. 33B is a graph of the reference velocity $V_{ref}$ and the reference distance $D_{ref}$ that is calculated from the reference velocity $V_{ref}$. FIG. 33C is a graph of the yaw rate $\omega_z$, which is detected by the Z axis gyro sensor 6.

Figure 34A:
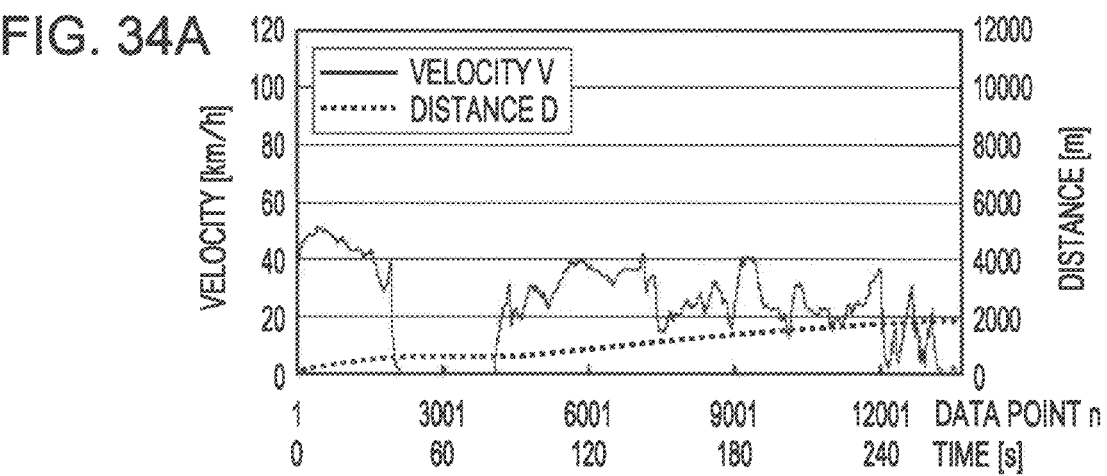
FIGS. 34A to 34C are graphs illustrating a third comparison between the measurement results and the references when the vehicle is traveling along a curve.
Figure 34B:
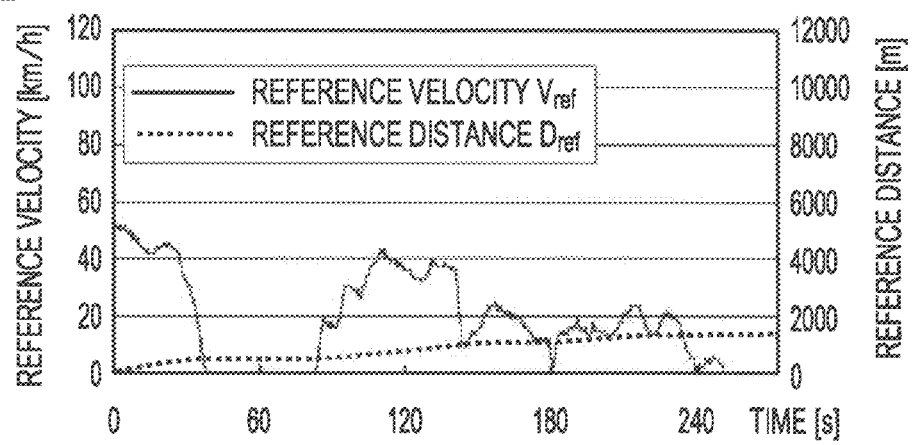
Figure 34C:
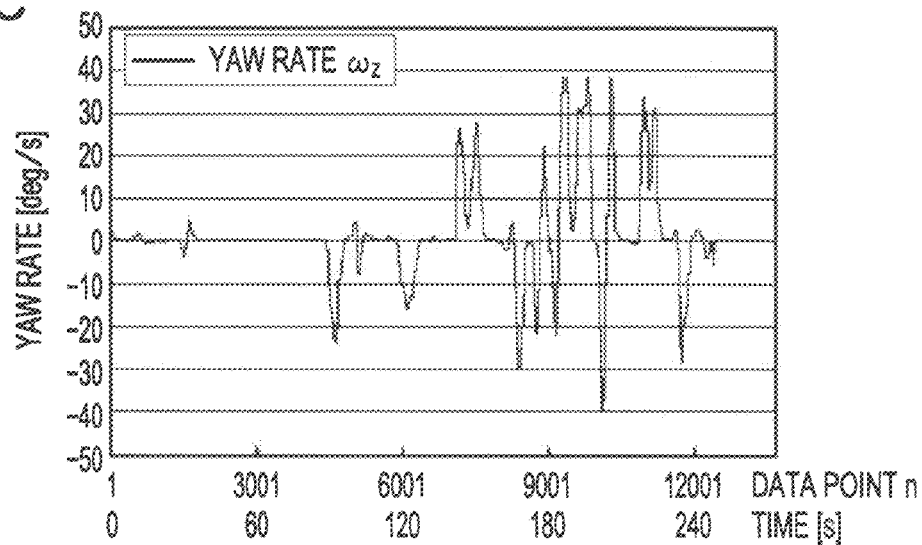

FIG. 34A is a graph of the velocity V and the distance D that are calculated by the PND 1 using the velocity calculation when the vehicle travels on a road that is different from those of FIGS. 32A and 33A. FIG. 34B is a graph of the reference velocity $V_{ref}$ and the reference distance $D_{ref}$ that is calculated from the reference velocity $V_{ref}$. FIG. 34C is a graph of the yaw rate $\omega_z$, which is detected by the Z axis gyro sensor 6.

As can be seen from these results, when the vehicle travels along a large number of curves, the velocity V calculated by the PND 1 is substantially similar to the reference velocity $V_{ref}$, and the error between the distance D, which is calculated on the basis of the velocity V, and the reference distance $D_{ref}$ is smaller than 10%.

FIG. 35A illustrates a map including a route K of a vehicle from a start S to a goal G. FIG. 35B illustrates a travel path T of the vehicle, which is a plot of the present positions of the vehicle calculated by the PND 1 mounted on the vehicle.

The travel path T (FIG. 35B) is substantially isometric and similar to the route K (FIG. 35A) along which the vehicle has traveled. As can be seen from this fact, the PND 1 can substantially accurately calculate the present position.

FIG. 36 illustrates the velocity V and the distance D, which are calculated by the PND 1 placed on a light car. For comparison with the velocity V and the distance D, FIG. 36 also illustrates the velocity $V_g$, which is calculated on the basis of GPS signals received with the GPS antenna ANT, and the distance $D_g$, which is calculated from the velocity $V_g$.

Hereinafter, the velocity that is calculated on the basis of GPS signals received by the GPS antenna ANT will be referred to as the GPS velocity, and the distance that is calculated from the GPS velocity will be referred to as the GPS distance.

FIG. 37 illustrates the velocity V and the distance D, which are calculated by the PND 1 placed on a minivan. For comparison with the velocity V and the distance D, FIG. 37 also illustrates the velocity $V_g$, which is calculated on the basis of GPS signals received by the GPS antenna ANT, and the distance $D_g$, which is calculated from the velocity $V_g$.

As can be seen from FIGS. 36 and 37, for vehicles having different sizes, i.e. wheelbases, the velocity V calculated by the PND 1 according to the embodiment of the present invention is substantially similar to the GPS velocity $V_g$, and the error between the distance D, which is calculated on the basis of the velocity V, and the GPS distance $D_g$ is smaller than 10%.

In FIGS. 36 and 37, when the vehicle is in a tunnel and the like and does not receive GPS signals, the GPS velocity $V_g$ is set at O.

1-6. Operation and Effect

In the PND 1 having the structure described above, the three-axis acceleration sensor 4 detects the acceleration $\alpha_z$ along the Z axis perpendicular to direction of travel of the vehicle, which is generated due to the undulation of a road surface, and the Y axis gyro sensor 5 detects the pitch rate $\omega_y$ around the Y axis perpendicular to the direction of travel of the vehicle, which is generated due to the undulation of a road surface.

The PND 1 calculates the velocity V using equation (1) or (3) on the basis of the acceleration $\alpha_z$ detected by the three-axis acceleration sensor 4 and the pitch rate $\omega_y$ detected by the Y axis gyro sensor 5.

Thus, the PND 1, which has a simple structure including the three-axis acceleration sensor 4 and the Y axis gyro sensor 5, can accurately calculate the velocity V of the vehicle under all road conditions even when it is difficult for the PND 1 to receive GPS signals.

The PND 1 has a good usability because the PND 1 is detachable from the vehicle and it is not necessary for a user to carry out a cumbersome task of connecting a cable to receive speed pulse signals from the vehicle.

The Z axis gyro sensor 6 of the PND 1 detects the yaw rate $\omega_z$ around the Z axis perpendicular to the direction of travel of the vehicle, and the PND 1 calculates present position on the basis of the velocity V and the yaw rate $\omega_z$.

Thus, the PND 1, which has a simple structure including the three-axis acceleration sensor 4, the Y axis gyro sensor 5, and the Z axis gyro sensor 6, can accurately calculate the present position of the vehicle under all road conditions even when it is difficult for the PND 1 to receive GPS signals.

When calculating the velocity V, the PND 1 performs low pass filtering on the acceleration data AD1 and the pitch rate data PD1. Thus, the PND 1 can remove from the acceleration $\alpha_c$ and the angular velocity $\omega_c$ components that are generated due to the cradle 3 and oscillate at a frequency of, for example, about 15 Hz, which is substantially higher than those of the acceleration $\alpha_z$ and the pitch rate $\omega_y$, which are generated due to undulation of a road surface and oscillate at a frequency of, for example, 1 to 2 Hz.

Thus, the PND 1 can more accurately calculate the velocity V using the acceleration $\alpha_z$ and the pitch rate $\omega_y$ from which the vibration component generated due to the cradle 3 is removed.

The PND 1 extracts the maximum acceleration $\alpha_{z,max}$ and the minimum acceleration $\alpha_{z,min}$ from the range of 25 to 75 data points of the acceleration $\alpha_z$ around the data point $P_m$, and extracts the maximum pitch rate $\omega_{y,max}$ and the minimum pitch rate $\omega_{y,min}$ from the range of 25 to 75 data points of the pitch rate $\omega_y$ around the data point $P_m$.

The PND 1 calculates the velocity V using equation (3) from the maximum and minimum accelerations $\alpha_{z,max}$ and $\alpha_{z,min}$ and the maximum and minimum pitch rates $\omega_{y,max}$ and $\omega_{y,min}$.

Thus, the PND 1 uses data points in a range that is wider than the phase difference between the acceleration $\alpha_z$ and the pitch rate $\omega_y$, the phase delay being changeable in accordance with the position at which the PND 1 is placed in the vehicle, thereby removing the influence of the phase difference between the acceleration $\alpha_z$ and the pitch rate $\omega_y$.

When the velocity V calculated using equation (3) on the basis of the acceleration $\alpha_z$ and the pitch rate $\omega_y$ is excessively high, the PND 1 sets the velocity V at 0 when the vehicle is traveling at a very low velocity, and otherwise the PND 1 sets the velocity at the former velocity $V_{n-1}$, thereby calculating the velocity V more accurately.

With the above structure, the PND 1 according to the first embodiment detects the acceleration $\alpha_z$ along the Z axis, which is generated due to the undulation of a road surface, and the pitch rate $\omega_y$ around the Y axis, which is generated due to the undulation of the road surface, and calculates the velocity V using the acceleration $\alpha_z$ and the pitch rate $\omega_y$, thereby accurately calculating the velocity V under all road conditions.

2. Second Embodiment 2-1. Structure of PND

A PND 50 according to a second embodiment (FIGS. 4 to 7) is similar to the PND 1 according to the first embodiment except that the PND 50 includes a controller 51 instead of the controller 11.

Figure 38:
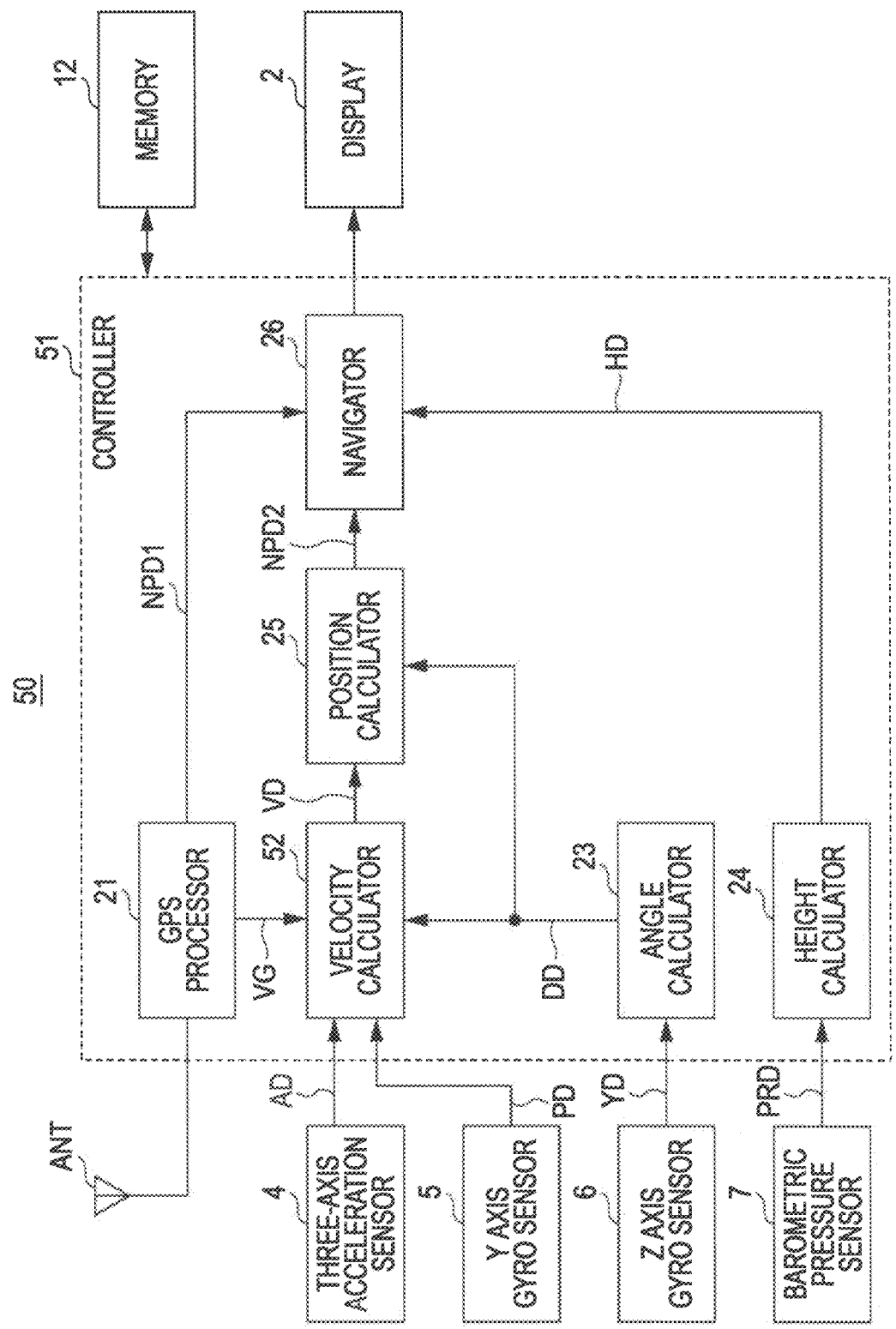
FIG. 38 is a block diagram illustrating the circuit structure of a PND according to a second embodiment.

FIG. 38 is a block diagram of the controller 51, in which parts corresponding to those of FIG. 7 are represented by the same numerals. As illustrated in FIG. 38, the controller 51 is similar to the controller 11 (FIG. 7) except that the controller 51 includes a velocity calculator 52 instead of the velocity calculator 22, the GPS processor 21 supplies a GPS velocity VG to the velocity calculator 52, and the angle calculator 23 supplies an angle data DD to the velocity calculator 52.

2-2. Velocity Calculation 2-2-1. Principle of Correcting Velocity

With the PND 1 according to the first embodiment, the velocity V (velocity data VD) calculated by the velocity calculator 22 (FIG. 8) may not be the same as the true velocity of the vehicle. In other words, the velocity V may include an error. Such an error may be generated when it is difficult for the PND 1 to accurately detect an acceleration and an angular velocity that are generated in a vehicle if, for example, the cradle 3 is not appropriately attached to the vehicle.

When the PND 1 can receive GPS signals and generate the present position data NPD1, the PND 1 can calculate the velocity (hereinafter referred to as a GPS velocity VG) on the basis of the present position data NPD1. The GPS velocity VG, which is calculated on the basis of a precise positional data, can be regarded as the true velocity of the vehicle.

Figure 39:
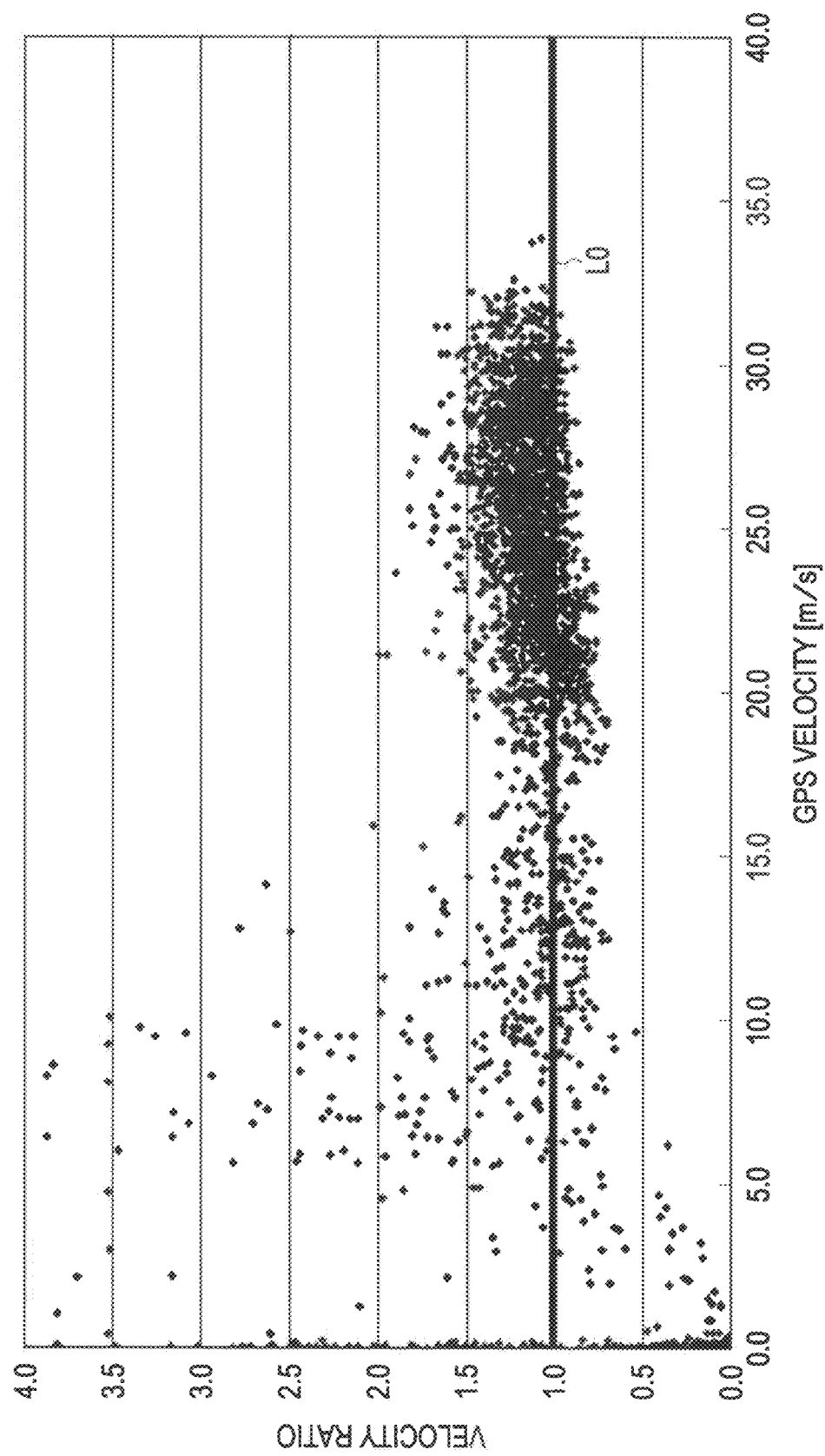
FIG. 39 is a graph illustrating a first relationship between the GPS velocity and the velocity ratio.

FIG. 39 is a graph illustrating the ratio (hereinafter referred to as a velocity ratio RV) of the velocity V, which is calculated by the velocity calculator 22, to the GPS velocity VG, plotted against the GPS velocity VG.

Ideally, the velocity V calculated by the velocity calculator 22 should be the same as the GPS velocity VG. That is, ideally, the velocity ratio RV should be "1" as indicated by a line L0 in FIG. 39 irrespective of the GPS velocity VG.

However, in reality, as illustrated in FIG. 39, the velocity ratio RV considerably deviates from the line L0 and is sparsely distributed in a low velocity region where the GPS velocity is equal to or lower than about 10 m/s. The velocity ratio RV is densely distributed around the line L0 in a high velocity region where the GPS velocity is equal to or higher than about 10 m/s.

It can be seen from FIG. 39 that the velocity ratio RV has different distributions in accordance with the ranges of the velocity (hereinafter referred to as velocity regions).

Therefore, by calculating a correction factor for each of the velocity regions and by correcting the velocity V using the correction factors, the error of the velocity V can be reduced and thereby the velocity V can be made closer to the true velocity.

2-2-2. Structure of Velocity Calculator

By using the principle of velocity correction described above, the velocity calculator 52 of the second embodiment corrects the velocity V using the correction factor.

Figure 40:
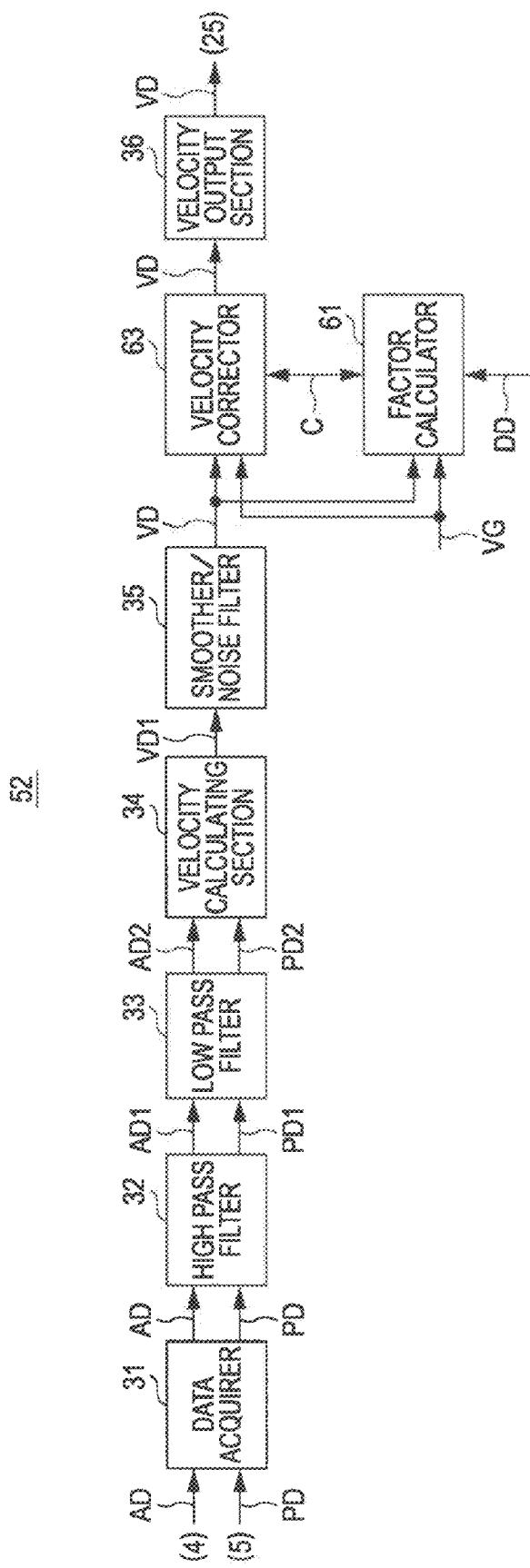
FIG. 40 is a block diagram illustrating the structure of a velocity calculator according to a second embodiment.

FIG. 40 is a block diagram of the velocity calculator 52, in which parts corresponding to those of FIG. 8 are represented by the same numerals. As compared with the velocity calculator 22, the velocity calculator 52 further includes a factor calculator 61 and a velocity corrector 63 disposed between the smoother/noise filter 35 and the velocity output section 36.

The factor calculator 61 acquires the GPS velocity VG from the GPS processor 21 and acquires the velocity data VD from the smoother/noise filter 35. After acquiring the GPS velocity VG, the factor calculator 61 performs factor calculation in which the GPS velocity VG is divided by the velocity V to calculate a correction factor C in accordance with the following equation (4).

$$C = \frac{VG}{V} \quad (4)$$

The correction factor C is used so that the velocity V is multiplied by the correction factor C to make the velocity V closer to the GPS velocity VG.

The factor calculator 61 classifies the correction factor C into a low-speed correction factor C1 and a high-speed correction factor C2 in accordance with the level of the velocity V, i.e., the velocity region.

To be specific, the factor calculator 61 classifies the correction factor C into a low-speed correction factor C1 when the former velocity $V_{n-1}$ is in the range of 0 km/h to 30 km/h and into a high-speed correction factor C2 when the former velocity $V_{n-1}$ is higher than 30 km/h.

While the vehicle is accelerating or decelerating, a time lag occurs between the velocity V and the GPS velocity VG due to the calculation principle, so that it is difficult for the factor calculator 61 to accurately calculate the correction factor C. Therefore, the factor calculator 61 does not calculate the correction factor C while the vehicle is accelerating or decelerating. Therefore, unlike the velocity calculating section 34, which has different threshold velocities of 35 and 25 km/h in accordance with whether the vehicle is accelerating or decelerating, the factor calculator 61 has a single threshold velocity of 30 km/h, which is the mean value of 35 and 25 km/h.

When the orientation of the vehicle is changing, the acceleration data AD supplied by the three-axis acceleration sensor 4 includes an acceleration component due to the change in orientation. Accordingly, the velocity V calculated by the velocity calculating section 34 includes an error due to the change in the orientation. Therefore, the factor calculator 61 does not calculate the correction factor C when the factor calculator 61 determines that the orientation of the vehicle is changing on the basis of the angle data DD calculated by the angle calculator 23.

The factor calculator 61 stores preceding values of the preceding low-speed correction factor C1 and the high-speed correction factor C2 (hereinafter respectively referred to as a preceding low-speed correction factor $C1_{n-1}$ and a preceding high-speed correction factor $C2_{n-1}$). The factor calculator 61 standardizes the low-speed correction factor C1 and the high-speed correction factor C2 by using latest values of the low-speed correction factor C1 and the high-speed correction factor C2 (hereinafter referred to as a latest low-speed correction factor $C1_n$ and a latest high-speed correction factor $C2_n$), and updates the low-speed correction factor C1 and the high-speed correction factor C2.

To be specific, when the factor calculator 61 has calculated the low-speed correction factor C1, the factor calculator 61 calculates a new value of the low-speed correction factor C1 in accordance with the following equation (5). When the factor calculator 61 has calculated the high-speed correction factor C2, the factor calculator 61 calculates a new value of the high-speed correction factor C2 in accordance with the following equation (6).

$$C1 = \frac{C1_{n-1} \times (M-1) + C1_n}{M} \quad (5)$$

$$C2 = \frac{C2_{n-1} \times (M-1) + C2_n}{M} \quad (6)$$

The constant M in equation (5) and (6), which is larger than 1, corresponds to a time constant.

The factor calculator 61 stores the latest values of the low-speed correction factor C1 and the high-speed correction factor C2, which have been updated using equation (5) or (6).

When the factor calculator 61 can acquire the GPS velocity VG, the factor calculator 61 calculates the correction factor C and updates the average of the correction factor C as necessary, thereby performing learning of the correction factor C.

The velocity corrector 63 acquires the velocity data VD from the smoother/noise filter 35, the GPS velocity VG from the GPS processor 21, and the latest correction factor C from the factor calculator 61. The latest correction factor C may be the low-speed correction factor C1 or the high-speed correction factor C2.

When the velocity corrector 63 can acquire the GPS velocity VG from the GPS processor 21, the velocity corrector 63 directly supplies the velocity data VD to the velocity output section 36.

When it is difficult for the velocity corrector 63 to acquire the GPS velocity VG from the GPS processor 21, the velocity corrector 63 reads the latest value of the correction factor C corresponding to the velocity V at that time, i.e., the low-speed correction factor C1 or the high-speed correction factor C2, and calculates a corrected velocity VC in accordance with the following equation (7).

$$VC = V \times C \quad (7)$$

At this time, the velocity corrector 63, as with the factor calculator 61, selects one of the low-speed correction factor C1 and the high-speed correction factor C2 as the correction factor C in accordance with the selection of the range of the data points performed by the velocity calculating section 34.

That is, when the vehicle is accelerating, the velocity corrector 63 selects the low-speed correction factor C1 if the former velocity $V_{n-1}$ is in the range of 0 to 35 km/h and selects the high-speed correction factor C2 if the former velocity $V_{n-1}$ is higher than 35 km/h.

When the vehicle is decelerating, the velocity corrector 63 selects the high-speed correction factor C2 if the former velocity $V_{n-1}$ is equal to or higher than 25 km/h and selects the low-speed correction factor C1 if the former velocity $V_{n-1}$ is lower than 25 km/h.

Subsequently, the velocity corrector 63 supplies the corrected velocity VC to the velocity output section 36 as the velocity data VD. In response, the velocity output section 36 outputs the velocity data VD to the position calculator 25 (FIG. 38).

Thus, when the velocity calculator 52 can acquire the GPS velocity VG, the velocity calculator 52 performs learning that updates the correction factor C in accordance with the velocity V as necessary. When it is difficult for the velocity calculator 52 to acquire the GPS velocity VG, the velocity calculator 52 corrects the velocity V using the correction factor C corresponding to the velocity V.

Figure 41:
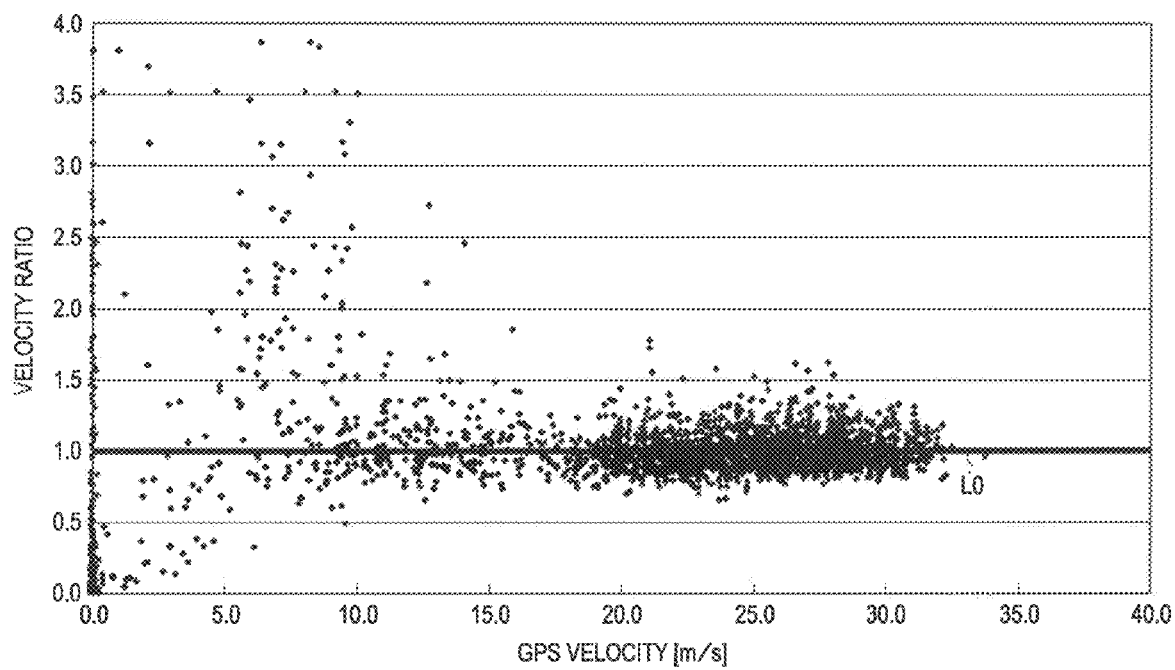
FIG. 41 is a graph illustrating a second relationship between the GPS velocity and the velocity ratio.

FIG. 41 is a graph, which corresponds to FIG. 39 and in which the velocity ratio RV of the velocity V that has been corrected (i.e., the corrected velocity VC) to the GPS velocity VG, plotted against the GPS velocity VG.

As can be seen from FIG. 41, the velocity ratio RV after the correction of the velocity V is closer to the value "1" than that before the correction (FIG. 39) in any of the velocity regions. It can be seen from this fact that, when the velocity calculator 52 corrects the velocity V using the correction factor C, the velocity V can be made closer to the GPS velocity VG and the error of the velocity V can be reduced.

2-2-3. Process of Velocity Correction

Figure 42:
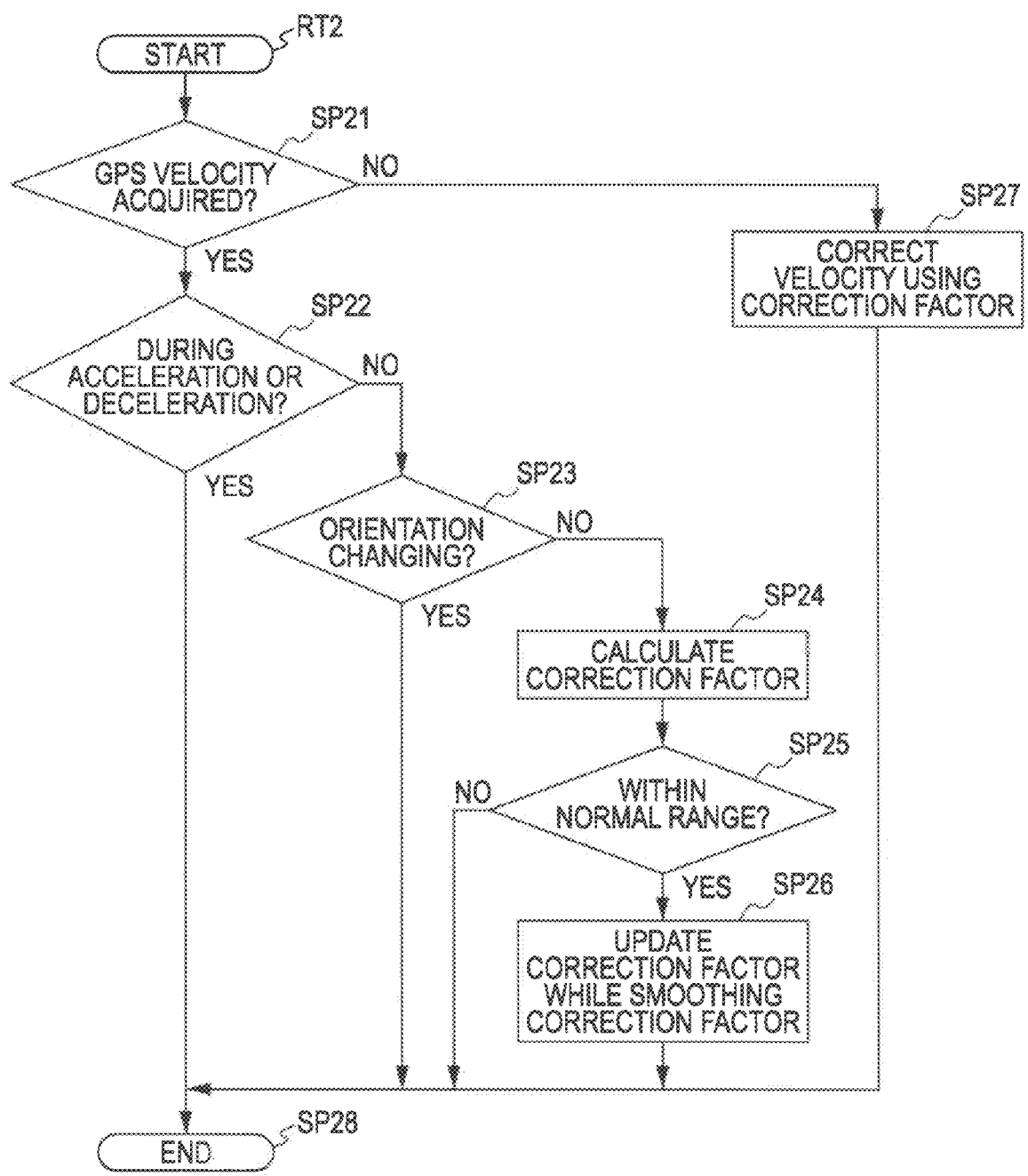
FIG. 42 is a flowchart illustrating a process of velocity correction according to the second embodiment.

Referring to the flowchart of FIG. 42, a velocity correction process RT2, which is performed by the velocity calculator 52 of the controller 51 of the PND 50, will be described.

The controller 51 starts the process from a start step of a routine RT2, and in step SP21, determines whether or not the factor calculator 61 has acquired the GPS velocity VG from the GPS processor 21. If the determination is yes, which means that learning of the correction factor C is to be performed, the controller 51 proceeds to step SP22.

In step SP22, the controller 51 determines whether or not the vehicle is accelerating or decelerating by comparing the former velocity $V_{n-1}$ with the velocity V and the like. If the determination is no, which means that the vehicle is neither accelerating nor decelerating, the controller 51 proceeds to step SP23.

In step SP23, the controller 51 determines whether or not the orientation of the vehicle is changing on the basis of angle data DD supplied by the angle calculator 23. If the determination is no, which means that the orientation of the vehicle is not changing and learning of the correction factor C can be performed, the controller 51 proceeds to step SP24.

In step SP24, the factor calculator 61 of the controller 51 calculates the correction factor C on the basis of the velocity V and the GPS velocity VG in accordance with equation (4), and the controller 51 proceeds to step SP25.

In step SP25, the controller 51 determines whether or not the correction factor C is within a predetermined normal range. If the determination is yes, which means that the correction factor C can be used to correct the velocity V, the controller 51 proceeds to step SP26.

In step SP26, the controller 51 classifies the correction factor C into the high-speed correction factor C2 or the low-speed correction factor C1 in accordance with whether or not the velocity V is equal to or higher than 30 km/h.

Next, the controller 51 standardizes the high-speed correction factor C2 or the low-speed correction factor C1 using equation (5) or (6) and updates the high-speed correction factor C2 or the low-speed correction factor C1, and stores the high-speed correction factor C2 or the low-speed correction factor C1 that has been updated as the latest high-speed correction factor C2 or the latest low-speed correction factor C1. Subsequently, the controller 51 proceeds to step SP28 and finishes the process.

If the determination in step SP22 or step SP23 is yes, the velocity V at this time is not suitable for calculating the correction factor C. Therefore, the controller 51 does not update the correction factor C, proceeds to step SP28, and finishes the process.

In the determination in step SP25 is no, this means that the correction factor C that has been calculated is an abnormal value in that, for example, an acceleration component that is generated when, for example, a user touches a touch panel is included in the velocity V. Thus, the controller 51 does not use the correction factor C that has been calculated, proceeds to step SP28, and finishes the process.

If the determination in step SP21 is no, which means that it is difficult to receive GPS signals from the GPS satellites and it is necessary to calculate the present position and the like of the vehicle on the basis of the velocity V calculated by the velocity calculator 52, the controller 51 proceeds to step SP27.

In step SP27, the velocity corrector 63 of the controller 51 acquires the latest correction factor C (i.e., the low-speed correction factor C1 or the high-speed correction factor C2) corresponding to the velocity V from the factor calculator 61, and calculates the corrected velocity VC by multiplying the velocity V by the correction factor C in accordance with equation (7). Next, the controller 51 supplies the corrected velocity VC to the velocity output section 36 as a new value of the velocity V, proceeds to step SP28, and finishes the process.

2-3. Operation and Effect

In the PND 50 according to the second embodiment and having the structure described above, the three-axis acceleration sensor 4 detects the acceleration $\alpha_z$ along the Z axis perpendicular to direction of travel of the vehicle, which is generated due to the undulation of a road surface, and the Y axis gyro sensor 5 detects the pitch rate $\omega_y$ around the Y axis perpendicular to the direction of travel of the vehicle, which is generated due to the undulation of a road surface.

The PND 50 calculates the velocity V using equation (1) or (3) on the basis of the acceleration $\alpha_z$ detected by the three-axis acceleration sensor 4 and the pitch rate $\omega_y$ detected by the Y axis gyro sensor 5.

When the PND 50 can acquire the GPS velocity VG, the factor calculator 61 of the PND 50 calculates the correction factor C corresponding to the velocity V in accordance with equation (4). When it is difficult for the PND 50 to obtain the GPS velocity VG, the velocity corrector 63 of the PND 50 corrects the velocity V using the correction factor C in accordance with equation (7).

Thus, as with the first embodiment, the PND 50, which has a simple structure including the three-axis acceleration sensor 4 and the Y axis gyro sensor 5, can accurately calculate the velocity V of the vehicle under all road conditions even when it is difficult for the PND 50 to receive GPS signals.

Moreover, the PND 50 can appropriately calculate the correction factor C by using the GPS velocity VG that is comparatively accurate, whereby an error included in the velocity V can be reduced.

Further more, the PND 50 divides the velocity V into two velocity regions and calculates the low-speed correction factor C1 and the high-speed correction factor C2 as the correction factor C for the respective regions. Thus, the PND 50 can appropriately correct the velocity V in accordance with the distribution of the error of the velocity V in each of the velocity regions, whereby the error included in the velocity V can be considerably reduced.

In other respects, the PND 50 according to the second embodiment has the same operational effect as the PND 1 of the first embodiment.

With the above structure, the PND 50 detects the acceleration $\alpha_z$ along the Z axis, which is generated due to the undulation of a road surface, and the pitch rate $\omega_y$ around the Y axis, which is generated due to the undulation of the road surface, and calculates the velocity V using the acceleration $\alpha_z$ and the pitch rate $\omega_y$, thereby accurately calculating the velocity V under all road conditions. Moreover, the PND 50 corrects the velocity V using the correction factor C corresponding to the velocity region including the velocity V, whereby the error included in the velocity V can be considerably reduced.

3. Third Embodiment 3-1. Structure of PND

A PND 70 according to a third embodiment (FIGS. 4 to 7) is similar to the PND 1 according to the first embodiment except that the PND 70 includes a controller 71 instead of the controller 11.

Figure 43:
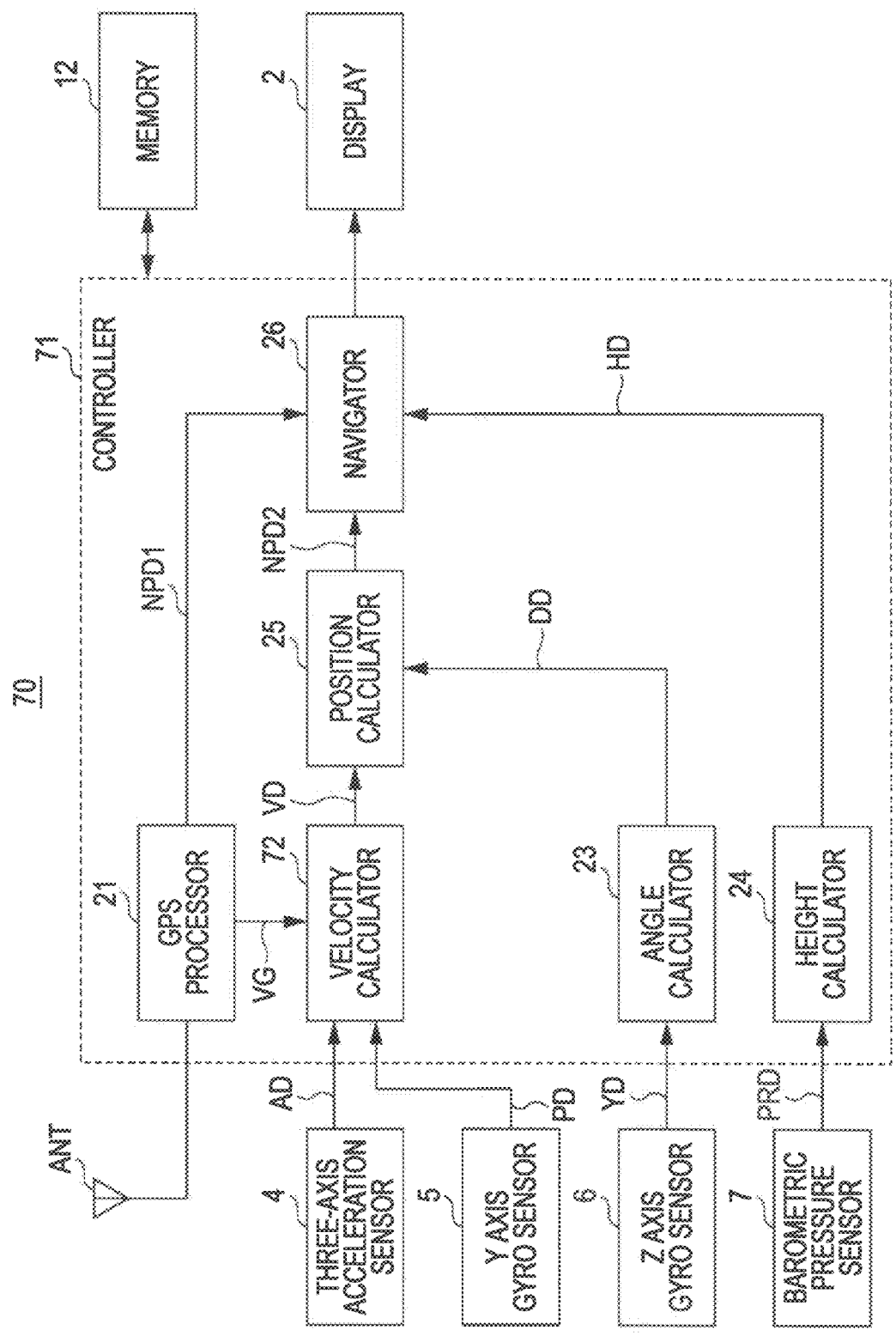
FIG. 43 is a block diagram illustrating the circuit structure of a PND according to a third embodiment.

FIG. 43 is a block diagram of the controller 71, in which parts corresponding to those of FIG. 7 are represented by the same numerals. As illustrated in FIG. 43, the controller 71 is similar to the controller 11 (FIG. 7) except that the controller 71 includes a velocity calculator 72 instead of the velocity calculator 22, and the GPS processor 21 supplies a GPS velocity VG to the velocity calculator 72.

3-2. Velocity Calculation

The PND 70 according to the third embodiment also corrects the velocity V as with the PND 50 of the second embodiment. However, the method of correction is different from that of the second embodiment.

3-2-1. Principle of Correcting Velocity using Velocity Model

In the third embodiment, a velocity model that represents the relationship between the GPS velocity VG and the velocity V generated on the basis of the acceleration $\alpha_z$ and the pitch rate $\omega_y$ is constructed, and the velocity V is corrected by using the velocity model.

First, it is assumed that the pitch rate $\omega_y$ includes an error due to an offset or the like, and it is assumed that the pitch rate $\omega_y$, which is a measured value obtained by the Y axis gyro sensor 5, is the sum of the true pitch rate $\omega_y T$ and the measurement error $\Delta\omega_y$.

Likewise, it is assumed that the acceleration $\alpha_z$ includes an error due to an offset or the like, and it is assumed that the acceleration $\alpha_z$, which is a measured value obtained by the three-axis acceleration sensor 4, is the sum of the true acceleration $\alpha_z T$ and the measurement error $\Delta\alpha_z$.

Figure 44A:
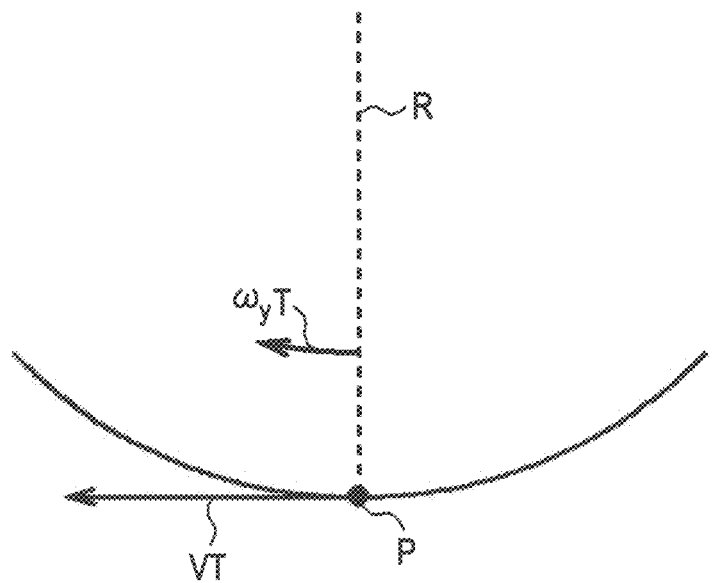
FIGS. 44A and 44B are diagrams illustrating the relationship among the arc, the velocity, and the angular velocity.

As illustrated in FIG. 44A, it is assumed that the vehicle is traveling on a substantially arc-shaped road surface having a radius of curvature R m at a true velocity VT m/s and at a true pitch rate (i.e., an angular velocity) $\omega_y T$ degree/s. In FIG. 44A, a point P represents the position of the vehicle.

In this case, the true pitch rate $\omega_y T$, the pitch rate $\omega_y$ including an error, the true acceleration $\alpha_z T$, and the acceleration $\alpha_z$ including an error can be represented by the following equations (8) to (11).

$$\omega_y T = \frac{VT}{R} \tag{8}$$

$$\omega_y = \omega_y T + \Delta\omega_y = \frac{VT}{R} + \Delta\omega_y \tag{9}$$

$$\alpha_z T = \frac{VT^2}{R} \tag{10}$$

$$\alpha_z = \alpha_z T + \Delta\alpha_z \tag{11}$$
$$= \frac{VT^2}{R} + \Delta\alpha_z$$

As described above, the velocity calculating section 34 calculates the velocity V using equation (3). Similarly, the maximum and minimum accelerations $\alpha_{z,max}$ and $\alpha_{z,min}$ and the maximum and minimum pitch rates $\omega_{y,max}$ and $\omega_{y,min}$ are used to model the velocity V.

Figure 44B:
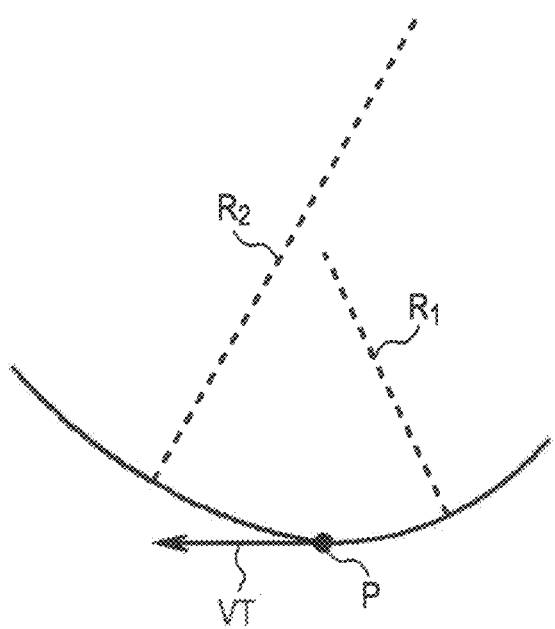

An actual road surface is seldom substantially arc-shaped with a constant radius of curvature and can practically be regarded as a sequence of substantially arc-shaped surfaces having different radii of curvature. Therefore, as illustrated in FIG. 44B, it is assumed that the radius of curvature of the road surface changes from $R_1$ m to $R_2$ m.

Assuming that $R_2 > R_1$, the maximum acceleration $\alpha_{z,max}$ and the maximum pitch rate $\omega_{y,max}$ of equation (3) are obtained on a part of the road surface having the radius of curvature $R_1$, and the minimum acceleration $\alpha_{z,min}$ and the minimum pitch rate $\omega_{y,min}$ are obtained on a part of the road surface having the radius of curvature $R_2$.

By using equations (8) to (11), equation (3) can be rewritten as the following equation (12).

$$V = \frac{\alpha_{z,max} - \alpha_{z,min}}{\omega_{y,max} - \omega_{y,min}} \tag{12}$$

$$= \frac{\left(\frac{VT^2}{R_1} + \Delta\alpha_z\right) - \left(\frac{VT^2}{R_2} - \Delta\alpha_z\right)}{\left(\frac{VT}{R_1} + \Delta\omega_y\right) - \left(\frac{VT}{R_2} + \Delta\omega_y\right)}$$

$$= \frac{VT^2(R_2 - R_1) + \Delta\alpha_z(R_2 + R_1)}{VT(R_2 - R_1) + \Delta\omega_y(R_2 + R_1)}$$

Using a constant K represented by the following equation (13), equation (12) can be rewritten as the following equation (14).

$$K = \frac{R_2 - R_1}{R_2 + R_1} > 0 \tag{13}$$

$$V = \frac{K \cdot VT^2 + \Delta\alpha_z}{K \cdot VT + \Delta\omega_y} \tag{14}$$

Equation (14) indicates that the velocity V can be obtained from the true velocity VT, the measurement error $\Delta\alpha_z$ of acceleration, the measurement error $\Delta\omega_y$ of pitch rate, and the constant K. The velocity V that is represented by equation (14) is the aforementioned velocity model.

The true velocity VT can be represented by the following equation (15) by solving the equation (14) with respect to VT.

$$VT = \frac{V + \sqrt{V^2 - \frac{4}{K}(\Delta\alpha_z - \Delta\omega_y \cdot V)}}{2} \tag{15}$$

Equation (15) shows that the true velocity VT can be obtained from the velocity V, the measurement error $\Delta\alpha_z$ of acceleration, the measurement error $\Delta\omega_y$ of pitch rate, and the constant K.

When the vehicle is at rest, the true acceleration $\alpha_z T$ and the true pitch rate $\omega_y T$ are "0". Therefore, when the vehicle is at rest, that is, when the GPS velocity VG can be obtained and the value of the GPS velocity VG is about 0 km/h, the acceleration $\alpha_z$ and the pitch rate $\omega y$ at this moment can be regarded as the measurement error $\Delta\alpha_z$ of acceleration, and the measurement error $\Delta\omega_y$ of pitch rate, respectively.

Ideally, the acceleration $\alpha_z$ and the pitch rate $\omega_y$ should be a constant around "0" when the velocity of the vehicle is about 0 km/h. In practice, however, they are not constant and have certain distributions around "0". The distributions around "0" can be represented by the standard deviations of the acceleration $\alpha_z$ and the pitch rate $\omega_y$.

The measurement error $\Delta\alpha_z$ of acceleration and the measurement error $\Delta\omega_y$ of pitch rate should be around "0". Therefore, the measurement error $\Delta\alpha_z$ of acceleration and the measurement error $\Delta\omega_y$ of pitch rate can be approximated by the products of the standard deviations of the acceleration $\alpha_z$ and the pitch rate $\omega_y$ and predetermined constants, respectively.

The constant K can be represented by the following equation (16) by solving the equation (14) with respect to the constant K.

$$K = \frac{\Delta\alpha_z - \Delta\omega_y \cdot V}{VT(VT - V)} \tag{16}$$

Equation (16) shows that the constant K can be calculated from the velocity V, the true velocity VT, the measurement error $\Delta\alpha_z$ of acceleration and the measurement error $\Delta\omega_y$ of pitch rate. As described above, the measurement error $\Delta\alpha_z$ of acceleration and the measurement error $\Delta\omega_y$ of pitch rate can be obtained when the vehicle is at rest. The GPS velocity VG can be used as the true velocity VT.

Therefore, when the GPS velocity VG can be obtained, the constant K can be updated to the latest value using the latest value of the measurement error $\Delta\alpha_z$ of acceleration and the latest value of the measurement error $\Delta\omega_y$ of pitch rate.

Figure 45:
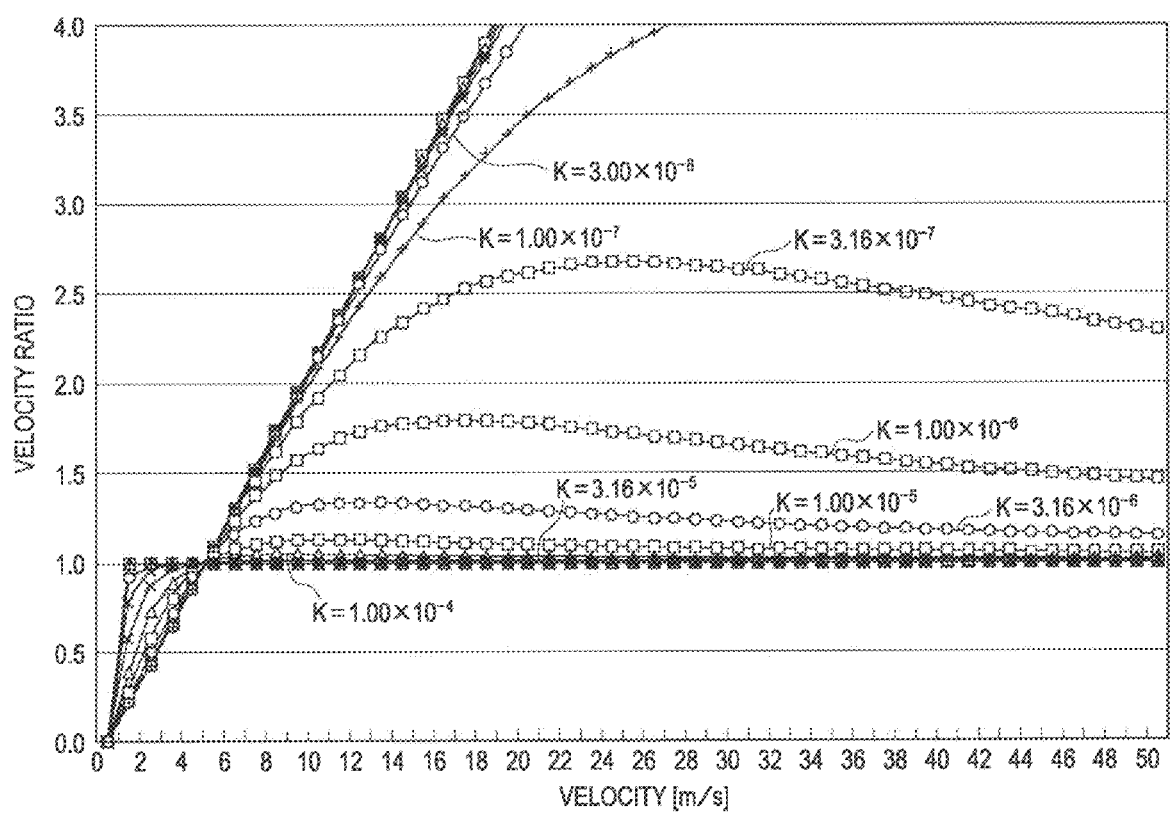
FIG. 45 is a diagram illustrating the relationship between the velocity and the velocity ratio when a constant is changed.

FIG. 45 illustrates the relationship between the velocity V and the velocity ratio RV. When the constant K changes, the curve representing the relationship considerably varies. When the constant K is within the range of $1.00 \times 10^{-6}$ to $3.00 \times 10^{-6}$, the curve has a shape that produces a good correction result.

Thus, when the PND 70 can receive GPS signals and generate the GPS velocity VG, the PND 70 can calculate the latest constant K using equation (16), that is, the PND 70 can learn the constant K.

When it is difficult for the PND 70 to receive GPS signals and generate the GPS velocity VG, the PND 70 can calculate the true velocity VT from the latest constant K in accordance with equation (15), that is, the PND 70 can correct the velocity V.

Figure 46:
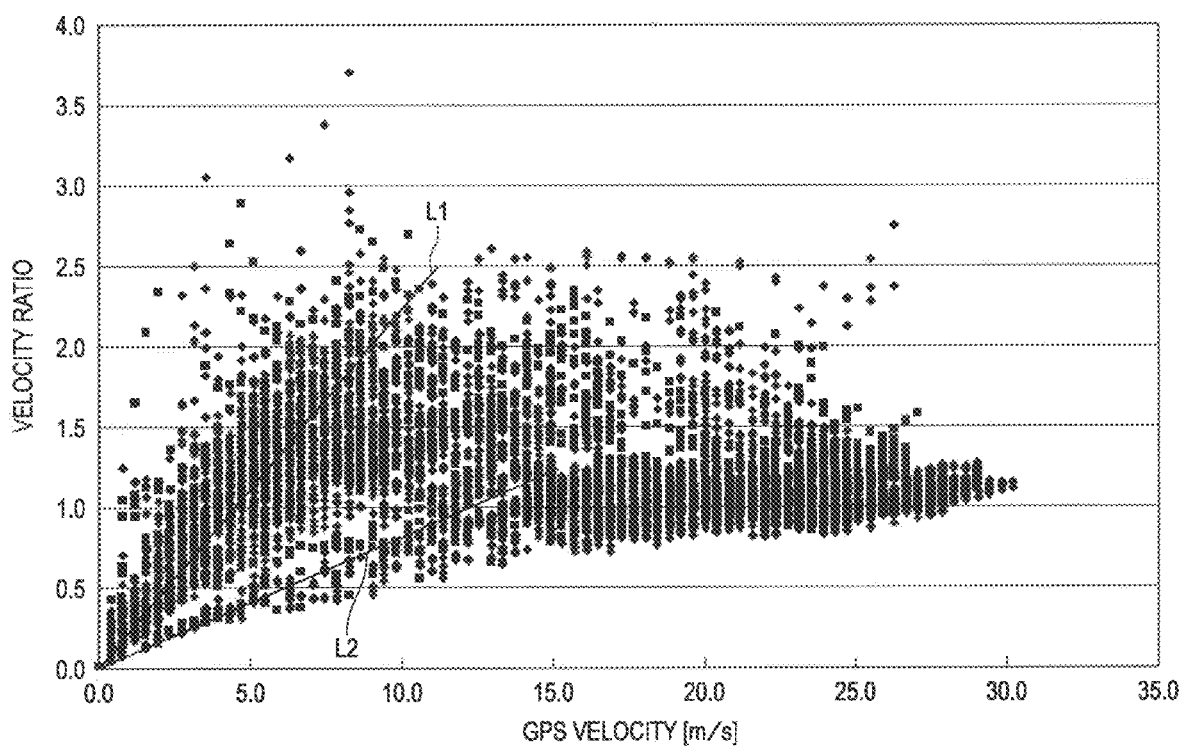
FIG. 46 is a graph illustrating a third relationship between the GPS velocity and the velocity ratio.

3-2-2. Principle of Velocity Correction during Acceleration and Deceleration FIG. 46 is a graph corresponding to FIG. 39 and illustrating the relationship between the GPS velocity VG and the velocity ratio RV including the cases when the vehicle is accelerating and decelerating. As can be seen from FIG. 46, there is a distribution around a line L1 and a distribution around a line L2.

The distribution around the line L2 will be described. As described above, the PND 70 calculates the velocity V in accordance with equation (3), which is rewritten from equation (1), using the difference between the maximum and minimum values of the acceleration $\alpha_z$ and the difference between the maximum and minimum values of the pitch rate $\omega_y$ in a certain range of data points.

First, a case in which the maximum and minimum values in the range of the data points are generated due to a change in the radius of curvature R in the range and in which the velocity V does not change in the range will be described.

Figure 47A:
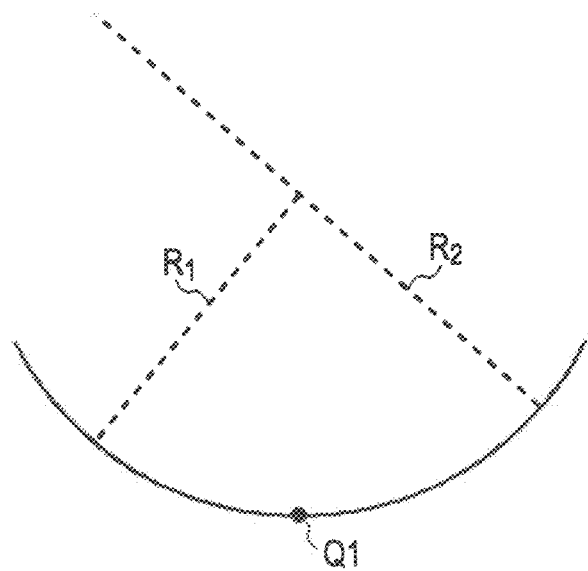
FIGS. 47A and 47B are diagrams illustrating changes in the radius of curvature.

FIG. 47A illustrates a case in which the radius of curvature of a road surface changes from $R_1$ to $R_2$ (or $R_2$ to $R_1$) at a connection point Q1 while the shape of the road surface remains concave (or convex). It is assumed that $R_2 > R_1$. In this case, equation (3) can be rewritten as the following equation (17).

$$\frac{\alpha_{z,max} - \alpha_{z,min}}{\omega_{y,max} - \omega_{y,min}} = \frac{\frac{V^2}{R_1} - \frac{V^2}{R_2}}{\frac{V}{R_1} - \frac{V}{R_2}} = V \cdot \frac{\frac{1}{R_1} - \frac{1}{R_2}}{\frac{1}{R_1} - \frac{1}{R_2}} = V \quad (17)$$

Figure 47B:
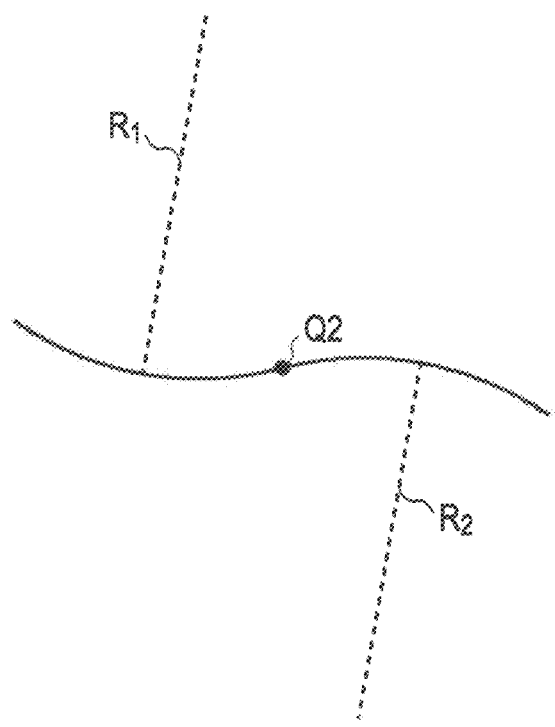

FIG. 47B illustrates a case in which the radius of curvature of a road surface changes from $R_1$ to $R_2$ (or $R_2$ to $R_1$) at a connection point Q2 while the shape of the road surface changes from concave to convex (or convex to concave). In this case, equation (3) can be rewritten as the following equation (18).

$$\frac{\alpha_{z,max} - \alpha_{z,min}}{\omega_{y,max} - \omega_{y,min}} = \frac{\frac{V^2}{R_1} + \frac{V^2}{R_2}}{\frac{V}{R_1} + \frac{V}{R_2}} = V \cdot \frac{\frac{1}{R_1} + \frac{1}{R_2}}{\frac{1}{R_1} + \frac{1}{R_2}} = V \quad (18)$$

As can be seen from equations (17) and (18), even when the radius of curvature changes in the range of the data points, the velocity V can be accurately calculated using equation (3) irrespective of whether or not the shape of the road surface changes from concave to convex (or convex to concave).

Next, a case in which the radius of curvature R does not change and the velocity V of the vehicle changes in the range of the data points will be described.

Figure 48:
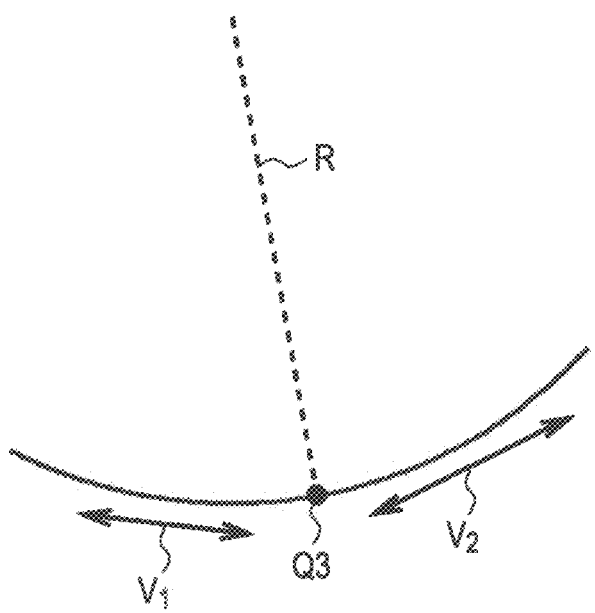
FIG. 48 is a diagram illustrating a change in is the velocity.

FIG. 48 illustrates a case in which the velocity V changes from $V_1$ to $V_2$ (or $V_2$ to $V_1$) at a shift point Q3 on a road surface having a radius of curvature R. It is assumed that $V_2 > V_1$. In this case, equation (3) can be rewritten as the following equation (19).

$$\frac{\alpha_{z,max} - \alpha_{z,min}}{\omega_{y,max} - \omega_{y,min}} = \frac{\frac{V_2^2}{R} - \frac{V_1^2}{R}}{\frac{V_2}{R} - \frac{V_1}{R}} = \frac{V_2^2 - V_1^2}{V_2 - V_1} = V_2 + V_1 \quad (19)$$

As can be seen from equation (19), it is difficult to accurately calculate the velocity V using equation (3) in the case illustrated in FIG. 48.

Figure 49A:
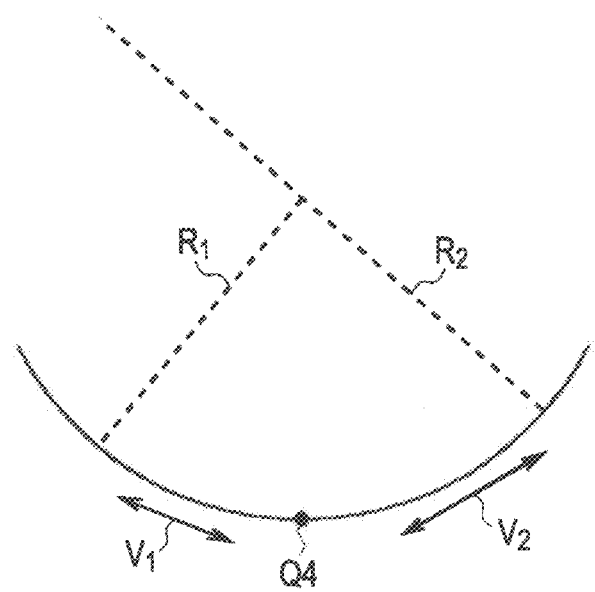
FIGS. 49A and 49B are diagrams illustrating changes in the radius of curvature and the velocity.

Next, a case in which the radius of curvature R changes and the velocity changes in the range of the data points will be described. FIG. 49A illustrates a case in which the radius of curvature of a road surface changes from $R_1$ to $R_2$ at a connection point Q4 while the road surface remains concave (or convex) and the velocity V of the vehicle changes from $V_1$ to $V_2$ (or $V_1$ to $V_2$).

It is assumed that $R_2 > R_1$ and $V_2 > V_1$. For convenience of calculation, it is assumed that $R_1 = R$, $R_2 = R + \Delta R$, $V_1 = V$, and $V_2 = V + \Delta V$.

In this case, equation (3) can be rewritten as the following equation (20).

$$\begin{aligned}\frac{\alpha_{z,max} - \alpha_{z,min}}{\omega_{y,max} - \omega_{y,min}} &= \frac{\frac{(V+\Delta V)^2}{(R+\Delta R)} - \frac{V^2}{R}}{\frac{(V+\Delta V)}{(R+\Delta R)} - \frac{V}{R}} \\ &= \frac{R(V+\Delta V)^2 - V^2(R+\Delta R)}{R(V+\Delta V) - V(R+\Delta R)} \\ &= \frac{V(2R \cdot \Delta V - V \cdot \Delta R) + R(\Delta V)^2}{R \cdot \Delta V - V \cdot \Delta R} \\ &= \left(V + \frac{\Delta V}{2}\right) + \frac{\Delta V\left(RV + \frac{R \cdot \Delta V}{2} + \frac{V \cdot \Delta R}{2}\right)}{R \cdot \Delta V - V \cdot \Delta R}\end{aligned} \quad (20)$$

In equation (20), when $R \cdot \Delta V = V \cdot \Delta R$, i.e., when $(\Delta R/R) = (\Delta V/V)$, the error term is infinite.

The constant K can be represented by the following equation (21) by rewriting equation (13).

$$K = \frac{R_2 - R_1}{R_2 + R_1} = \frac{\Delta R}{2R + \Delta R} \approx 1.0 \times 10^{-6} \quad (21)$$

Equation (21) shows that $(\Delta R/R)$ has an order of $1.0 \times 10^{-6}$. Thus, the velocity V can be approximated by equation (22) by rewriting equation (20).

$$\begin{aligned}\frac{\alpha_{z,max} - \alpha_{z,min}}{\omega_{y,max} - \omega_{y,min}} &= \left(V + \frac{\Delta V}{2}\right) + \frac{\Delta V\left(RV + \frac{R \cdot \Delta V}{2} + \frac{V \cdot \Delta R}{2}\right)}{R \cdot \Delta V - V \cdot \Delta R} \\ &= V + \frac{\Delta V\left(1 + \frac{\Delta V}{2V} + \frac{\Delta R}{2R}\right)}{\frac{\Delta V}{V} - \frac{\Delta R}{R}} \\ &\approx V + \frac{\Delta V\left(1 + \frac{\Delta V}{V}\right)}{\frac{\Delta V}{V}} = V + (V + \Delta V)\end{aligned} \quad (22)$$

As can be seen from equation (22), in the case illustrated in FIG. 49A, that is, when the maximum and minimum values of the acceleration $\alpha_z$ have the same sign and the maximum and minimum values of the pitch rate $\omega_y$ have the same sign, the velocity V is approximately doubled, and it is difficult to accurately calculate the velocity V.

In addition, equation (22) supports the fact that the slope of the line L2 is about the half of the slope of line L1 in FIG. 46.

Figure 49B:
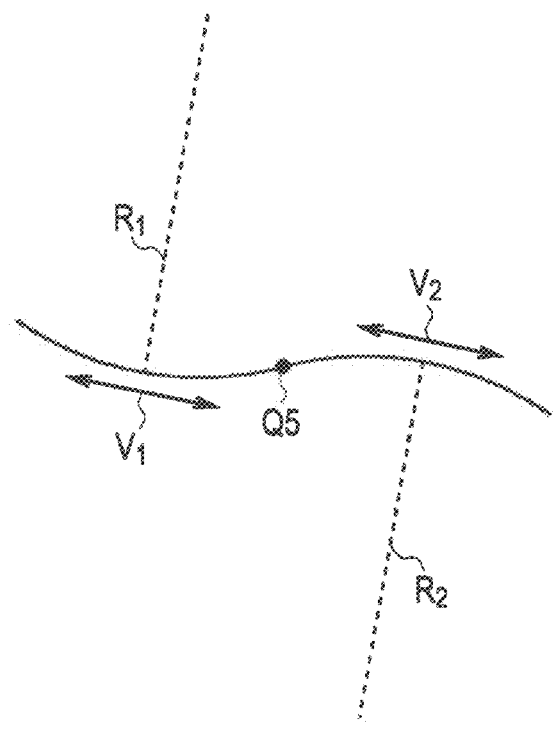

FIG. 49B illustrates a case in which the radius of curvature of a road surface changes from $R_1$ to $R_2$ at a connection point Q5 while the shape of the road surface changes from convex to concave (or concave to convex) and the velocity V of the vehicle changes from $V_1$ to $V_2$. In this case, equation (3) can be rewritten as the following equation (23).

$$\frac{\alpha_{z,max} - \alpha_{z,min}}{\omega_{y,max} - \omega_{y,min}} = \frac{\frac{(V+\Delta V)^2}{(R+\Delta R)} + \frac{V^2}{R}}{\frac{(V+\Delta V)}{(R+\Delta R)} + \frac{V}{R}} \quad (23)$$

$$= \frac{R(V+\Delta V)^2 + V^2(R+\Delta R)}{R(V+\Delta V) + V(R+\Delta R)}$$

$$= \frac{2RV^2 + \Delta RV + 2RV\Delta V + R(\Delta V)^2}{2RV + R\Delta V + V\Delta R}$$

$$= \frac{\left(V + \frac{\Delta V}{2}\right)(2RV + R\Delta V + V\Delta R) + \frac{R}{2}(\Delta V)^2 - \frac{V}{2}\Delta V \Delta R}{2RV + R\Delta V + V\Delta R}$$

$$= \left(V + \frac{\Delta V}{2}\right) + \frac{\frac{\Delta V}{2}(R\Delta V - V\Delta R)}{2RV + R\Delta V + V\Delta R}$$

In equation (23), when $R \cdot \Delta V = V \cdot \Delta R$, i.e., when $(\Delta R/R) = (\Delta V/V)$, the error term is approximately "0". In this case, the velocity V can be accurately calculated.

As shown in equation (21), $(\Delta R/R)$ has an order of $1.0 \times 10^{-6}$ and is extremely smaller than $(\Delta V/V)$. Therefore, the velocity V can be approximated as shown in the following equation (24) by rewriting equation (23).

$$\frac{\alpha_{z,max} - \alpha_{z,min}}{\omega_{y,max} - \omega_{y,min}} = \left(V + \frac{\Delta V}{2}\right) + \frac{\frac{\Delta V}{2}(R\Delta V - V\Delta R)}{2RV + R\Delta V + V\Delta R} \quad (24)$$

$$= \left(V + \frac{\Delta V}{2}\right) + \frac{\frac{\Delta V}{2}\left(\frac{\Delta V}{V} - \frac{\Delta R}{R}\right)}{2 + \frac{\Delta V}{V} + \frac{\Delta R}{R}}$$

$$\approx \left(V + \frac{\Delta V}{2}\right) + \frac{\frac{\Delta V}{2} \cdot \frac{\Delta V}{V}}{2 + \frac{\Delta V}{V}}$$

$$= \left(V + \frac{\Delta V}{2}\right) + \frac{\left(\frac{\Delta V}{2}\right)^2}{\left(V + \frac{\Delta V}{2}\right)}$$

As can be seen from equation (24), in the case illustrated in FIG. 49B, the lower the velocity V of the vehicle and the larger the change in the velocity (i.e., the value of $\Delta V$), the larger is the error term.

Thus, when the velocity V changes in the range of the data points, the PND 70, which calculates the velocity V using equation (3), can accurately calculate the velocity V when the maximum and minimum values of the acceleration $\alpha_z$ have different signs and the maximum and minimum values of the pitch rate $\omega_y$ have different signs, but calculates the velocity V that is about double the true velocity when the maximum and minimum values of the acceleration $\alpha_z$ have the same sign and the maximum and minimum values of the pitch rate $\omega_y$ have the same sign.

3-2-3. Structure of Velocity Calculator

In accordance with the aforementioned principle of velocity correction, the velocity calculator 72 according to the third embodiment corrects the velocity V by using the velocity model, and corrects the velocity V in accordance with the signs of the maximum and minimum values of the acceleration $\alpha_z$ and the pitch rate $\omega_y$.

FIG. 50 is a block diagram of the velocity calculator 72, in which parts corresponding to those of FIG. 8 are represented by the same numerals. As illustrated in FIG. 50, as compared with the velocity calculator 22, the velocity calculator 72 further includes a measurement error calculator 81, a constant calculator 82, and a velocity corrector 83 interposed between the smoother/noise filter 35 and the velocity output section 36.

The measurement error calculator 81 acquires the acceleration data AD2 and the pitch rate data PD2 from the low pass filter 33 and acquires the GPS velocity VG from the GPS processor 21 (FIG. 43).

When the GPS velocity VG is within a range that can be regarded as "0" (for example, lower than 0.1 m/s), the measurement error calculator 81 calculates the standard deviations of the acceleration $\alpha_z$ and the pitch rate $\omega_y$ that have been obtained as the acceleration data AD2 and the pitch rate data PD2 in the last one second.

The measurement error calculator 81 multiplies each of the standard deviations of the acceleration $\alpha_z$ and the pitch rate $\omega_y$ by a predetermined factor to generate the measurement error $\Delta\alpha_z$ of acceleration and the measurement error $\Delta\omega_y$ of pitch rate, and supplies the measurement errors $\Delta\alpha_z$ and $\Delta\omega_y$ to the constant calculator 82 and the velocity corrector 83.

The constant calculator 82 acquires the GPS velocity VG from the GPS processor 21, the velocity data VD from the smoother/noise filter 35, and the measurement error $\Delta\alpha_z$ of acceleration and the measurement error $\Delta\omega_y$ of pitch rate from the measurement error calculator 81.

When the constant calculator 82 can obtain the GPS velocity VG and the vehicle is not at rest (for example, when the velocity is equal to or higher than 0.1 m/s), the constant calculator 82 calculates the constant K using equation (16) so as to perform constant calculation.

As in the case of the correction factor C in the second embodiment, the constant calculator 82 stores the preceding constant K (hereinafter referred to as a preceding constant $K_{n-1}$), and updates the constant K while standardizing the constant K using the latest constant K (hereinafter referred to as a latest constant $K_n$).

To be specific, the constant calculator 82 calculates the latest constant K using the following equation (25) from a constant M, which is a time constant, and supplies the latest constant K to the velocity corrector 83.

$$K = \frac{K_{n-1} \times (M-1) + K_n}{M} \quad (25)$$

The velocity corrector 83 acquires the maximum acceleration $\alpha_{z,max}$, the minimum acceleration $\alpha_{z,min}$, the maximum pitch rate $\omega_{y,max}$, and the minimum pitch rate $\omega_{y,min}$ from the velocity calculating section 34, and acquires the velocity data VD from the smoother/noise filter 35. The velocity corrector 83 acquires the measurement error $\Delta\alpha_z$ of acceleration and the measurement error $\Delta\omega_y$ of pitch rate from the measurement error calculator 81, the constant K from the constant calculator 82, and the GPS velocity VG from the GPS processor 21.

The velocity corrector 83 halves the velocity V at least when the maximum acceleration $\alpha_{a,max}$ and the minimum acceleration $\alpha_{z,min}$ have the same sign or when the maximum pitch rate $\omega_{y,max}$ and the minimum pitch rate $\omega_{y,min}$ have the same sign.

Next, when the velocity corrector 83 can acquire the GPS velocity VG from the GPS processor 21, the velocity corrector 83 directly supplies the velocity data VD to the velocity output section 36.

When it is difficult for the velocity corrector 83 to acquire the GPS velocity VG from the GPS processor 21, the velocity corrector 83 calculates the true velocity VT using equation (15) from the measurement error $\Delta\alpha_z$ of acceleration, the measurement error $\Delta\omega_y$ of pitch rate, and the constant K. In this case, the velocity corrector 83 corrects the velocity V using equation (15).

Subsequently, the velocity corrector 83 supplies the true velocity VT, i.e., the velocity V that has been corrected, to the velocity output section 36 as the velocity data VD, and the velocity output section 36 outputs the velocity data VD to the position calculator 25 (FIG. 43).

Thus, when the velocity calculator 72 acquires the GPS velocity VG, when the vehicle is at rest, the velocity calculator 72 updates the measurement error $\Delta\alpha_z$ of acceleration and the measurement error $\Delta\omega_y$ of pitch rate, and when the vehicle is moving, the velocity calculator 72 updates the constant K. When it is difficult for the velocity calculator 72 to acquire the GPS velocity VG, the velocity calculator 72 corrects the velocity V using the constant K.

3-2-4. Process of Velocity Correction

Figure 51:
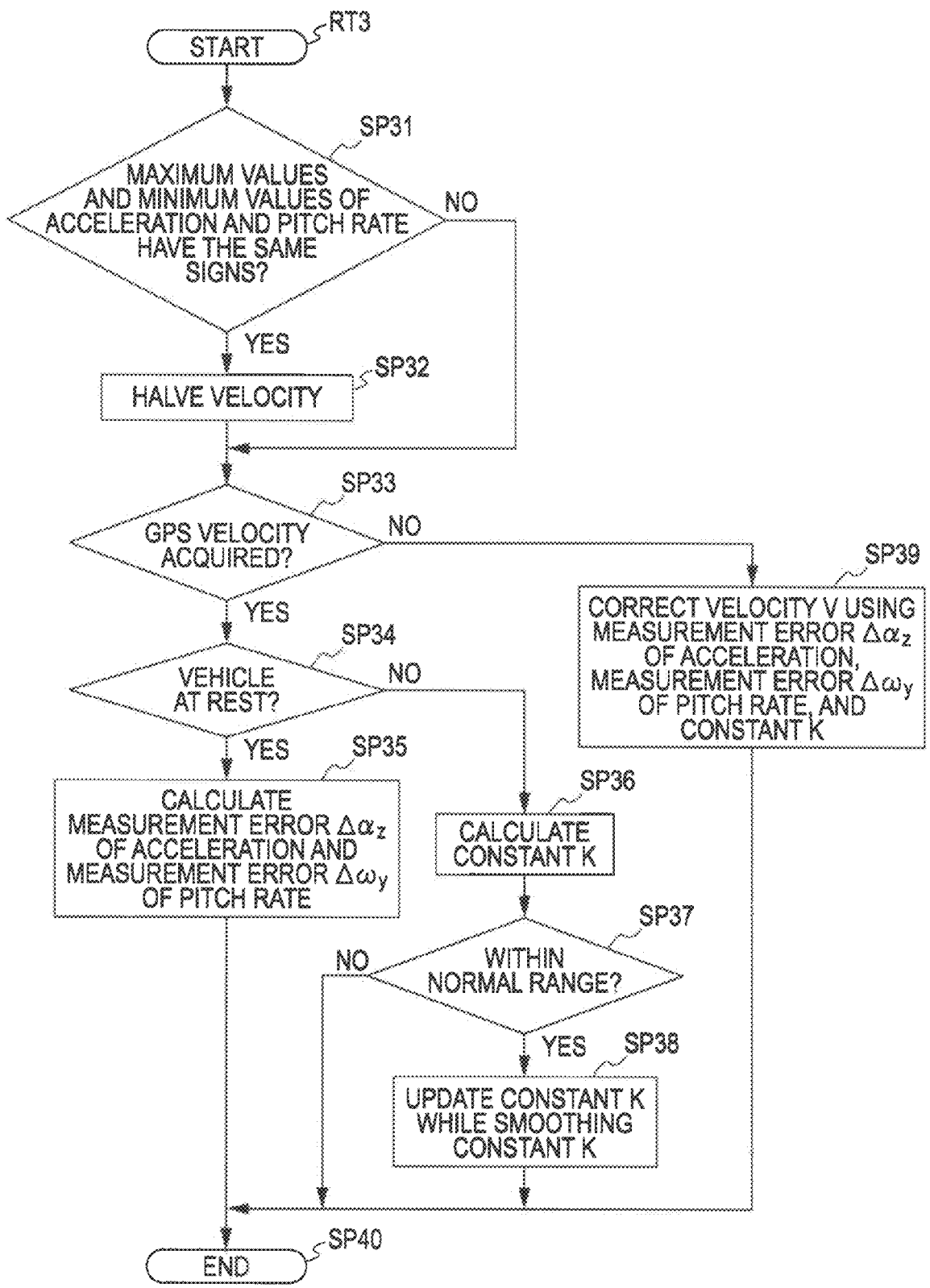
FIG. 51 is a flowchart illustrating a process of velocity correction according to the third embodiment.

Referring to the flowchart of FIG. 51, a velocity correction process RT3, which is performed by the velocity calculator 72 of the controller 71 of the PND 70, will be described.

The controller 71 starts the process from a start step of a routine RT3, and in step SP31, and the velocity corrector 83 of the controller 71 determines whether or not at least the maximum and minimum accelerations $\alpha_{z,max}$ and $\alpha_{z,min}$ have the same sign or the maximum and minimum pitch rates $\omega_{y,max}$ and $\omega_{y,min}$ have the same sign. If the determination is yes, which means that the velocity V that has been calculated is about twice the true velocity V, the controller 71 proceeds to step SP32.

In step SP32, the velocity corrector 83 of the controller 71 halves the velocity V, and the controller 71 proceeds to step SP33.

If the determination in step SP31 is no, which means that the velocity V is accurate and it is not necessary to halve the velocity V, the controller 71 proceeds to step SP33.

In step SP33, the smoother/noise filter 35 of the controller 71 performs predetermined smoothing and noise filtering, and the controller 71 determines whether or not the GPS velocity VG has been acquired from the GPS processor 21. If the determination is yes, which means that it is necessary to perform learning of the measurement error $\Delta\alpha_z$ of acceleration and the measurement error $\Delta\omega_y$ of pitch rate or learning of the constant K, the controller 71 proceeds to step SP34.

In step SP34, the controller 71 determines whether or not the vehicle is at rest by comparing the GPS velocity VG with a predetermined threshold. If the determination is yes, which means that it is necessary to calculate the measurement error $\Delta\alpha_z$ of acceleration and the measurement error $\Delta\omega_y$ of pitch rate, the controller 71 proceeds to step SP35.

In step SP35, the measurement error calculator 81 of the controller 71 calculates the standard deviations of the acceleration $\alpha_z$ and the pitch rate $\omega_y$ that have been obtained in the last one second. The measurement error calculator 81 multiplies each of the standard deviations of the acceleration $\alpha_z$ and the pitch rate $\omega_y$ by a predetermined factor to generate the measurement error $\Delta\alpha_z$ of acceleration and the measurement error $\Delta\omega_y$ pitch rate, and the controller 71 proceeds to step SP40 and finishes the process.

If the determination in step SP34 is no, which means that the vehicle is moving and it is necessary to calculate the constant K, the controller 71 proceeds to step SP36.

In step SP36, the constant calculator 82 of the controller 71 calculates the constant K using equation (16) from the velocity V, the GPS velocity VG, the measurement error $\Delta\alpha_z$ of acceleration, and the measurement error $\Delta\omega_y$ of pitch rate, and the controller 71 proceeds to step SP37.

In step SP37, the controller 71 determines whether or not the constant K is within a predetermined normal range. If the determination is yes, which means that the constant K can be used to correct the velocity V, the controller 71 proceeds to step SP38.

In step SP38, the controller 71 standardizes the constant K using equation (25) and updates the constant K, and stores the constant K that has been updated as the latest constant K. Subsequently, the controller 71 proceeds to step SP40 and finishes the process.

If the determination in step SP37 is no, this means that the constant K that has been calculated is an abnormal value in that, for example, an user acceleration component that is generated when, for example, a user touches a touch panel is included in the velocity V. Thus, the controller 71 does not use the constant K that has been calculated, proceeds to step SP40, and finishes the process.

If the determination in step SP33 is no, which means that it is difficult to receive GPS signals from the GPS satellites and it is necessary to calculate the present position and the like of the vehicle on the basis of the velocity V calculated by the velocity calculator 72, the controller 71 proceeds to step SP39.

In step SP39, the velocity corrector 83 of the controller 71 corrects the velocity V by calculating the true velocity VT using equation (15) from the velocity V, the latest constant K, the latest measurement error $\Delta\alpha_z$ of acceleration, and the latest measurement error $\Delta\omega_y$ of pitch rate. Next, the controller 71 supplies the true velocity VT to the velocity output section 36 as a new value of the velocity V, proceeds to step SP40, and finishes the process.

3-3. Operation and Effect

In the PND 70 according to the second embodiment and having the structure described above, the three-axis acceleration sensor 4 detects the acceleration $\alpha_z$ along the Z axis perpendicular to direction of travel of the vehicle, which is generated due to the undulation of a road surface, and the Y axis gyro sensor 5 detects the pitch rate $\omega_y$ around the Y axis perpendicular to the direction of travel of the vehicle, which is generated due to the undulation of a road surface.

The PND 70 calculates the velocity V using equation (1) or (3) on the basis of the acceleration $\alpha_z$ detected by the three-axis acceleration sensor 4 and the pitch rate $\omega_y$ detected by the Y axis gyro sensor 5.

When it is difficult for the PND 70 to acquire the GPS velocity VG, the velocity corrector 83 of the PND 70 calculates the true velocity VT in accordance with equation (15) from the constant K as the velocity V after correction.

Thus, as with the first embodiment, the PND 70, which has a simple structure including the three-axis acceleration sensor 4 and the Y axis gyro sensor 5, can accurately calculate the velocity V of the vehicle under all road conditions even when it is difficult for the PND 70 to receive GPS signals.

Moreover, when it is difficult for the PND 70 to receive the GPS velocity VG, the PND 70 can appropriately correct the velocity V by using the velocity model in accordance with the velocity V, whereby an error included in the velocity V after correction can be considerably reduced.

When the PND 70 can acquire the GPS velocity VG and the vehicle is moving, the constant calculator 82 calculates the constant K in accordance with the velocity V. Thus, the PND 70 can appropriately calculate the constant K by using the GPS velocity VG that is comparatively accurate, so that the PND 70 can correct the velocity V using the latest constant K when it is difficult to acquire the GPS velocity VG.

When the PND 70 can acquire the GPS velocity VG, the measurement error calculator 81 of the PND 70 calculates the measurement error $\Delta\alpha_z$ of acceleration and the measurement error $\Delta\omega_y$ of pitch rate while the vehicle is at rest. Thus, the PND 70 can update the measurement error $\Delta\alpha_z$ of acceleration the measurement error $\Delta\omega_y$ of pitch rate, which may change at any time.

The PND 70 halves the velocity V when the maximum and the minimum values of the acceleration $\alpha_z$ have the same sign and the maximum and minimum values of the pitch rate $\omega_y$ have the same sign, so that the PND 70 can appropriately correct an error that may be generated due to the principle of calculating the velocity V.

In other respects, the PND 70 according to the third embodiment has the same operational effect as the PND 1 of the first embodiment.

With the above structure, the PND 70 detects the acceleration $\alpha_z$ along the Z axis, which is generated due to the undulation of a road surface, and the pitch rate $\omega_y$ around the Y axis, which is generated due to the undulation of the road surface, and calculates the velocity V using the acceleration $\alpha_z$ and the pitch rate $\omega_y$, thereby accurately calculating the velocity V under all road conditions. Moreover, the PND 70 corrects the velocity V using the velocity model so as to correct the velocity V in accordance with the velocity V, whereby the error included in the velocity V can be considerably reduced.

4. Other Embodiments

In the second embodiment, the velocity region of the velocity V are divided into the high velocity region and the low velocity region, and two correction factors C, including the low-speed correction factor C1 and the high-speed correction factor C2, are used for respective velocity regions.

However, the present invention is not limited thereto. For example, a common correction factor C may be used for all velocity regions. Alternatively, the velocity region of the velocity V may be divided into three or more regions and different correction factors may used for respective velocity regions. As a further alternative, the velocity V may not be corrected in some of the regions. Boundary values between the velocity regions may be appropriately determined in accordance with, for example, the relationship between the velocity V and an error included in the velocity V.

In the second embodiment, the velocity V is corrected by multiplying the velocity V by the correction factor C for respective velocity regions in accordance with equation (7).

However, the present invention is not limited thereto. For example, the velocity V may be corrected by using another calculation method represented by, for example, a linear function having a constant term, a polynomial function of a second or a higher order, or an exponential function. In this case, factors and constants may be different in accordance with the velocity regions, or the functions may be different in accordance with the velocity regions.

In the second embodiment, when the GPS velocity VG can be acquired, the correction factor C is not calculated nor updated while the vehicle is accelerating or decelerating.

However, the present invention is not limited thereto. When the GPS velocity VG can be obtained, the correction factor C may not be calculated and updated depending on other conditions. Alternatively, when, for example, it is clear beforehand that errors generated due to acceleration, deceleration, and orientation change are substantially small and negligible, the correction factor C may be calculated and updated while the vehicle is accelerating or decelerating.

In the second embodiment, the low-speed correction factor C1 and the high-speed correction factor C2 are standardized using equation (5) and (6) and updated.

However, the present invention is not limited thereto. The low-speed correction factor C1 and the high-speed correction factor C2 may be updated by using another calculation method, such averaging the values calculated in the last five minutes and using the average as the updated value. Alternative, the low-speed correction factor C1 and the high-speed correction factor C2 may be fixed without updates.

In the third embodiment, the velocity V is modeled using a velocity model represented by equation (14), and the velocity V is corrected using equation (15).

The present invention is not limited thereto. The velocity V may be modeled by using a velocity model represented by another equation including the true velocity (i.e., the GPS velocity VG), and the equation may be solved with respect to the true velocity, and the true velocity (i.e., the velocity V after correction) may be calculated using the equation.

In the third embodiment, when the GPS velocity VG can be acquired, the constant K is calculated using equation (16), and the constant K is standardized using equation (25) and updated.

However, the present invention is not limited thereto. The constant K may be calculated by using another calculation method for an appropriate period, such as averaging of the values of the constant K that have been calculated in the last ten minutes and using the average as the updated constant K. Alternatively, an optimal constant K may be calculated beforehand and fixed without updates.

In the third embodiment, the standard deviations of the acceleration $\alpha_z$ and the pitch rate $\omega_y$ obtained in the last one second are respectively multiplied by predetermined factors to generate the measurement error $\Delta\alpha_z$ of acceleration and the measurement error $\Delta\omega_y$ of pitch rate.

However, the present invention is not limited thereto, and another calculation method, such as averaging the acceleration $\alpha_z$ and the pitch rate $\omega_y$ that have been calculated in the last five seconds and using the averages as the updated values measurement error $\Delta\alpha_z$ of acceleration and the measurement error $\Delta\omega_y$ of pitch rate, may be used. Alternatively, accurate values of the measurement error $\Delta\alpha_z$ of acceleration and the measurement error $\Delta\omega_y$ of pitch rate may be calculated beforehand and may be fixed without updates.

In the third embodiment, the velocity V is corrected in accordance with equation (15) from the constant K irrespective of the values of the velocity V. However, the present invention is not limited thereto. For example, the velocity V may be corrected when the velocity V is within a predetermined velocity region.

In the third embodiment, when the maximum and minimum values of the acceleration $\alpha_z$ haven the same sign and the maximum and minimum values of the pitch rate $\omega_y$ have the same sign, the velocity V is halved. However, the present invention is not limited thereto. For example, when it is very unlikely that the maximum and minimum values of the acceleration $\alpha_z$ have the same sing and the maximum and minimum values of the pitch rate $\omega_y$ have the same sign, the velocity V may not be halved and only the correction using equation (15) may be performed. Alternatively, in the second embodiment, the velocity V may be halved when the maximum and minimum values of the acceleration $\alpha_z$ have the same sign and the maximum and minimum values of the pitch rate $\omega_y$ have the same sign.

In the above embodiments, the velocity V is calculated using equation (3) on the basis of the maximum and minimum accelerations $\alpha_{z,min}$ and $\alpha_{z,max}$, which are extracted from the acceleration $\alpha_z$ corresponding to the acceleration data AD2, and the maximum and minimum angular velocities $\omega_{y,max}$ and $\omega_{y,min}$, which are extracted from the pitch rate $\omega_y$ corresponding to the angular velocity data DD2.

However, the present invention is not limited thereto. The velocity calculating section 34 may calculate the variances of the acceleration $\alpha_z$ corresponding to the acceleration data AD2 and the pitch rate $\omega_y$ corresponding to the pitch rate data PD2, which are supplied by the low pass filter 33, for, for example, a range of 25 data points or 75 data points around the data point $P_m$ corresponding to the previous position P0. Then, the velocity calculating section 34 may calculate the velocity V by dividing the variance of the acceleration $\alpha_z$ by the variance of the pitch rate $\omega_y$.

Alternatively, the velocity calculating section 34 may calculate the deviations of the acceleration $\alpha_z$ corresponding to the acceleration data AD2 and the pitch rate $\omega_y$ corresponding to the pitch rate data PD2, which are supplied by the low pass filter 33, for, for example, a range of 25 data points or 75 data points around the data point $P_m$ corresponding to the previous position P0. Then, the velocity calculating section 34 may calculate the velocity V by dividing the deviation of the acceleration $\alpha_z$ by the deviation of the pitch rate $\omega_y$. In these cases, the velocity model of the third embodiment may be modeled by using an equation corresponding to the velocity V.

In the above embodiments, the three-axis acceleration sensor 4, the Y axis gyro sensor 5, and the Z axis gyro sensor 6 respectively measure the accelerations $\alpha_x$, $\alpha_y$, $\alpha_z$, the pitch rates $\omega_y$, and the yaw rate $\omega_z$ with a sampling frequency of 50 Hz. However, the present invention is not limited thereto. The three-axis acceleration sensor 4, the Y axis gyro sensor 5, and the Z axis gyro sensor 6 may respectively measure the accelerations $\alpha_x$, $\alpha_y$, $\alpha_z$, the pitch rates $\omega_y$, and the yaw rate $\omega_z$ with a sampling frequency of, for example, 10 Hz instead of 50 Hz.

In the above embodiments, the velocity V is calculated using the acceleration $\alpha_z$ and the pitch rate $\omega_y$ that are detected with a sampling frequency of 50 Hz. However, the present invention is not limited thereto. The velocity calculators 22, 52 and 72 may calculate the averages of the acceleration $\alpha_z$ and the pitch rate $\omega_y$, which are detected with a sampling frequency of 50 Hz, for, for example, every 25 data points, and may calculate the velocity V from the averages of the acceleration $\alpha_z$ and the pitch rate $\omega_y$.

In this case, the velocity calculators 22, 52 and 72 calculate the averages of the acceleration $\alpha_z$ and pitch rate $\omega_y$, which are detected with a sampling frequency of 50 Hz, for, for example, every 25 data points, thereby calculating the velocity V twice per second. Thus, a processing load for the controllers 11, 51 and 71 due to velocity calculation can be reduced.

In the above embodiments, the high pass filter 32 performs high pass filtering on the acceleration data AD and the pitch rate data PD, which have been detected by the three-axis acceleration sensor 4 and the Y axis gyro sensor 5. However, the present invention is not limited thereto. The PNDs 1, 50 and 70 may not perform high pass filtering on the acceleration data AD and the pitch rate data PD, which have been detected by the three-axis acceleration sensor 4 and the Y axis gyro sensor 5.

In the above embodiments, the high pass filter 32 and the low pass filter 33 perform high pass filtering and low pass filtering on the acceleration data AD and the pitch rate data PD, which have been detected by the three-axis acceleration sensor 4 and the Y axis gyro sensor 5. However, the present invention is not limited thereto. The PNDs 1, 50 and 70 may perform, in addition to the high pass filtering and low pass filtering, moving average filtering on the acceleration data AD and the pitch rate data PD. The PNDs 1, 50 and 70 may perform filtering that is an appropriate combination of high pass filtering, low pass filtering, and moving average filtering on the acceleration data AD and the pitch rate data PD.

In the above embodiments, the PNDs 1, 50 and 70 perform navigation while the PNDs 1, 50, and 70 are supplied with electric power. However, the present invention is not limited thereto. When the power button (not shown) is pressed and the PNDs 1, 50, and 70 are powered off, the PNDs 1, 50 and 70 may store, in the memory 12, the present position, the height, and the like at the moment when the power button is pressed. When the power button is pressed again and the PNDs 1, 50 and 70 are powered on, the PNDs 1, 50, and 70 may read the present position, the height, and the like from the memory 12, and may perform navigation on the basis of the present position, the height, and the like in accordance with the process of calculating the present position.

In the above embodiments, the PNDs 1, 50 and 70 calculate the velocity V while the PNDs 1, 50, and 70 are supported on the cradle 3 placed on the dashboard of the vehicle. However, the present invention is not limited thereto. When it is detected that the PNDs 1, 50 and 70 are mechanically or electrically disconnected from the cradle 3, the velocity V may be set at 0 or maintained at the former velocity $V_{n-1}$.

Figure 52:
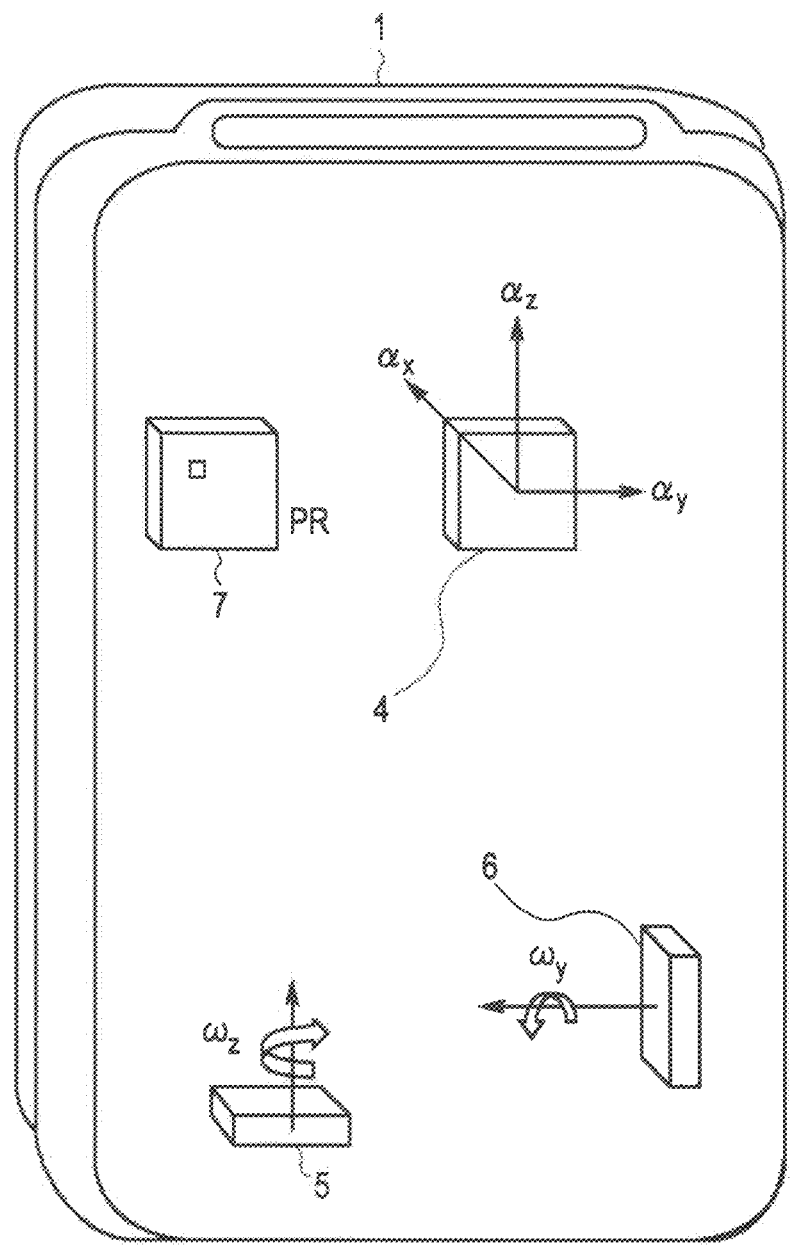
FIG. 52 is a diagram illustrating an example of the way the PND is used according to another embodiment.

In the above embodiments, the PNDs 1, 50 and 70 are used in a landscape position. However, the present invention is not limited thereto. As illustrated in FIG. 52, the PNDs 1, 50 and 70 may be used in a portrait position. In this position, the PNDs 1, 50 and 70 may detect the yaw rate $\omega_z$ around the Z axis with the Y axis gyro sensor 5 and the pitch rate $\omega_y$ around the Y axis with the Z axis gyro sensor 6.

In the above embodiments, the three-axis acceleration sensor 4, the Y axis gyro sensor 5, the Z axis gyro sensor 6, and the barometric pressure sensor 7 are disposed inside the PNDs 1, 50 and 70. However, the present invention is not limited thereto. The three-axis acceleration sensor 4, the Y axis gyro sensor 5, the Z axis gyro sensor 6, and the barometric pressure sensor 7 may be disposed outside the PNDs 1, 50 and 70.

The PNDs 1, 50 and 70 may include an adjustment mechanism disposed on a side of the case thereof so that a user can adjust the attachment angles of the three-axis acceleration sensor 4, the Y axis gyro sensor 5, the Z axis gyro sensor 6, and the barometric pressure sensor 7.

In this case, the PNDs 1, 50 and 70 allow a user to adjust the adjustment mechanism so that, for example, the rotation axis of the Y axis gyro sensor 5 is aligned in the vertical direction with respect to the vehicle even when the display 2 is not substantially perpendicular to the direction of travel of the vehicle.

In the above embodiments, the velocity V is determined as excessively high if the pitch rate $\omega_y$ corresponding to the pitch rate data PD2 is lower than a predetermined threshold and if the acceleration $\alpha_z$ corresponding to the acceleration data AD2 and the pitch rate $\omega_y$ corresponding to the pitch rate data PD2 are higher than predetermined thresholds. However, the present invention is not limited thereto. The controllers 11, 51 and 71 may determine that the velocity V is excessively high if the velocity V calculated by the velocity calculating section 34 is higher than the former velocity $V_{n-1}$ by a predetermined value.

In this case, the smoother/noise filter 35 may set the velocity V at 0 when the velocity V calculated by the velocity calculating section 34 is higher than the former velocity $V_{n-1}$ by a predetermined value and when the former velocity is at a low velocity lower than, for example, 10 km/h. The smoother/noise filter 35 may set the velocity V at the former velocity $V_{n-1}$ when the velocity V calculated by the velocity calculating section 34 is higher than the former velocity $V_{n-1}$ by a predetermined value and the former velocity is equal to or higher than, for example, 10 km/h.

In the above embodiments, the PNDs 1, 50 and 70 may be placed on the vehicle that is an automobile. However, the present invention is not limited thereto. The PNDs 1, 50 and 70 may be placed on, for example, on a ship that moves on water.

In the above embodiments, the controllers 11, 51 and 71 of the PNDs 1, 50 and 70 perform the processes of the routines RT1, RT2 and RT3 in accordance with application programs stored in the memory 12, respectively. However, the present invention is not limited thereto. The controllers 11, 51 and 71 of the PNDs 1, 50 and 70 may perform the processes in accordance with application programs that are installed from storage media, downloaded from the Internet, or installed by using other methods.

In the second embodiment, the PND 50 as a velocity calculating device, includes the three-axis acceleration sensor 4 serving as a vertical acceleration detector, the Y axis gyro sensor 5 serving as a horizontal angular velocity detector, the velocity calculator 52 serving as a velocity calculator, and the velocity corrector 63 serving as a velocity corrector.

The present invention is not limited thereto. The velocity calculating device may include a vertical acceleration detector, a horizontal angular velocity detector, a velocity calculator, and a velocity corrector, which have different structures.

The present application contains subject matter related to that disclosed in Japanese Priority Patent Application JP 2009-211997 filed in the Japan Patent Office on Sep. 14, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A velocity calculating device comprising:
   a processor;
   a vertical acceleration detector mounted on a moving body that travels on a predetermined travel surface, the vertical acceleration detector detecting an acceleration in a vertical direction, generated due to an undulation of the travel surface, based on detecting an acceleration on three different axes;
   a horizontal angular velocity detector mounted on the moving body, the horizontal angular velocity detector detecting an angular velocity around a horizontal axis that is perpendicular to a direction of travel of the moving body, the angular velocity being generated due to the undulation of the travel surface;
   a velocity calculator, implemented by the processor, that calculates a velocity of the moving body in the direction of travel of the moving body on the basis of the acceleration in the vertical direction and the angular velocity around the horizontal axis; and
   a velocity corrector that corrects the calculated velocity of the moving body,
   wherein the velocity corrector corrects the velocity by inputting the velocity to a function having the velocity as a variable and having a predetermined constant,
   the velocity calculating device further comprising:
   a velocity detector that detects the velocity of the moving body in the direction of travel of the moving body and sets the velocity as a reference velocity; and
   a constant updater that updates the constant on the basis of the reference velocity and the velocity when the reference velocity is detectable,
   wherein, when the reference velocity is not detectable, the velocity corrector corrects the velocity by inputting the velocity to the function having the constant that is updated by the constant updater,
   a velocity detector that detects the velocity of the moving body in the direction of travel of the moving body and sets the velocity as a reference velocity,
   wherein the velocity calculator extracts a maximum value and a minimum value of the acceleration in the vertical direction in a predetermined period respectively as a maximum acceleration and a minimum acceleration, extracts a maximum value and a minimum value of the angular velocity around the horizontal axis in the predetermined period respectively as a maximum angular velocity and a minimum angular velocity, and calculates the velocity by dividing a difference between the maximum acceleration and the minimum acceleration by a difference between the maximum angular velocity and the minimum angular velocity, and
   wherein the function is obtained by substituting the maximum acceleration, the minimum acceleration, the maximum angular velocity, and the minimum angular velocity with variables including the radius of curvature of the undulation of the travel surface and the reference velocity in an equation for calculating the velocity and by solving the equation with respect to the reference velocity.

2. The velocity calculating device according to claim 1, wherein the velocity corrector corrects the velocity in accordance with a velocity region to which the velocity belongs, the velocity region being one of a plurality of velocity regions that are obtained by dividing the velocity into a plurality of velocity ranges.

3. The velocity calculating device according to claim 2, wherein the velocity corrector corrects the velocity using a correction factor corresponding to each of the velocity regions.

4. The velocity calculating device according to claim 3, further comprising:
   a velocity detector that detects the velocity of the moving body in the direction of travel of the moving body and sets the velocity as a reference velocity; and
   a correction factor updater that updates the correction factor for each of the velocity regions on the basis of the reference velocity and the velocity when the reference velocity is detectable,
   wherein, when the reference velocity is not detectable, the velocity corrector corrects the velocity using the correction factor that is updated by the correction factor updater.

5. The velocity calculating device according to claim 1,
wherein the velocity calculator extracts a maximum value and a minimum value of the acceleration in the vertical direction in a predetermined period respectively as a maximum acceleration and a minimum acceleration, extracts a maximum value and a minimum value of the angular velocity around the horizontal axis in the predetermined period respectively as a maximum angular velocity and a minimum angular velocity, and calculates the velocity by dividing a difference between the maximum acceleration and the minimum acceleration by a difference between the maximum angular velocity and the minimum angular velocity, and wherein the velocity corrector halves the velocity at least when the maximum acceleration and the minimum acceleration have the same sign or when the maximum angular velocity and the minimum angular velocity have the same sign.

6. A method, implemented on a velocity calculating device having a processor, of calculating a velocity, the method comprising the steps of:

detecting, by a vertical acceleration detector of the velocity calculating device, an acceleration in a vertical direction, generated in a moving body that travels on a predetermined travel surface due to an undulation of the travel surface, based on detecting an acceleration on three different axes;

detecting, by a horizontal angular velocity detector of the velocity calculating device, an angular velocity around a horizontal axis that is perpendicular to a direction of travel of the moving body, the angular velocity being generated due to the undulation of the travel surface;

calculating, by a velocity calculator of the velocity calculating device, a velocity of the moving body in the direction of travel of the moving body on the basis of the acceleration in the vertical direction and the angular velocity around the horizontal axis; and correcting, by a velocity corrector of the velocity calculating device, the calculated velocity of the moving body, wherein the correcting by the velocity corrector includes correcting the velocity by inputting the velocity to a function having the velocity as a variable and having a predetermined constant, the method further comprising:

detecting, by a velocity detector, the velocity of the moving body in the direction of travel of the moving body and setting the velocity as a reference velocity; and updating, by a constant updater, the constant on the basis of the reference velocity and the velocity when the reference velocity is detectable, wherein, when the reference velocity is not detectable, the velocity corrector corrects the velocity by inputting the velocity to the function having the constant that is updated by the constant updater, detecting, by a velocity detector, the velocity of the moving body in the direction of travel of the moving body and sets the velocity as a reference velocity, wherein the velocity calculator extracts a maximum value and a minimum value of the acceleration in the vertical direction in a predetermined period respectively as a maximum acceleration and a minimum acceleration, extracts a maximum value and a minimum value of the angular velocity around the horizontal axis in the predetermined period respectively as a maximum angular velocity and a minimum angular velocity, and calculates the velocity by dividing a difference between the maximum acceleration and the minimum acceleration by a difference between the maximum angular velocity and the minimum angular velocity, and wherein the function is obtained by substituting the maximum acceleration, the minimum acceleration, the maximum angular velocity, and the minimum angular velocity with variables including the radius of curvature of the undulation of the travel surface and the reference velocity in an equation for calculating the velocity and by solving the equation with respect to the reference velocity.

7. A navigation device comprising:

a processor;

a vertical acceleration detector mounted on a moving body that travels on a predetermined travel surface, the vertical acceleration detector detecting an acceleration in a vertical direction, generated due to an undulation of the travel surface, based on detecting an acceleration on three different axes;

a horizontal angular velocity detector mounted on the moving body, the horizontal angular velocity detector detecting an angular velocity around a horizontal axis that is perpendicular to a direction of travel of the moving body, the angular velocity being generated due to the undulation of the travel surface;

a velocity calculator, implemented by the processor, that calculates a velocity of the moving body in the direction of travel of the moving body on the basis of the acceleration in the vertical direction and the angular velocity around the horizontal axis;

a velocity corrector that corrects the calculated velocity of the moving body;

a vertical angular velocity detector that calculates an angular velocity around a vertical axis perpendicular to the direction of travel;

an angle calculator that calculates an angle by which the moving body has rotated on the basis of the angular velocity around the vertical axis; and a position calculator that calculates a position of the moving body on the basis of the velocity in the direction of travel velocity that is calculated by the velocity calculator and the angle that is calculated by the angle calculator, wherein the velocity corrector corrects the velocity by inputting the velocity to a function having the velocity as a variable and having a predetermined constant, the navigation device further comprising:

a velocity detector that detects the velocity of the moving body in the direction of travel of the moving body and sets the velocity as a reference velocity; and a constant updater that updates the constant on the basis of the reference velocity and the velocity when the reference velocity is detectable, wherein, when the reference velocity is not detectable, the velocity corrector corrects the velocity by inputting the velocity to the function having the constant that is updated by the constant updater, a velocity detector that detects the velocity of the moving body in the direction of travel of the moving body and sets the velocity as a reference velocity, wherein the velocity calculator extracts a maximum value and a minimum value of the acceleration in the vertical direction in a predetermined period respectively as a maximum acceleration and a minimum acceleration, extracts a maximum value and a minimum value of the angular velocity around the horizontal axis in the predetermined period respectively as a maximum angular velocity and a minimum angular velocity, and calculates the velocity by dividing a difference between the maximum acceleration and the minimum acceleration by a difference between the maximum angular velocity and the minimum angular velocity, and wherein the function is obtained by substituting the maximum acceleration, the minimum acceleration, the maximum angular velocity, and the minimum angular velocity with variables including the radius of curvature of the undulation of the travel surface and the reference velocity in an equation for calculating the velocity and by solving the equation with respect to the reference velocity.

8. The velocity calculating device according to claim 1, wherein the processor, the vertical acceleration detector, the horizontal angular velocity detector, the velocity calculator, and the velocity corrector are disposed within a singular housing that is configured to be mounted to the moving body.

9. The velocity calculating device according to claim 2, wherein the velocity corrector corrects the velocity using a correction factor that is different for each of the velocity regions.

10. The velocity calculating device according to claim 2, wherein the velocity corrector corrects the velocity using a correction factor that is common to each of the velocity regions.

* * * * *